(12) United States Patent
Tieman et al.

(10) Patent No.: US 12,364,278 B2
(45) Date of Patent: Jul. 22, 2025

(54) SYSTEMS AND METHODS FOR FRYING FOOD PRODUCTS

(71) Applicant: OTP Enterprises LLC, Draper, UT (US)

(72) Inventors: David Tieman, Saratoga Springs, UT (US); John Olsen, Riverton, UT (US)

( * ) Notice: Subject to any disclaimer, the term of this patent is extended or adjusted under 35 U.S.C. 154(b) by 529 days.

(21) Appl. No.: 17/552,150

(22) Filed: Dec. 15, 2021

(65) Prior Publication Data

US 2022/0183340 A1     Jun. 16, 2022

Related U.S. Application Data

(60) Provisional application No. 63/125,934, filed on Dec. 15, 2020.

(51) Int. Cl.
| | |
|---|---|
| *A23N 12/08* | (2006.01) |
| *A23F 5/04* | (2006.01) |
| *A23N 12/12* | (2006.01) |
| *A47J 37/12* | (2006.01) |

(52) U.S. Cl.
CPC .............. *A23N 12/086* (2013.01); *A23F 5/04* (2013.01); *A23N 12/125* (2013.01); *A47J 37/1261* (2013.01); *A47J 37/128* (2013.01); *A47J 37/1285* (2013.01); *A47J 37/129* (2013.01); *A47J 37/1295* (2013.01)

(58) Field of Classification Search
None
See application file for complete search history.

(56) References Cited

U.S. PATENT DOCUMENTS

| | | |
|---|---|---|
| 1,210,542 A | 1/1917 | Savageau |
| 2,053,106 A | 9/1936 | Piacentini |
| 2,371,093 A | 3/1945 | Willison |
| 3,121,635 A | 2/1964 | Elred |

(Continued)

FOREIGN PATENT DOCUMENTS

| | | |
|---|---|---|
| EP | 229920 A1 | 7/1991 |
| EP | 671125 A1 | 9/1995 |

(Continued)

OTHER PUBLICATIONS

International Search Report and Written Opinion for related PCT Application No. PCT/US21/10072.

*Primary Examiner* — Thor S Campbell
(74) *Attorney, Agent, or Firm* — Bryant J. Keller; Kirton McConkie

(57) ABSTRACT

Some implementations of the described methods relate to a process for frying coffee beans (and/or another food product) in a fry medium (such as cooking oil) and then centrifuging the coffee beans (and/or other food product) to remove a significant portion of the fry medium. Although the frying and centrifugation can occur in separate devices, in some cases, the described systems comprise a device that acts as both a fryer and a centrifuge. Indeed, in some cases, after the coffee beans (or other food product) has been fry roasted in a perforated container (e.g., a basket), the fry medium is drained from the container, and container is spun. In some cases, liquid nitrogen is also applied to the beans (or other food product), before and/or after being fry roasted. Other implementations are described.

20 Claims, 56 Drawing Sheets

(56) References Cited

U.S. PATENT DOCUMENTS

| | | | |
|---|---|---|---|
| 3,477,361 A * | 11/1969 | Bradshaw | A47J 37/1223 210/DIG. 8 |
| 3,645,196 A * | 2/1972 | Johnston | A47J 37/1214 99/407 |
| 3,718,485 A * | 2/1973 | Lankford | A23L 19/03 99/410 |
| 3,770,457 A | 11/1973 | Makwinski et al. | |
| 4,852,333 A | 8/1989 | Illy | |
| 5,333,539 A * | 8/1994 | Hurley | A23L 5/15 219/731 |
| 5,543,166 A | 8/1996 | Masel et al. | |
| 5,568,765 A * | 10/1996 | Andoh | H05B 6/80 99/410 |
| 5,611,265 A * | 3/1997 | Ronci | A47J 43/24 99/410 |
| D389,635 S | 1/1998 | Henderson | |
| 6,095,032 A | 8/2000 | Barnett et al. | |
| 9,380,911 B1 * | 7/2016 | Foster | A47J 37/1219 |
| 9,756,869 B2 | 9/2017 | Young | |
| 2003/0175400 A1 | 9/2003 | Schlosser | |
| 2004/0194635 A1 * | 10/2004 | Xu | A47J 37/1209 99/330 |
| 2006/0019001 A1 * | 1/2006 | Levinson | A23L 5/15 426/243 |
| 2006/0024420 A1 | 2/2006 | Kessler | |
| 2006/0159827 A1 | 7/2006 | Ha | |
| 2006/0165845 A1 | 7/2006 | Kaku et al. | |
| 2006/0207619 A1 | 9/2006 | Conti | |
| 2008/0110350 A1 * | 5/2008 | Wang | A47J 37/1295 99/409 |
| 2008/0152779 A1 | 6/2008 | De Groote et al. | |
| 2008/0237104 A1 * | 10/2008 | Foster | A47J 36/38 210/167.28 |
| 2008/0299262 A1 | 12/2008 | Reati | |
| 2009/0217824 A1 * | 9/2009 | Longhi | A47J 37/1219 99/409 |
| 2009/0246326 A1 | 10/2009 | Cary et al. | |
| 2010/0119685 A1 | 5/2010 | van Bergen | |
| 2010/0297320 A1 | 11/2010 | Branlard et al. | |
| 2012/0055345 A1 * | 3/2012 | Foster | A47J 37/1276 99/410 |
| 2013/0022719 A1 * | 1/2013 | Barber | A23L 5/11 426/243 |
| 2013/0153566 A1 * | 6/2013 | Gulkanat | H05B 6/12 219/622 |
| 2014/0370181 A1 * | 12/2014 | Young | A23F 5/04 426/507 |
| 2018/0008080 A1 | 1/2018 | Storek et al. | |
| 2018/0289212 A1 | 10/2018 | Sladecek et al. | |
| 2020/0187715 A1 * | 6/2020 | Van Erp | A23L 5/15 |
| 2022/0183340 A1 * | 6/2022 | Tieman | A23N 12/086 |
| 2024/0057814 A1 * | 2/2024 | Gordin | A47J 36/32 |

FOREIGN PATENT DOCUMENTS

| | | |
|---|---|---|
| EP | 813816 A1 | 11/1999 |
| EP | 3984369 A1 | 4/2022 |
| GB | 1424264 A | 2/1976 |
| JP | 2001128619 A | 5/2001 |
| JP | 2001231452 A | 8/2001 |
| JP | 2004065514 A | 3/2004 |
| WO | 2009047322 A1 | 4/2009 |
| WO | 2022078896 A1 | 4/2022 |

* cited by examiner

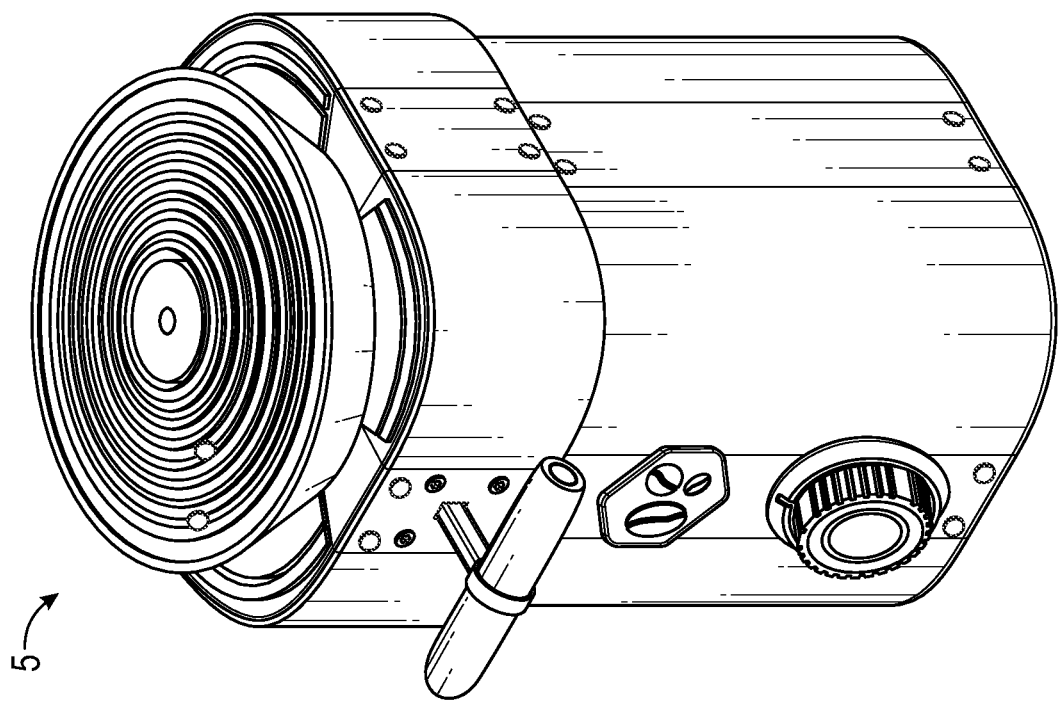
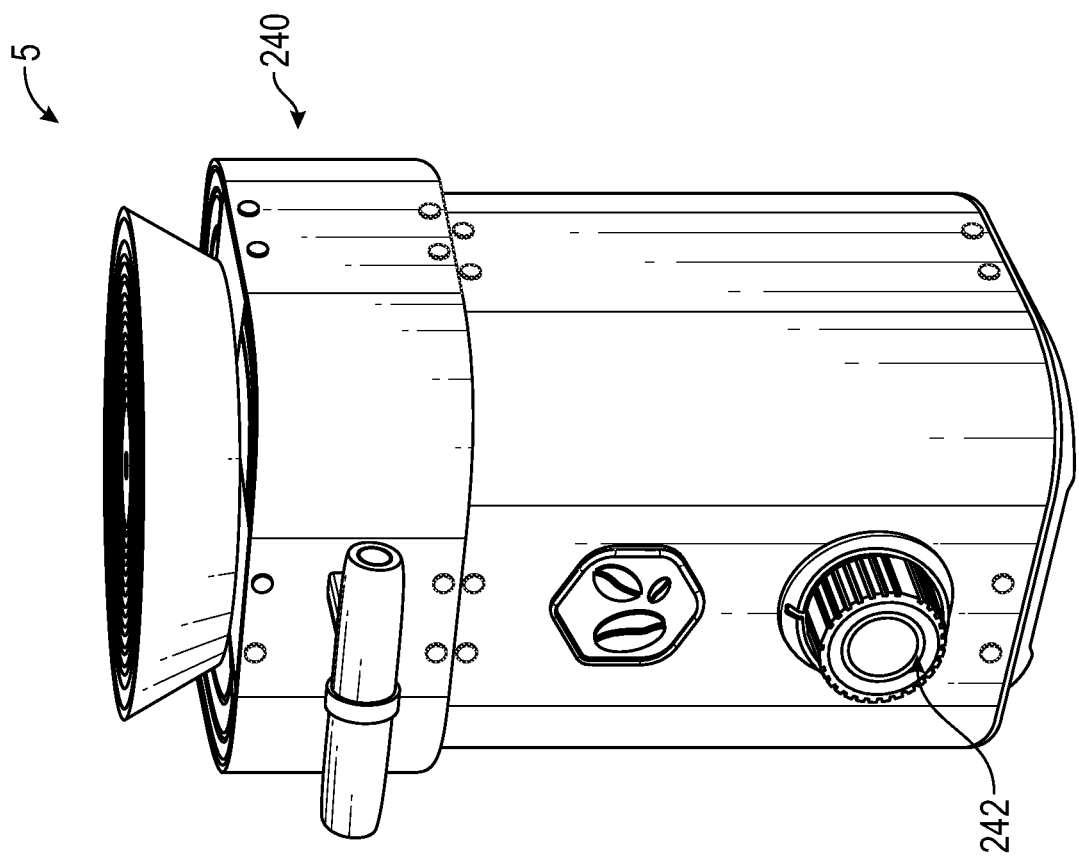

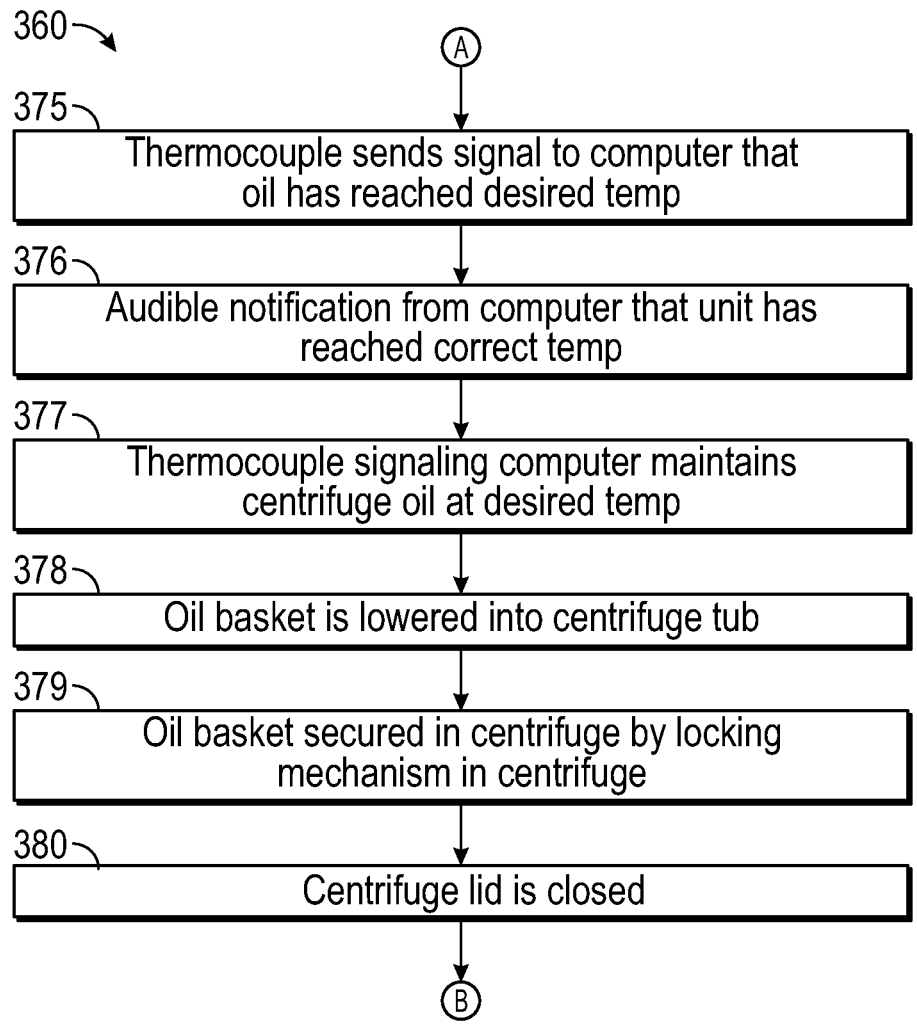
FIG. 34B
(Continued from FIG. 34A)

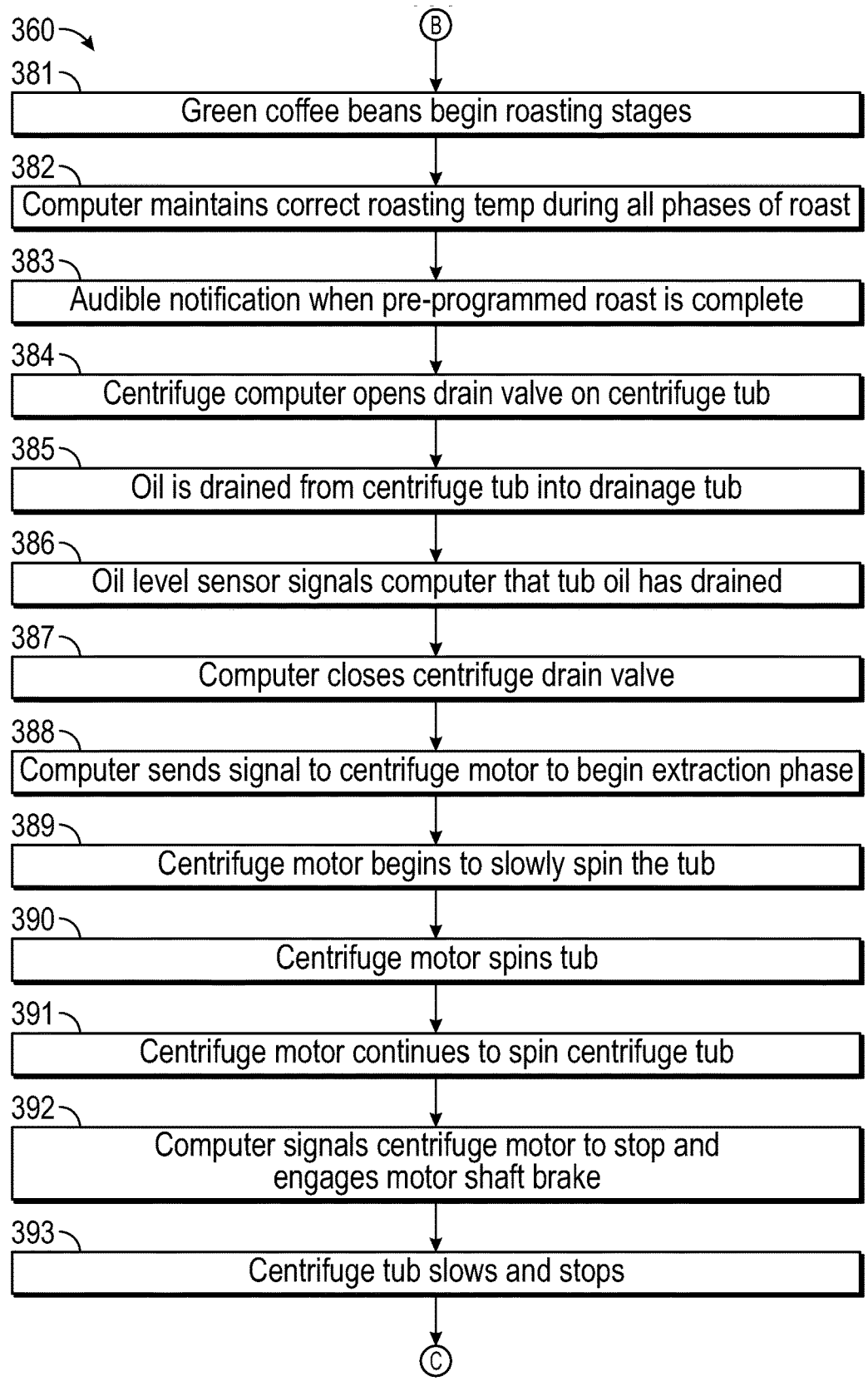
FIG. 34C
(Continued from FIG. 34B)

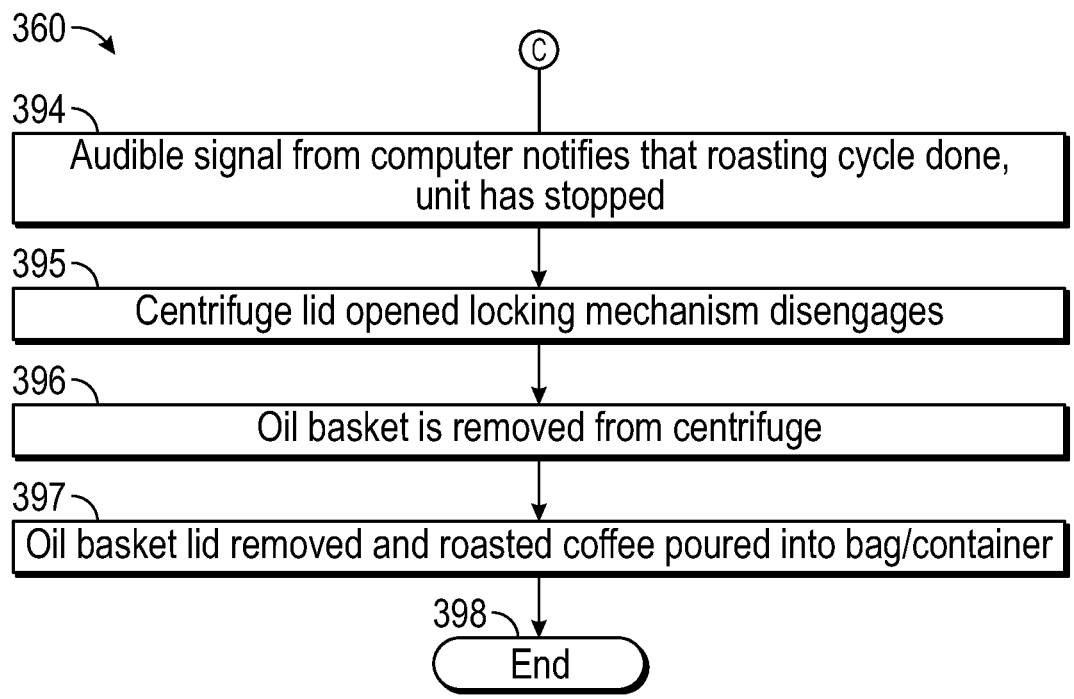
FIG. 34D
(Continued from FIG. 34C)

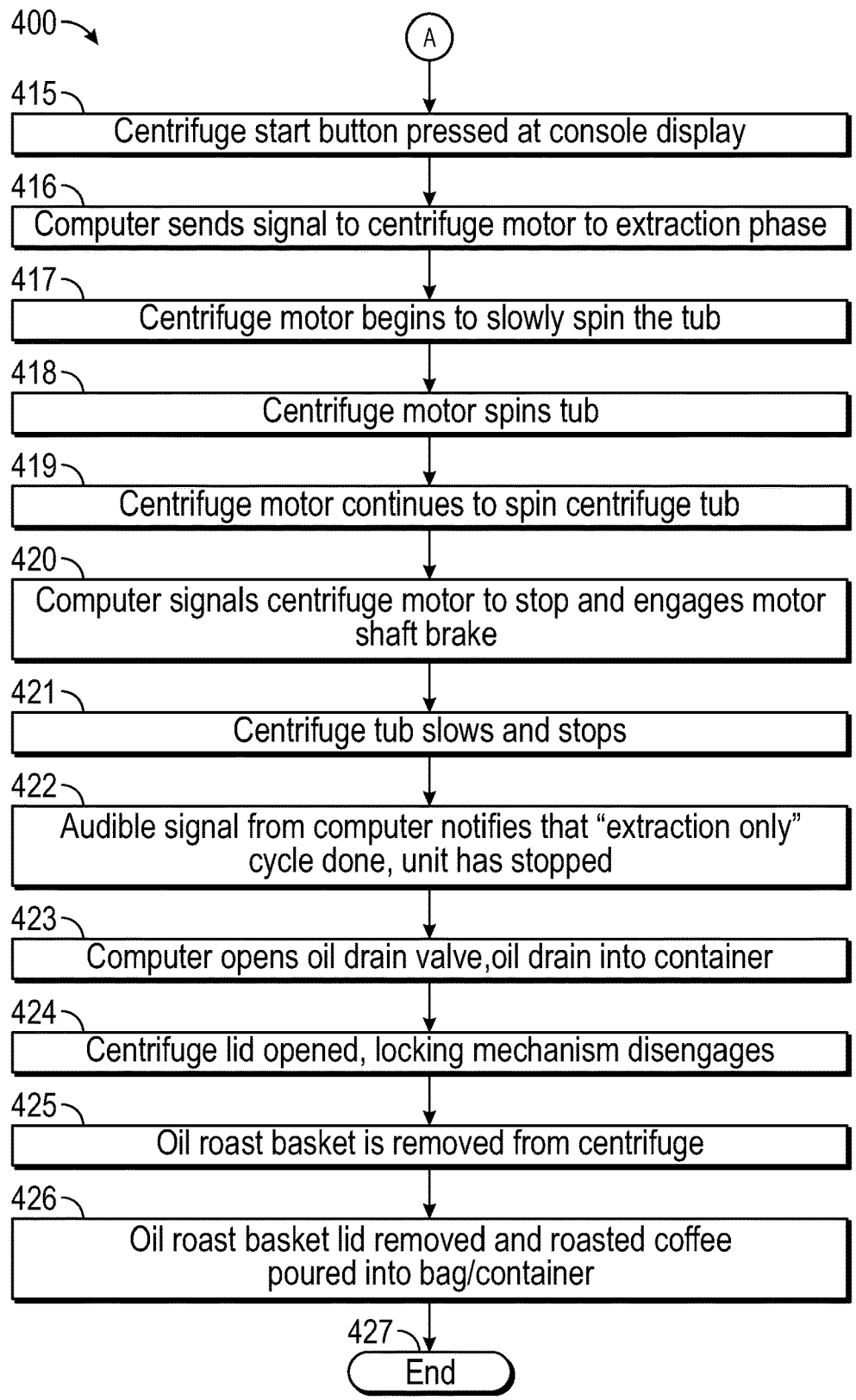
FIG. 35B
(Continued from FIG. 35A)

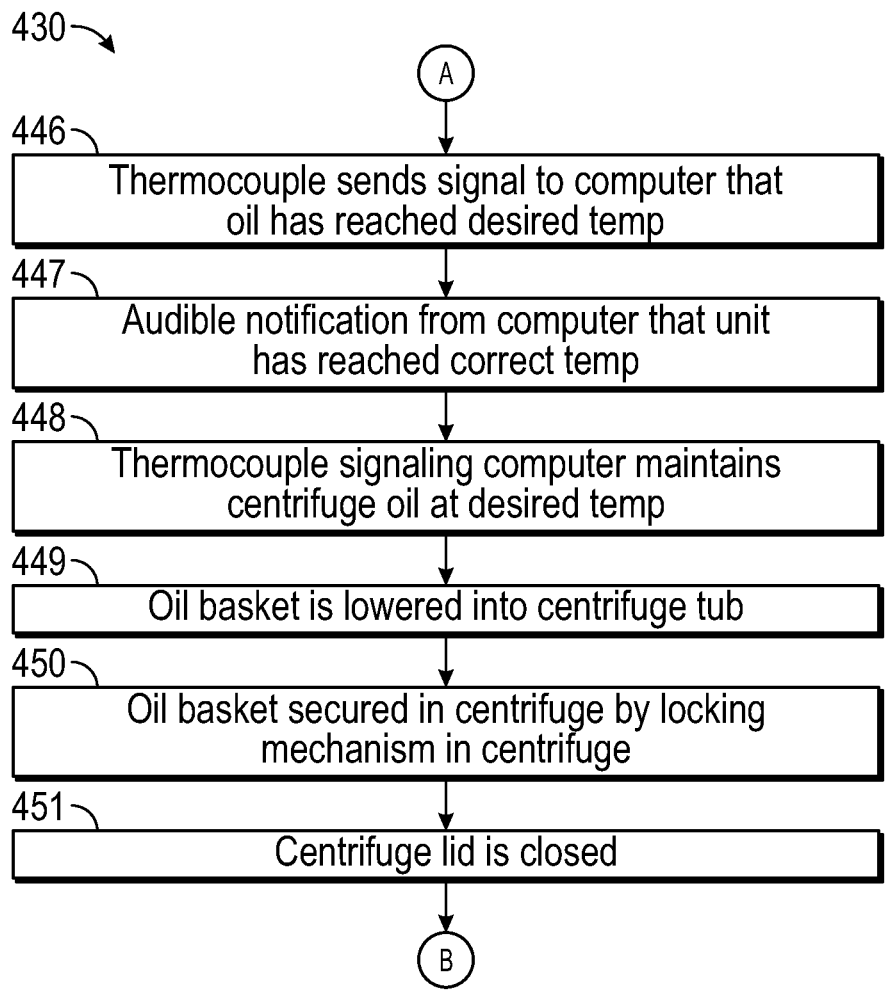
FIG. 36B
(Continued from FIG. 36A)

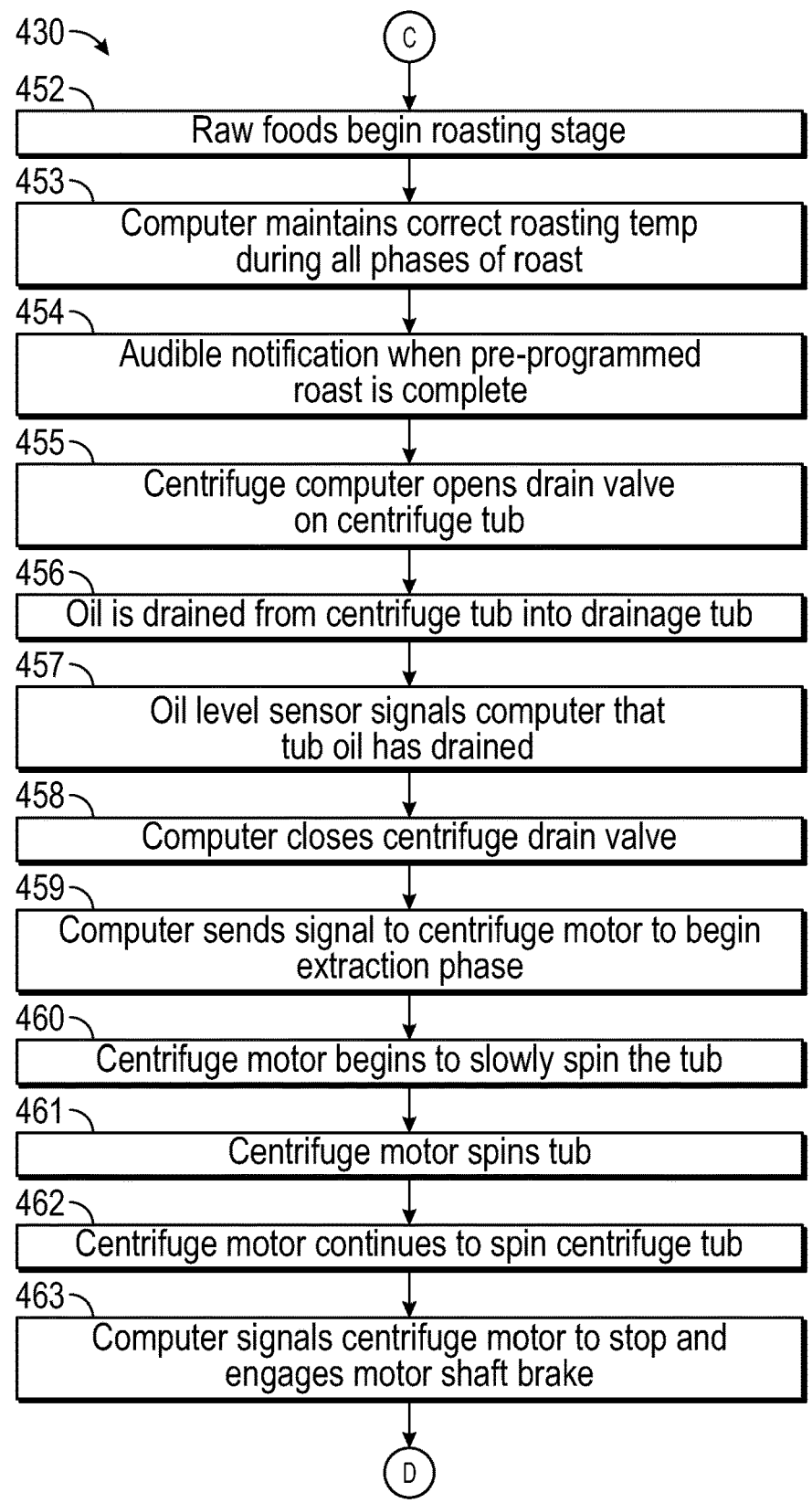
FIG. 36C
(Continued from FIG. 36B)

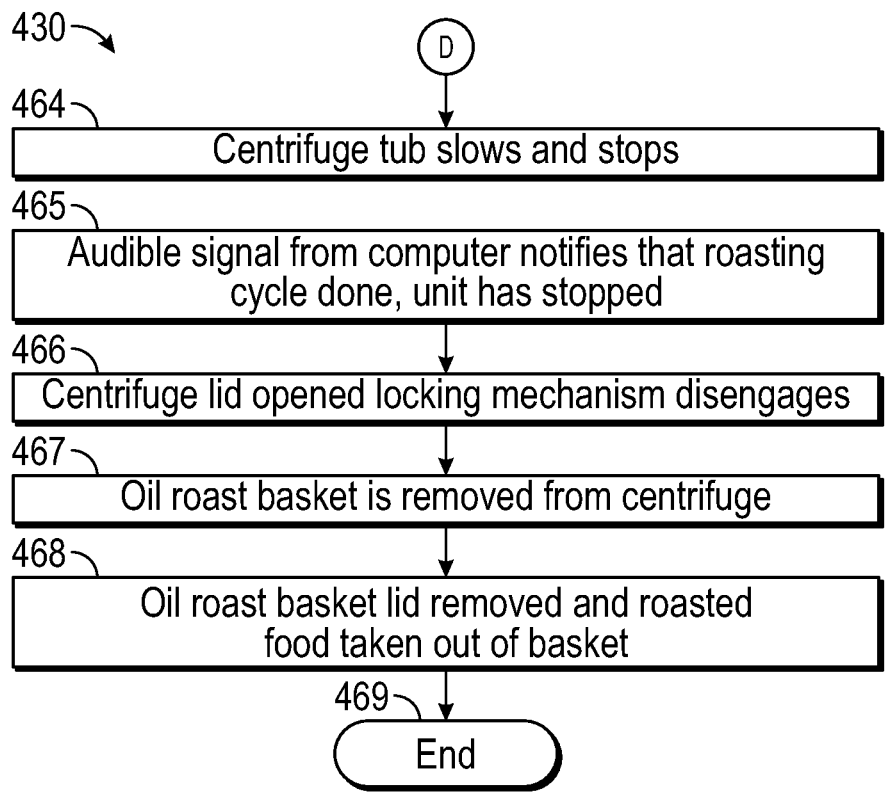
FIG. 36D
(Continued from FIG. 36C)

SYSTEMS AND METHODS FOR FRYING FOOD PRODUCTS

CROSS-REFERENCE TO RELATED APPLICATION

This application claims priority to U.S. Provisional Patent Application Ser. No. 63/125,934, filed Dec. 15, 2020, and entitled "SYSTEMS AND METHODS FOR FRYING FOOD PRODUCTS"; the entire disclosure of which is hereby incorporated by reference.

BACKGROUND

Field

The described systems and methods relate to the frying or roasting of food products. More particularly, some implementations relate to systems and methods for deep frying green coffee beans, nuts, seeds, grains, meat, produce, legumes, plant-based foods, animal-based foods, and/or any other suitable type of food product. In some cases, once the coffee (or other food product) has been heated to a desired temperature in a frying medium (e.g., oil), a portion of the frying medium is then removed from the coffee beans (or other food product) through the use of a centrifuge.

Background and Related Art

Coffee has been a popular drink in some countries since at least the $15^{th}$ century, with coffee cultivation and trade likely having its beginnings in the Arabian Peninsula. Since that time, however, coffee consumption and cultivation has spread across the world. Indeed, coffee's popularity has risen to the point that it is a common drink in many homes across the world.

While different types of coffee beans have different flavors, in many ways, coffee's flavor comes from its roasting process. Indeed, while raw coffee beans have amounts of caffeine, acids, sugars, proteins, and other ingredients that are similar to (if not higher than) those found in roasted beans, the roasting process causes the raw beans (which are typically green) to change to become brown in color and to have a different flavor. In this regard, as coffee beans are roasted, the Maillard reaction (e.g., a chemical reaction between reducing sugars and amino acids that occurs as the beans brown), caramelization, and/or a variety of other chemical reactions can occur, causing the beans to brown and change their taste. In some cases, raising the internal temperature of the beans to different specific temperatures provides the beans with a different taste. For instance, bringing the beans internal temperature to about 196 degrees Celsius can provide some beans with a light roast in which the sweetness is not fully developed and in which the beans have a toasted grain, grassy flavor in which a sharp acidity is easily recognized. In contrast, heating some beans to a higher temperature (e.g., 240 degrees Celsius) can cause the beans to be dark brown in appearance, to have strong caramel undertones, with a strong roast character, and with little of the coffee's inherent flavors and aroma of origin remaining.

Coffee beans can be roasted in a variety of methods, including, without limitation, by heating the beans in a drum, an air roaster, a heated pan, a fluid-bed roaster, and in any other suitable manner. While many conventional methods for roasting coffee beans may help to provide the beans with a variety of characteristics (e.g., flavors, colorings, caramelization, sizes, cracking, aromas, and/or any other suitable characteristic), such methods are not necessarily without their shortcomings. Indeed, in some cases, conventional methods for roasting coffee beans can result in: beans that lose their flavor relatively quickly, yields of roasted beans that are relatively light weight, beans that lack desired flavors, unnecessary waste, beans that lack a desired aroma, and beans that are otherwise less than ideal.

Thus, while systems and methods currently exist that are used to roast coffee beans, some challenges still exist, including those listed above. Accordingly, it would be an improvement in the art to augment or even replace current techniques with other techniques.

SUMMARY

The described systems and methods relate to the frying of food products. More particularly, some implementations relate to systems and methods for deep frying or roasting green coffee beans, nuts, seeds, grains, meat, produce, legumes, plant-based foods, animal-based foods, and/or any other suitable type of food product. In some cases, once the coffee (or other food product) has been heated to a desired temperature in a frying medium (e.g., oil), a portion of the frying medium is then removed from the coffee beans (or other food product) through the use of a centrifuge.

In some implementations, the described methods include placing a food product (e.g., coffee beans and/or any other suitable food product) in a container and placing the container in (or otherwise introducing the container to) a heated fry medium (e.g., cooking oil, vegetable oil, ghee, soy bean oil, canola oil, peanut oil, butter, grease, lard, fat, and/or any other suitable fry medium that is in a liquid state when it is heated to fry a food product). In some cases, the heated fry medium fries, deep fries, air fries, roasts, fry roasts, and/or otherwise cooks or heats the food product (e.g., coffee, French fries, chicken, etc.). In this regard, the fry medium can be heated in any suitable manner, including, without limitation, via one or more heating elements, flames, microwave heaters (e.g., magnetrons, wave guides, stirrers, etc.), induction heaters, electric coils, and/or any other suitable heater.

In some instances, once the food product (e.g., coffee beans and/or any other suitable food products) is cooked or otherwise heated to a desired amount, the fry medium is drained, pumped, and/or otherwise removed from the container and/or the container is removed from the fry medium. In order to remove excess fry medium from the food product (e.g., coffee beans), in some cases, the food product is then spun (e.g., in a centrifuge).

In some cases, the food product is heated in a fry medium in a first device (e.g., a deep fryer, a heated vat, and/or in any other suitable device that is configured to heat the fry medium) and then the food product is moved to a second device (e.g., a centrifuge) where the food product is spun or otherwise centrifuged. In some other cases, however, the food product is heated and centrifuged in a single device. Indeed, in some cases, the food product is placed in a colander, strainer, sieve, receptacle, perforated container, and/or any other suitable "basket" that is placed in an outer container (e.g., a centrifuge tub) that comprises (or that is configured to receive) a fry medium, such that the food product is heated in a first device by the fry medium. In some such cases, after the food product is heated, the fry medium is drained, pumped from, and/or otherwise removed from the outer container, and the food product in the basket is spun within the outer container (e.g., the centrifuge tub), while the food product remains in the same device in which it was heated.

In some cases, before and/or after the food product is heated in the fry medium, liquid nitrogen is sprayed on, misted on, poured on, showered on, dripped on, and/or otherwise applied to the food product. In this regard, while application of liquid nitrogen to the food product can perform any suitable function, in some cases, the liquid nitrogen changes a taste, aroma, texture, mouthfeel, smoothness, color, shelf life, appearance, and/or any other suitable feature of the food product.

In some cases, when the food product is heated in the fry medium and/or when the food product is centrifuged, air is blown past and/or is drawn from the food product. In some other cases, when the food product is heated in the fry medium and/or when the product is centrifuged, no air is blown past and/or drawn from the food product (e.g., the food product is in an airtight container). In still other cases, before, during, and/or after the food product is heated in the fry medium and/or the food product is centrifuged, air is removed from a space around the food product (e.g., to create at least a partial vacuum around the food product). In some such cases, the removal of air from around the food product can help to reduce smoke and air borne particulates that can otherwise be released from the food product.

While the described systems and methods can be particularly useful for fry roasting coffee beans, those skilled in the art will appreciate that the described systems and methods can be used in a variety of different applications and in a variety of different areas of manufacture. For instance, the described systems and methods can be used not only with coffee beans, but some implementations of the described systems and methods are configured to be used with any other suitable food product. Indeed, in some cases, the described systems and methods are used to deep fry a food product (e.g., chicken, corn dogs, chicken nuggets, chimichangas, deep fried ice cream, and/or any other suitable food product). In some cases, once the food product has been heated to a desired temperature, at least some of the fry medium (e.g., oil) is removed through centrifugation. Accordingly, in some implementations, the described systems and methods can provide a food product with the beneficial characteristics of being deep fried, while removing a significant amount of the oil that would remain on or in the food product, were the food product to be deep fried using conventional techniques.

These and other features and advantages of the described systems and methods will be set forth or will become more fully apparent in the description that follows and in the appended claims. The features and advantages may be realized and obtained by means of the instruments and combinations particularly pointed out in the appended claims. Furthermore, the features and advantages of the described systems and methods may be learned by the practice thereof or will be obvious from the description, as set forth hereinafter.

BRIEF DESCRIPTION OF THE DRAWINGS

In order that the manner in which the above-recited and other features and advantages of the described systems and methods are obtained, a more particular description thereof will be rendered by reference to specific embodiments thereof, which are illustrated in the appended drawings. Understanding that the drawings are not necessarily drawn to scale or in proper proportion, and that the drawings depict only typical embodiments of the described systems and methods and are not, therefore, to be considered as limiting the scope thereof, such systems and methods will be described and explained with additional specificity and detail through the use of the accompanying drawings in which:

FIGS. 30A-30K, 30O, and 30X illustrate various views of the described centrifuging deep fryer system, in accordance with some embodiments;

DETAILED DESCRIPTION

Figure 1:
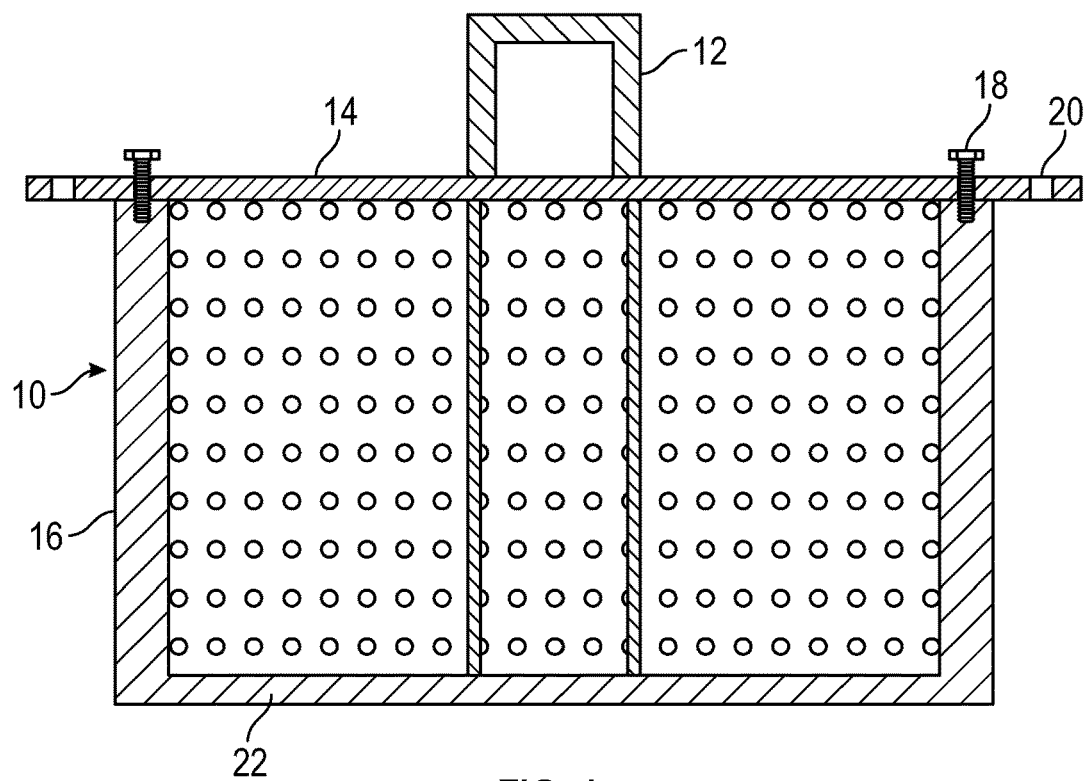
FIG. 1 illustrates a side, cross-sectional view of a perforated fry roast basket, according to some representative embodiments.

The described systems and methods relate the frying of food products. More particularly, some implementations relate to systems and methods for deep frying green coffee beans, nuts, seeds, grains, meat, produce, legumes, plant-based foods, animal-based foods, and/or any other suitable type of food product. In some cases, once the coffee (or other food product) has been heated to a desired temperature in a frying medium (e.g., oil), a portion of the frying medium is then removed from the coffee beans (or other food product) through the use of a centrifuge.

In the disclosure and in the claims, the term food product (and variations thereof) may be used to refer to any suitable food, foods, comestible, comestibles, and/or other edible material (or materials) that can be treated with the described systems and methods. In this regard, some examples of such food products include, but are not limited to, one or more: types of coffee beans (e.g., arabica, robusta, liberica, excelsa, bourbon, catimor, catuai, caturra geisha, icatu, jackson, Jamaican blue mountain, jember, kent, kona typica, maracatu, maragogype, mocca, mundo novo, pacamara, pacas, pache, ruiru, SL-34/SL-38, villa sarchi, villalobos, and/or any other suitable type of coffee), pieces of an animal (e.g., one or more pieces of meat, fat, flesh, a carcass, tissue, and/or other portions of one or more chickens, cows, pigs, lambs, fish, shrimp, lobsters, crustaceans, aquatic animals, deer, elk, rabbits, turkeys, birds, game animals, and/or any other animal), proteins, protein substitutes, dairy products, animal products, cheeses, fruits, vegetables, plants, legumes, stalks, leaves, grasses, grains, nuts, seeds, beans, tofu, pieces of fresh food, pieces of frozen food, pieces of raw food, pieces of cooked food, pieces of smoked food, pieces of unsmoked food, pieces of cured food, pieces of preserved food, and/or any other edible material that can be treated with the described systems and methods. In some cases, however, the term food products and variations thereof refer to coffee beans.

As used herein, the term frying medium and variations thereof may refer to any suitable type of cooking oil (e.g., vegetable oil, peanut oil, canola oil, olive oil, coconut oil, avocado oil, sesame oil, mustard oil, palm oil, rice bran oil, safflower oil, sunflower oil, and/or any other suitable type of cooking oil), butter, ghee, fat, lard, food-grade grease, and/or any other suitable food-grade, hydrophobic, material that is liquid when heated and configured to fry a food product (e.g., coffee beans) when the food product is submerged in the material and the material is heated to a sufficient temperature. In some embodiments, the fry medium comprises one or more types of granulated ceramic and/or silica fry media. In some other embodiments, however, the fry medium comprises one or more suitable types of cooking oil.

The following disclosure is grouped into two subheadings, namely "Systems and Methods for Frying" and "Representative Operating Environment." The utilization of the subheadings is for convenience of the reader only and is not to be construed as being limiting in any sense.

Systems and Methods for Frying

Generally speaking, there are basically two types of known coffee roasters. These are drum and hot air roasters, with tangential, pack-bed, centrifugal, and fluid bed roasters being variations of drum and hot air designs. In this regard, drum roasters are generally the most widely used form. Oftentimes, drum roaster design is relatively simple, typically consisting of a rotating cylindrical drum with heat being applied either directly under the drum or through a center of the drum through a conduit. The heat source can come from a range of sources, including wood, natural gas, or petroleum gas. An example of a drum roaster includes a drum coffee roaster in the form of a rotating drum having internal baffles that often form oppositely pitched helical paths that drive tumbling coffee beans toward the center of the drum in one direction of rotation of the drum and toward the ends of the drum in the other direction of the drum's rotation.

In drum roasters heat often is transferred though conduction (e.g., ~25%) with the vast majority usually coming from convection (e.g., ~75%). Temperature measurements are reported usually by two gauges on the system, with one gauge measuring the actual flame temperature and the other measuring ambient bean temperature within the drum (usually via a thermocouple).

There are, however, issues with some drum roasters as they can be subject to temperature variability within the drum, which can cause tipping and/or scorching of the coffee bean. This often occurs if too much heat is applied, or if the speed of the rotating drum is too high, which can allow centrifugal force to push the beans against the barrel and to transfer too much heat to a section of the beans.

Another inherent concern regarding some drum roasters is the chaff (or silverskin) that often comes off the beans and that can remain in the drum and quickly carbonize. This can create the formation of numerous known human carcinogens (i.e., chemical compounds such as furan, acrolein, and acrylamide), which when created are a concern to public health.

Also, in some drum roasters, the chaff (or silverskin) often rides on the tumbling beans and burns and smokes. This smoke can fumigate the beans, giving them a harsh and bitter taste. In some cases, the smoke also deposits on the surface of the beans, resulting in darker bean surfaces than bean interiors, which can create difficulty in determining proper roast development. In some cases, the carbonizing of the drum roasted chaff also creates volatile products, similar to those found in cigarette smoke and charcoal preparation from wood.

A further concern can occur as a drum roaster's metal drum can build up an oily surface that helps to create a carbonized lacquer, which can cause poor heat transfer rates from the metal drum to the beans (e.g., via conduction). As a result, the roaster operator may, in some cases, need to increase the temperature of the drum to keep roasting at minimal times. Since most of the heat passes through the drum wall, the drum deposits may need to be removed regularly, which can create downtime for needed maintenance and which can result in lost productivity.

The second type of roaster is the hot air roaster, which is also known as a fluid bed roaster. In one example of a hot air or fluid bed roaster, coffee beans in a box-like chamber are levitated as a dense, uniformly re-circulating mass by an upwardly directed airstream. In this example, the heat is generally transferred to the beans primarily by convection and secondarily by conduction from bean to bean.

This type of roaster is typically vulnerable to roast quality issues that are caused by a failure to get good temperature and airflow measurements and to apply adequate control systems. For example, in some fluid bed roasters, airflow should be fast enough to float and circulate the coffee beans in the roasting chamber. If, however, the airflow is not sufficient, then the beans sitting right on the airflow inlet at the bottom of the roast chamber can be constantly exposed to super-hot air, which can make them scorch and eventually ignite.

The rate of heat transfer into the beans is generally dependent on airflow. In this regard, the faster the air washes over the beans, the faster they are heated and roast. In order to slow down the heat transfer to the beans and to control roasting speed, the airflow may need to be slowed down. In turn, this can cause an issue with suspending the beans in the airflow and can create contact with the hot surfaces of the roasting chamber, which can also result in scorching and burning of the beans.

Another issue is that some hot air or fluid-bed roasters use blowers that may need to withstand high backpressure in order to provide pressurized and heated air to the roast chamber. This high-pressure system can often create leaks and can thus compromise roast consistency.

Furthermore, many drum and hot air roasters create large amounts of $CO_2$ gas, volatile organic compounds (VOCs), smoke, soot, ash, and atmospheric particulate matter (e.g., PM2.5 and PM10) that can contribute to greenhouse gas emissions, air pollution, and respiratory health concerns.

Therefore, a need exists for a system that is capable of processing green coffee beans with less airborne pollution and undesirable by-products than are produced by some conventional systems.

In accordance with some embodiments, the described systems and methods address the needs described above by frying, roasting, and/or fry roasting green coffee beans in an anaerobic roasting basket that is submerged in cooking oil (and/or any other suitable fry medium). In this regard, the terms frying, roasting, and fry roasting may be used interchangeably herein to indicate the heating and/or cooking of one or more items in the fry medium. In some embodiments, however, this oxygen free (or oxygen reduced) process of frying in a fry medium is configured to greatly reduce the food's carbonized particulates that are more readily formed in the oxygen environment of some drum and hot air roasters. Furthermore, smoke, ash, and soot that can be produced during some conventional roasting processes generally do not readily escape into the air in the described systems and methods, as the oil can capture this carbonized organic matter (e.g., soot, smoke, and/or ash).

A need also exists to reduce hazardous VOCs during the green coffee bean roasting process. In this regard, reduction in these volatile organic compounds can reduce inhalation of hazardous VOCs and their accompanying risk to respiratory health.

In accordance with some embodiments, the described systems and methods reduce the out gassing of VOCs during the coffee roasting process by creating organic polymerization on the exterior of the coffee bean (and/or other suitable food product). This organic polymerization can also contribute (in some cases) to the retention of desirable VOCs within the coffee bean and can, thereby, create an enhanced sensory flavor profile.

A need also exists to reduce potential carcinogenic compounds created during some conventional roasting processes.

In accordance with some embodiments, by using conduction and/or oil submersion to roast a food product, the described systems and methods are configured to reduce potential carcinogenic compounds that can be associated with some competing systems and methods. As a result, some embodiments of the described systems and methods are configured to prevent scorching, burning, and carbonizing of the outer surface of the coffee bean (or other food product).

Furthermore, in some embodiments, the anaerobic (oxygen free and/or oxygen reduced) roasting environment within the basket (or other container) and/or roasting centrifuge prevents the creation of oxygen free radicals, which can create cancer causing organic compounds.

A need exists in the art for greater consistency in coffee bean (and other food product) roasting, namely roasting that is consistently reproducible in small- and large-scale production, with reduced cost and reduced energy use.

In accordance with some embodiments of the described systems and methods, using cooking oil (or any other suitable fry medium) as a conductive heat source to roast coffee beans (and/or any other suitable food product) is better able to control a rate of rise (ROR) as is known in the art due to cooking oil's increased viscosity and superior thermo-physical efficiency compared to air.

Furthermore, some embodiments of the described systems and methods are configured to reduce uncontrolled variations in roasting temperature during a roast, which can provide for better consistency per batch of roast. Additionally, some embodiments of the described systems and methods allow for what is known in the art as "time of roast calculations" to be relatively accurate—thus ensuring consistent roast depth and color duplication.

A need exists to also provide for greater flexibility in the location for roasting coffee, without the need of expensive air pollution mitigation materials, as well as providing better air quality control and less respiratory health risk for those involved in coffee roasting.

In addition, a further need exists to provide restaurants, fast food chains, mobile foods services, bakeries, other food service industries, breakrooms, homes, lobbies, hotels, and virtually any place and anyone else to have the ability to roast volume production coffee on-site, without the problem of using large amounts of floor space and considerable capital expenditures (e.g., in infrastructure (such as piping, exhaust ducting, etc.) and power usage).

Furthermore, due to issues found in some conventional hot air and/or fluid bed roasters, some such roasters have: air leaks, airflow regulation issues, issues with scorching the beans, inconsistent roasting temperatures, risks of bean ignition, chaff mitigation problems, and/or air pollution problems. Accordingly, there is a need to correct such problems.

A need also exists to address the problems that are inherent in some drum roasters, such as: drum speed inconsistencies, charring or carbonizing of beans, the production of carcinogenic byproducts, carbonized buildup on drum walls that can require maintenance and lost productivity, burned chaff, and/or large duct and exhaust infrastructure and cost.

A further need exists to reduce roasting maintenance needs and service intervals, to provide greater productivity per hour of use, and for systems and methods that require less training than do some conventional systems and methods.

A need also exists to reduce fat content and calories of foods processed and/or fried in cooking oils. In this regard, these high fat foods (e.g., fried chicken, chicken nuggets, corn dogs, fish patties, etc.) are prevalent in many food manufacturing facilities, processing plants, restaurants, and fast-food chains. That said, many medical experts and consumers are aware of the health hazards of consuming food products that are high in fat and calories.

In this regard, some embodiments of the described systems and methods address this need by reducing fat content in foods after roasting by use of centrifuge extraction, which can remove excess fat and/or oil from the fried food, without negatively affecting the food's flavor profile.

Moreover, a need exists to provide the ability for businesses and individuals to use the described systems and methods seamlessly with their existing equipment—thereby reducing costs, reducing training, and requiring minimal capital investment.

In accordance with some embodiments, the described systems and methods include placing raw coffee beans in a heated fry medium (e.g., cooking oil) and heating the beans until they reach a desired internal temperature. Although, in some embodiments, the chaff or silverskin of the coffee beans is removed before the frying or roasting process, in some other embodiments, the described methods include leaving the chaff intact on coffee beans. In this regard, unlike some conventional methods that remove the chaff before roasting (e.g., to reduce: soot, carcinogen production, the bad flavor that can come from burned chaff, and/or the other undesirable effects that can be associated with coffee chaff), by frying the chaff in cooking oil (and/or any other suitable fry medium) in accordance with the described systems and methods, most if not all of the undesirable effects of roasting coffee chaff can be avoided. Moreover, by frying the chaff with the beans, chaff waste can be reduced, and coffee production can be increased.

In any case, where the fry medium is heated (e.g., to roast coffee beans and/or to heat any other suitable food product), the fry medium can be heated to any suitable temperature, including, without limitation, to any temperature between about 40 degrees Celsius and about 500 degrees Celsius (or within any subrange thereof). Indeed, in some embodiments, the fry medium is heated to between about 180 degrees Celsius and about 285 degrees Celsius for roasting coffee (e.g., between about 204 degrees Celsius and about 271 degrees Celsius). Indeed, in some non-limiting cases in which the fry medium comprises a plant and/or animal-based cooking oil, the cooking oil is heated (for coffee bean roasting) to about or below about 271 degrees Celsius (e.g., a smoke point of some oils). Additionally, the skilled artisan will recognize that the fry medium (e.g., cooking oil) can be heated to any other suitable temperature for use with any other suitable food product.

Where the described systems and methods are configured to heat the fry medium, the fry medium can be heated in any suitable manner. Indeed, in some embodiments, the fry medium is disposed in a vessel that is heated by one or more flames, electric heating elements, induction heaters (i.e., electromagnetic induction heaters and/or any other suitable type of induction heater), infrared heaters, microwaves (e.g., magnetron tubes, wave guides, wave stirrers, microwave emitters, etc.), ovens, and/or through the use of any other suitable heating mechanism or mechanisms. In some embodiments, however, the described systems use one or more induction heating elements to heat the fry medium.

In some cases, once the coffee beans (and/or other food products) have been properly heated, the coffee (and/or other food product) is removed from the fry medium (e.g., cooking oil) and/or the fry medium is removed from the coffee (and/or other food product). In this regard, the fry medium can be removed from the coffee and/or any other suitable food product in any suitable manner. By way of example, in some embodiments, the fry medium is removed from the coffee or other food product via a pump, gravity training, sieving, centrifugation, allowing the fry medium to drip off, blotting the fry medium off, contacting the coffee beans and/or food product with an absorbent material (e.g., paper towels, sponges, cellulose, and/or any other suitable absorbent materials), whipping off the fry medium, and/or otherwise removing some or all of the fry medium from the coffee and/or other food product. In some embodiments, however, after the coffee beans (and/or other food product) has been deep fried, fry roasted, and/or roasted in the fry medium, the beans (and/or other food product) are centrifuged such that a significant portion of the fry medium (and/or particular matter produced in the roasting process) is removed from the beans (and/or food product).

Where the coffee beans (and/or food product) are centrifuged, they can be centrifuged in any suitable location. Indeed, in some embodiments, the beans (and/or other food product) are taken out of the fry medium and the fryer (or roaster) in a first device (e.g., a conventional deep fryer and/or any other similar device) and placed in a centrifuge that is separate from the first device (or at least that is not disposed in the device and container in which the beans (or other food product) are fried). In some other embodiments, however, the beans (and/or other food product) are centrifuged within the fryer (e.g., in the location in which the beans are fried). In other works, in some embodiments, the food products are fried and centrifuged in the same device. In some such embodiments, after the beans (and/or other food product) are heated to a desired temperature (e.g., in a basket), the fry medium is drained from the beans (e.g., via one or more valves, gravity, pumps, pressurization systems, positive displacement systems, vacuum pumps, and/or in any other suitable manner). In some cases, when the fry medium is drained, it is sent to a holding vessel (e.g., a non-insulated vessel, an insulated vessel, a heated vessel, a non-heated vessel, filtrated insulated vessel, insulated vessel with one or more filter media, a disposable vessel, a removable vessel, and/or to any other suitable recipient or reservoir). In some cases, when the fry medium is drained from the fryer and/or reintroduced into the fryer, the fry medium is filtered (e.g., via one or more meshes, screens, filters, filter papers, cellulosic filters, organic carbon fibers, pleated filter, fiber filters, canister filters, and/or any other suitable filter or filters).

In some embodiments, the food product is fried in a first container and then centrifuged in a second basket or container. In some other embodiments, as and/or after the fry medium has been drained from the beans (and/or other food product), the beans are centrifuged in the same container in which the beans were fried and/or roasted (e.g., in a fry basket). In this regard, such a basket can have any suitable characteristic, including, without limitation, having one or more: hoppers to fill the basket; baffles, partitions, columns, internal compartments, and/or dividers to keep various food products separated from each other in the basket; doors; funnel doors; chutes; handles; holes (and/or any other suitable apertures or perforations, in any suitable location, number, size, location, shape, and/or pattern) in the wall, floor, and/or lid of the basket; lids; lid coupling mechanisms (e.g., threaded engagements, screws, clamps, anchor Hermes clamps, wire bail latches, frictional engagements, mechanical engagements, magnets, catches, latches, and/or any other suitable lid coupling mechanisms); shapes (e.g., having a circular perimeter from a top view, a square perimeter, a rectangular perimeter, a triangular perimeter, a polygonal perimeter, a symmetrical perimeter, and/or any other suitable perimeter); couplers for directly or indirectly coupling the basket to a motor (e.g., one or more mechanical engagements, threaded engagements, fasteners, receptacles, processes, locking engagements, and/or other features that are configured to allow the basket to be spun by a motor); and/or any other suitable component or characteristic.

Where the coffee beans (and/or other food product) are centrifuged, the beans (or other food product) can be centrifuged at any suitable speed and/or force of gravity. In some embodiments, the coffee beans are centrifuged at a top speed that is between about 4 rpms and about 12,000 rpms (or within any subrange thereof). Indeed, in some embodiments, the beans (and/or other food products) are centrifuged at between about 1,000 rpm and about 3,500 rpm (e.g., about 2,800 rpm±500 rpm). In this regard, it should be noted that coffee beans may be spun at a different speed than other food products (e.g., fried chicken on the bones may be spun at a lower speed than coffee beans). In any case, the beans and/or other food product can be centrifuged for any suitable period of time, including, without limitation, for between about 1 second and about 12 hours, or within any subrange thereof (e.g., between about 3 seconds and about 10 minutes). Indeed, in some embodiments, the beans and/or other food products are centrifuged for between about 60 seconds and about 5 minutes.

The described system comprising a fryer and centrifuge can be any suitable size that allows it to function as intended. Indeed, in some embodiments, the fryer is separate from the centrifuge. Thus, in some embodiments, existing frying equipment (e.g., industrial, commercial, consumer, and/or household equipment) can be used with a separate centrifuge. In some other embodiments in which the fryer and centrifuge are part of the same device, the described frying apparatus (e.g., the combined fryer and centrifuge, or centrifuging fryer system) is industrial size and configured to handle relatively large batches of coffee beans (and/or of any other suitable food products). In some other embodiments, the described frying apparatus (e.g., the fryer and centrifuge) is configured to fit in a restaurant. In still other embodiments, the frying apparatus (the combined fryer and centrifuge) is configured for home use (e.g., fitting on a countertop).

The various components of the systems and apparatus (e.g., the fryer and centrifuge) (including, without limitation, the basket, centrifuge, motor, hopper, loader, lid, valves, pumps, vacuum pumps, power, heater, controls, displays, inputs, drain, cooler, fan, brake, locking mechanism, release mechanism, and/or any other suitable component of the fryer/centrifuge) can be controlled in any suitable manner, including, without limitation, manually, automatically, via one or more controls, via one or more programs, under the control of a processor, via a user interface, remotely over a network, and/or in any other suitable manner. Indeed, in some embodiments, the fryer medium temperature; cooking time; draining; centrifuge spinning rate; centrifuge spinning time; centrifuge acceleration; centrifuge deceleration; removal of food product; opening of one or more doors; closing of the doors; opening of one or more valves; closing of one or more values; application of liquid nitrogen to a food product; addition of one or more flavorings, coloring agents, excipients, and/or other additives; application of liquid nitrogen; refilling the fry medium; applying the brake to the centrifuge; locking a lid on the centrifuge; and/or any other suitable function is controlled by one or more processors or computers (e.g., via one or more sensors, programs, and/or in any other suitable manner).

While the described system can include any suitable component or characteristic, some non-limiting illustrations of the described systems and methods are included in the figures.

In particular, and in accordance with some embodiments, FIG. 1 illustrates the perforated fry roast basket 10, comprising one or more handles 12 (with the handle being balanced with respect to the empty basket and/or having any suitable shape or characteristic). Additionally, while the fry basket lid 14 can couple to the walls 16 (and/or to any other suitable portion) of the basket in any suitable manner (e.g., via one or more twist-lock mechanisms, clamps, anchor Hermes clamps, frictional engagements, threaded engagements, mating elements, catches, clasps, and/or in any other suitable manner), FIG. 1 also shows that one or more wingnuts, nuts, and/or bolts 18 are used to secure some embodiments of the fry basket lid 14 to the fry basket 10. Additionally, while some embodiments of the lid 14 can couple to the centrifuge tub (not shown in FIG. 1) in any suitable manner (e.g., via one or more twist-lock mechanisms, clamps, anchor Hermes clamps, frictional engagements, threaded engagements, mating elements, catches, clasps, hinges, and/or via any other suitable coupler and in any other suitable manner), FIG. 1 shows an embodiment in which one or more openings 20 are configured to allow a bolt, pin, clip, nail, pawl, strap, clamp, lock, and/or any other suitable fastener to pass through the fry basket lid 14 into a portion of the centrifuge basket. Additionally, while the fry roast basket and/or the lid can have any suitable openings (or any suitable size, pattern, shape, location, and/or configuration) that allow the fry medium and/or gases (in the case of the lid) to pass into and/or out of the fry roast basket, FIG. 1 shows that in some embodiments, the walls 16 and/or a floor 22 of the fry roast basket 10 comprise (or define) a plurality of perforations that are sized to retain the coffee beans (or other food product) within the basket during centrifugation.

Figure 2:
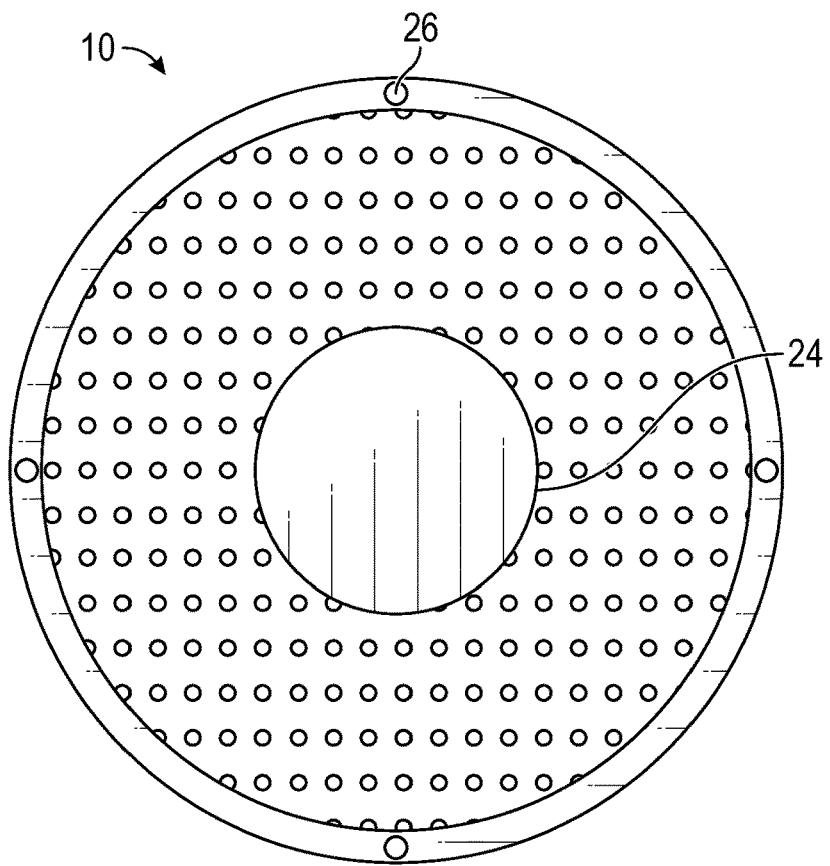
FIG. 2 illustrates a top, plan view of the fry roast basket, with its lid removed to show an interior of the basket, according to some representative embodiments.

In accordance with some embodiments, FIG. 2 illustrates a top view of the fry basket 10 with the fry roast basket lid 14 removed to show an interior of the perforated basket. In this regard, FIG. 2 shows that some embodiments comprise a center circular partition 24 (e.g., to separate one food product from another food product, to ensure that a food product gets a smaller G force, and/or for any other suitable purpose). Indeed, in some embodiments, the center circular partition acts as a thermal heat transfer device to provide radiant heat to the fry medium and food product. In this regard, some embodiments of the center circular partition radiate heat in 360 degrees within the oil roast basket and/or create convection up through the food product in the basket, thereby providing even heat transfer into the fry medium and the food product. Additionally, in some embodiments, the center partition (which besides being cylindrical, can be any other suitable shape, including, without limitation, being conical, rectangular prismatic, polygonal prismatic, pyramid shaped, obelisk shaped, have one or more fins, and/or have any other suitable shape and/or characteristic) can help facilitate heat retention in the basket, which can provide for a more controlled heating and energy efficiency. Moreover, in some embodiments, the center partition helps to balance out the contents in the basket during extraction by creating a relatively even distribution of the food products.

Figure 4:
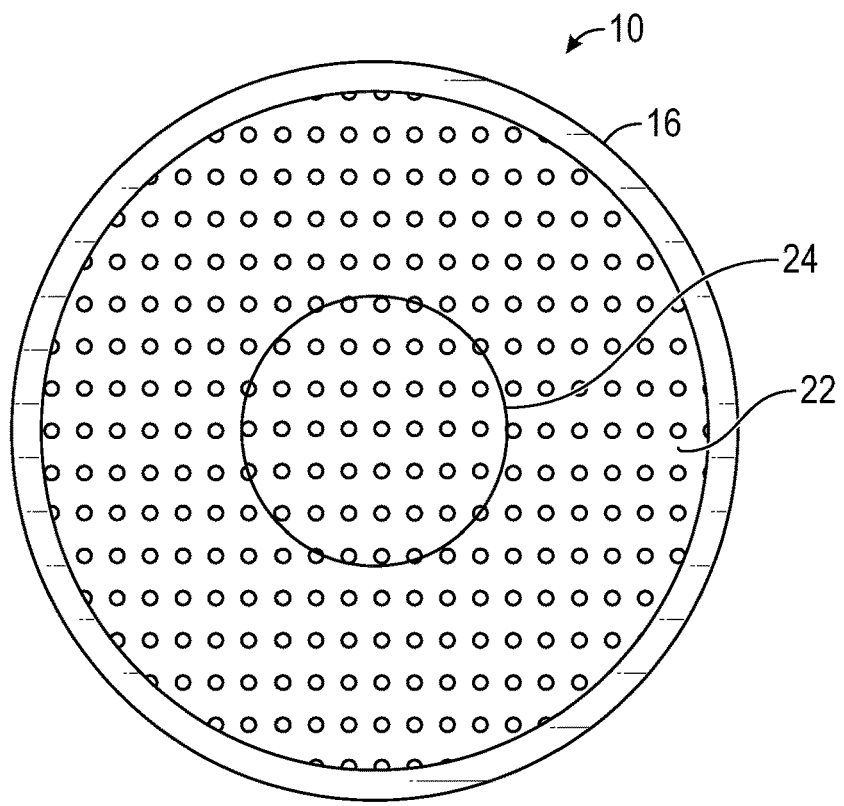
FIG. 4 illustrates a bottom, plan view of the perforated fry roast basket, according to some representative embodiments.

In some embodiments, the center partition 24 is configured to receive one or more food products (e.g., food products that need to be spun at a lower G force). In some other embodiments, the center partition is configured to prevent food products from being disposed within such partition. Additionally, while some embodiments of the central partition have a floor that is not perforated, in some other embodiments (as shown in FIG. 4) the floor 22 the central partition 24 is perforated. In any case, FIG. 2 shows that, in accordance with some embodiments in which the lid (not shown) couples to the basket 10 via one or more bolts 18, the basket 10 comprises a bolt hole configuration that comprises one or more wingnut threaded holes 26 (and/or any other suitable mechanism for coupling the lid to the basket). Moreover, FIG. 2 shows an interior circular view of the central partition 24, which in accordance with some embodiments, runs from the bottom of the basket to the underside of the lid.

Figure 3:
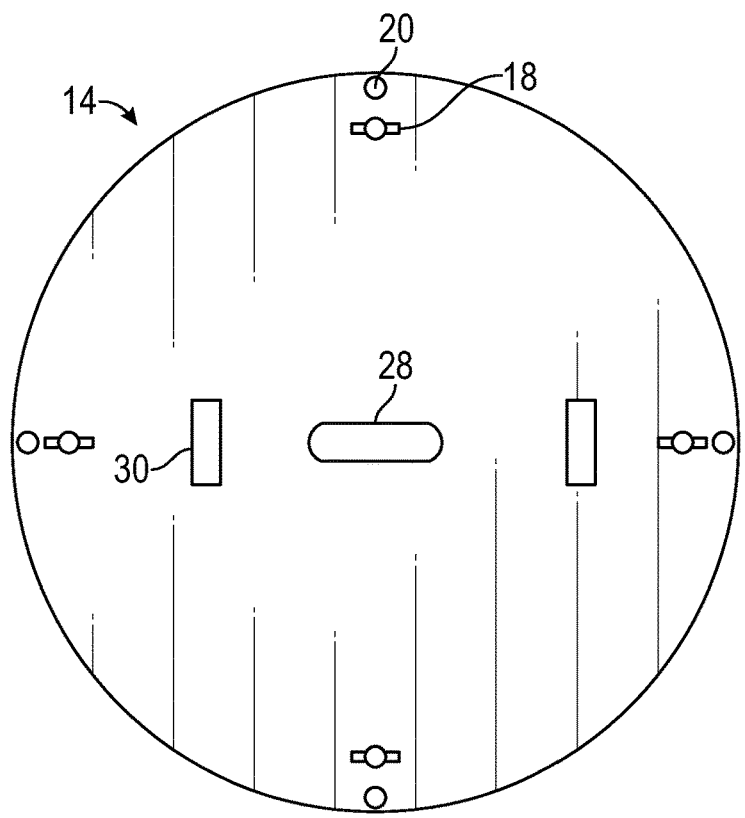
FIG. 3 illustrates a top, plan view of the lid of the fry roast basket, according to some representative embodiments.

FIG. 3 shows, in accordance with some embodiments, a top view of the fry roast basket lid 14. While the lid can have any suitable characteristic (e.g., being substantially flat, having a portion of the lid that extends into the basket, comprising one or more: perforations, vents, handles, handle openings, sensors, draining hooks (e.g., on a top of the lid and/or in any other suitable location), handle configurations, heat exchange features for radiating heat (e.g., fins and/or heatsinks on top of and/or under the lid), and/or having any other suitable characteristic), FIG. 3 shows an embodiment in which the lid 14 has one or more bolt holes through which a bolt 18 (or any other suitable pin, clip, nail, pawl, strap, clamp, lock, screw, and/or any other suitable fastener) goes to secure the lid to the basket, and bolt holes 20 (and/or any other suitable coupling) to secure the lid to the centrifuge tub 50 (e.g., via one or more bolts and/or any other suitable fasteners). Additionally, FIG. 3 shows that, in some embodiments, the lid 14 defines one or more openings 28 for the basket's handle 12 and one or more vents 30 (e.g., to allow water vapor to escape from the basket).

FIG. 4 shows a bottom view of the fry roast basket 10 that illustrates that, in at least some embodiments, the basket comprises one or more perforated side walls 16, a perforated bottom 22 of the basket, and/or a perforated center partition 24 of the basket. That said, it should be noted that the various portions of the basket can have any other suitable configuration, including, without limitation, not being perforated, having one or more vents, being free from vents, and/or having any other suitable configuration.

Figure 5:
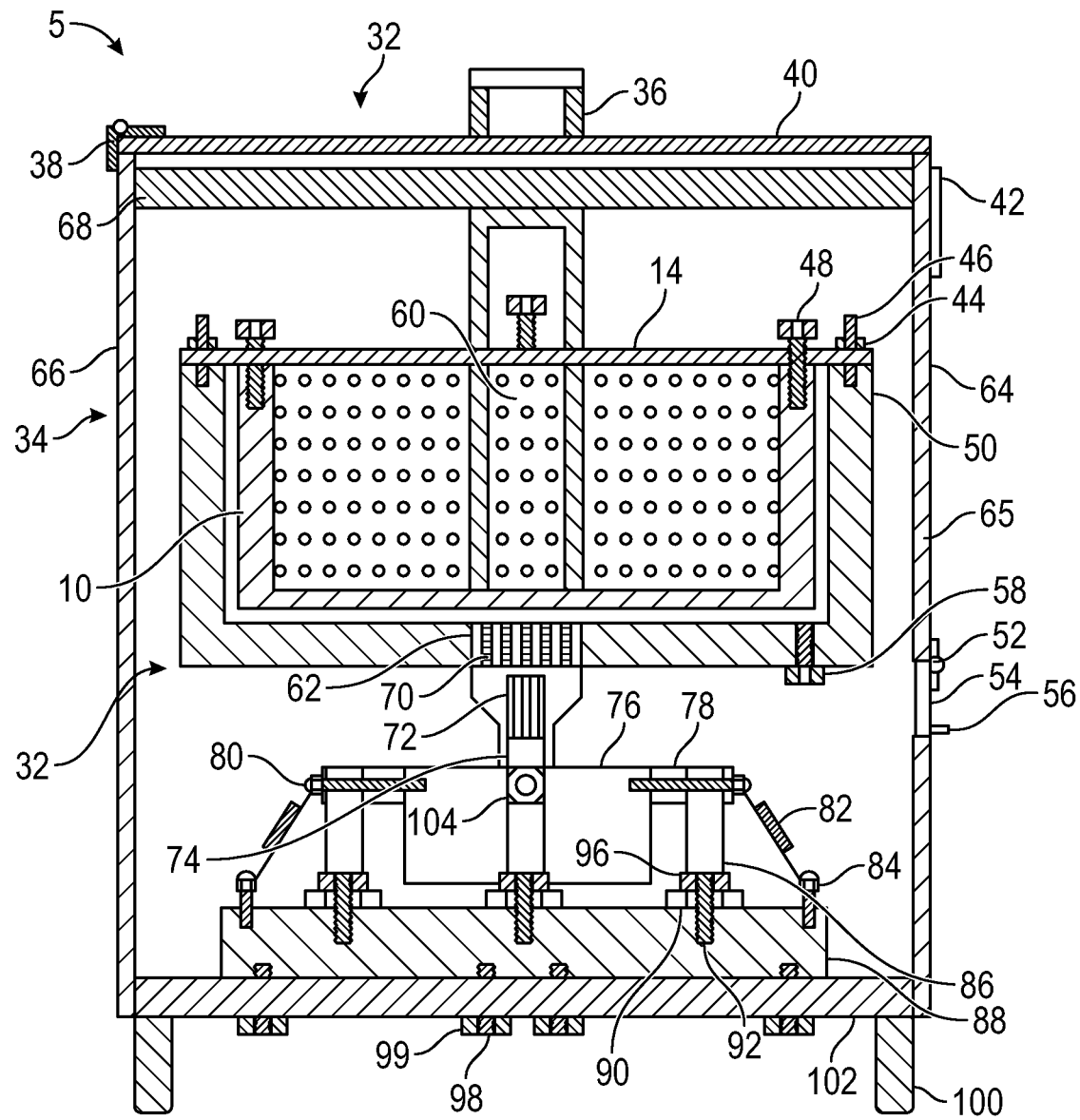
FIG. 5 illustrates a side, cross-sectional view of the fry roast basket disposed inside of a centrifuge tub and a centrifuge housing (e.g., in a centrifuge), according to some representative embodiments.

In accordance with some embodiments, FIG. 5 illustrates a cross-sectional interior side view of the fry roast basket 10 secured to the centrifuge 32 and the centrifuge housing 34, wherein the described centrifuge system 5 comprises one or more: centrifuge handles 36; hinges 38 (and/or other couplers) for a lid 40 of the centrifuge; display consoles, switches, buttons, controls, touchpads, touchscreens, inputs, and/or other user interfaces 42 at a front panel of the centrifuge housing (and/or at any other suitable location); centrifuge anchor nuts 44 and/or anchor bolts (and/or any other suitable clamp, catch, mechanical engagement, frictional engagement, and/or other mechanism or fastener that is configured to selectively lock the basket lid 14 to the centrifuge tub 50); basket lid wingnuts with bolts 48 (and/or any other suitable clamp, catch, mechanical engagement, frictional engagement, and/or other mechanism or fastener that is configured to selectively lock the lid to the basket);

centrifuge tubs 50; centrifuge access panel hinges 52; centrifuge access panel doors 54; centrifuge panel access door handles 56; centrifuge fry medium (e.g., oil) drain valves 58, valves, stopcocks, pumps, drains, and/or any other suitable component that is capable of removing the fry medium from the centrifuge tub (e.g., to allow for centrifugation of the food product, recirculation of the medium, storage of the medium in a reservoir, discarding of the medium, and/or any other suitable treatment of the fry medium)); perforated center basket partitions showing a handle connection 60; housings 62 covering a motor shaft spindle that connects a bottom of the centrifuge tub to the motor shaft, to a drive unit, and/or to any other suitable component that is configured to drive the centrifuge tub and/or the basket; panels (e.g., 64 and 66) of the centrifuge housing; interior panel supports 68 of the centrifuge; anchor screws (or bolts), screws 70 bolts, rivets, welds, and/or any other suitable coupling mechanism and/or fastener for connecting a motor shaft housing to the bottom of the centrifuge tub; spindles 72 of the motor shaft 74; centrifuge motors 76 and/or any other suitable type of actuators that can spin the centrifuge tub and/or the basket 10; vibration and/or mounting bushings 78; motor anchor bolts 80 (and/or any other suitable coupling mechanisms that can be used to hold the motor in position and/or to dampen movements of the motor); shock absorbers, struts, elastics, and/or damping springs 82; eye bolts 84 (and/or any other suitable coupling mechanism and/or fasteners) for the damping spring; motor support arms 86; damping blocks 88; bolt damping blocks 90; anchor bolts (or other couplers) 92 for the motor support arm; anchor nuts (and/or other couplers) 96 for a motor support arm; damping block bolts 98 and/or nut anchors 99; legs 100; bottom panels 102 of the centrifuge housing; motor anchor nuts 104; and/or any other suitable component.

Figure 6:
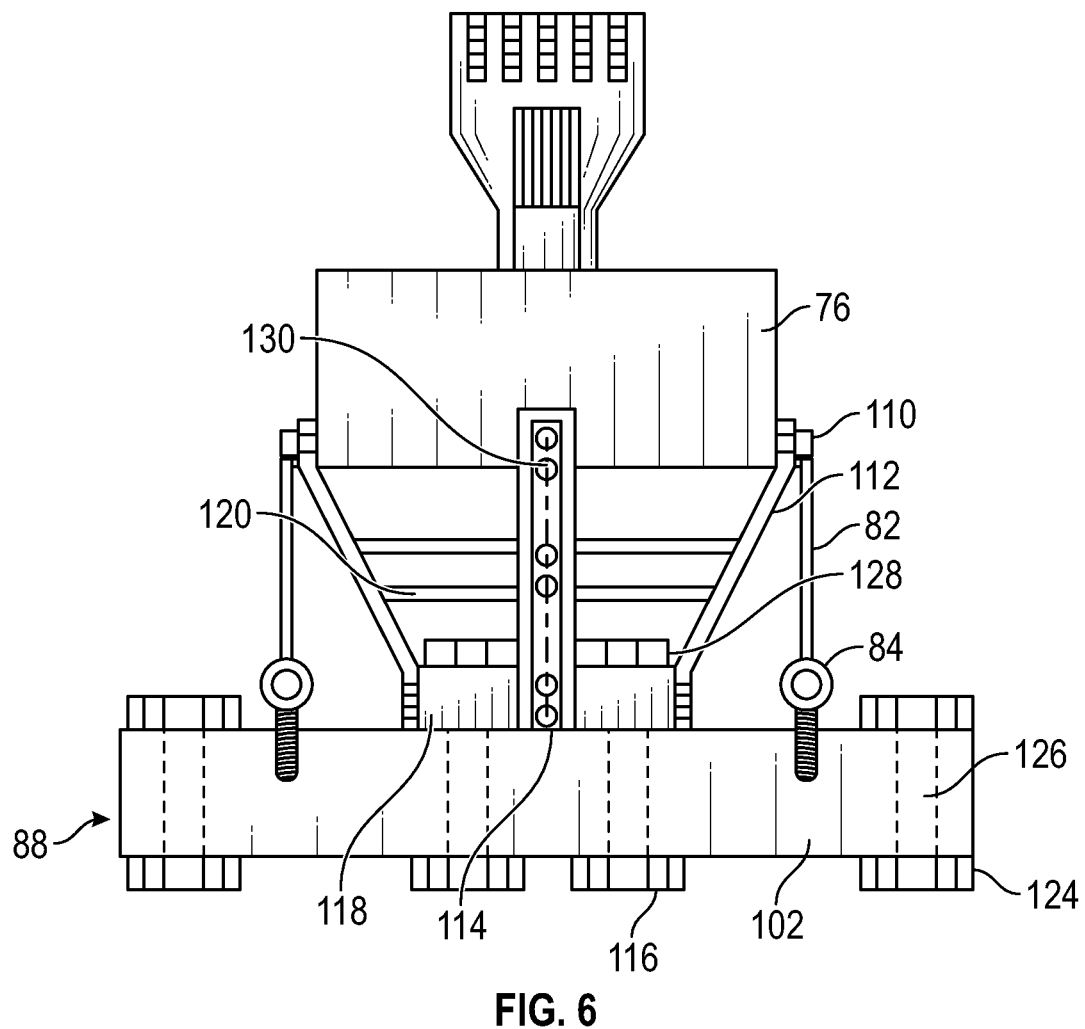
FIG. 6 illustrates a side, elevation view of a centrifuge motor, a motor shaft, and motor supports, according to some embodiments.

In accordance with some embodiments, FIG. 6 illustrates a side view of the centrifuge motor 76 and supporting structures, which can comprise any suitable component, including, without limitation, one or more eye bolts 84 (and/or other couplers) for the damping spring 82; bolts 110 (and/or any other suitable couplers or fasteners) for the motor and a damping spring attachment; motor support sway arms 112; anchor bolts 114 (and/or any other suitable coupler) for securing a motor support sway arm to the damping block; anchor bolts and nuts 116 attaching the damping block to the bottom housing panel of the centrifuge; damping block 118; oscillation control arms 120; bottom panels 102 of the centrifuge housing and/or main damping block 88; anchor nuts 124 (and/or other couplers); anchor bolts 126 (or other suitable couplers); anchor nuts 128 securing the damping block to any suitable portion (e.g., the bottom housing panel) of the centrifuge; damping spring attachments 130 (e.g., at any suitable location); and/or any other suitable component or characteristic.

With respect to the foregoing, it should be noted that while the motor sway arms 112 (in FIG. 6) and the motor support arms 86 in FIG. 5 can perform any suitable function, in some cases, they perform much the same function, while not necessarily being the same in length, width, and/or shape. In particular, in some embodiments, they reduce initial sway, oscillation, vibration, and/or torque of centrifuge tub 50 until the motor, motor shaft/spindle, basket, and/or the centrifuge tub physically shift their geometric center and rotate about the new center of mass in proportion to the eccentric mass (e.g., the food product and the remaining fry medium). In this regard, the ability for the motor, shaft/spindle, and/or housing to shift their geometric center and rotate around a new center of mass can balance the motor, the centrifuge tub, and/or the basket.

Figure 7:
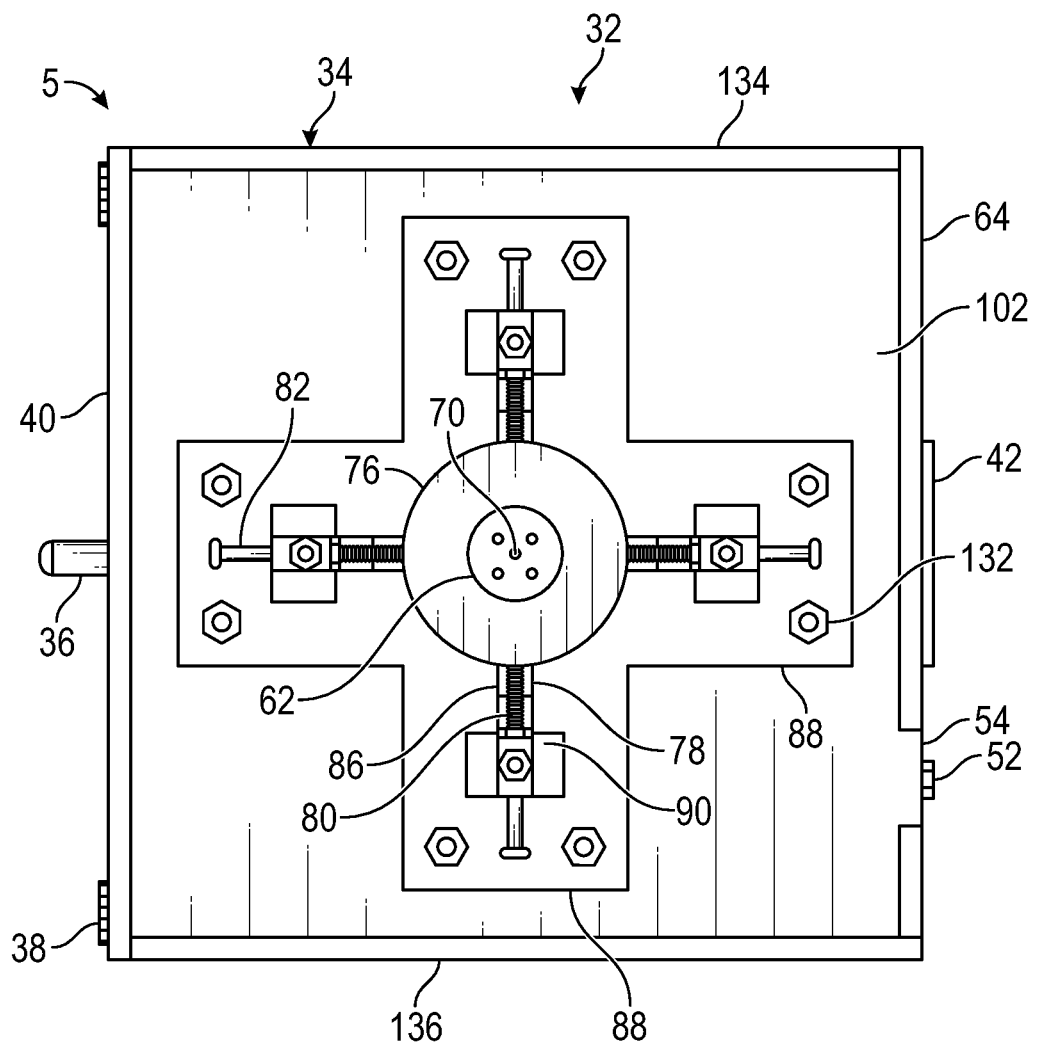
FIG. 7 illustrates a top, plan view of the centrifuge motor, damping supports, and a main damping block, according to some representative embodiments.

In accordance with some embodiments, FIG. 7 illustrates a top view of an example of the centrifuge motor 76, the damping supports, and the main damping block 88, showing that some embodiments of the system 5 comprise one or more front housing panels 64 of the centrifuge; display consoles (and/or other user interfaces) on the front panel (and/or in any other suitable location); hinges 52 (or other joints or couplers) of the panel access door 54; anchor bolts and nuts (and/or any other suitable couplers and/or fasteners) securing the main damping block 88 to the bottom panel 102 of the centrifuge housing; centrifuge motors 76, actuators, transmissions, gear boxes, belts, pulleys, and/or any other suitable components that are capable of spinning the centrifuge tub 50 and/or basket 10; centrifuge shaft spindle housings 62 showing a pattern of the anchor screws 70 (or other couplers and/or fasteners) that are configured to secure the centrifuge tub 50 to the centrifuge housing 34; top panel lid hinges 38; first side panels 134 of the housing of the centrifuge 32; second side panels 136 of the housing of the centrifuge; handles 36 (with the lid being shown in an open position); elastics, shocks, dampeners, damping springs 82, and/or any other suitable component that is capable of dampening movements of the centrifuge tub; damping blocks 88 (e.g., main damping blocks and/or any other suitable damping blocks); motor support arms 86; motor anchor bolts 80; top panels 40 (or lids) of the centrifuge housing (shown in an open position); centrifuge motor anchor bolts 132; vibration and mounting bushings 78; and/or any other suitable components.

Figure 8:
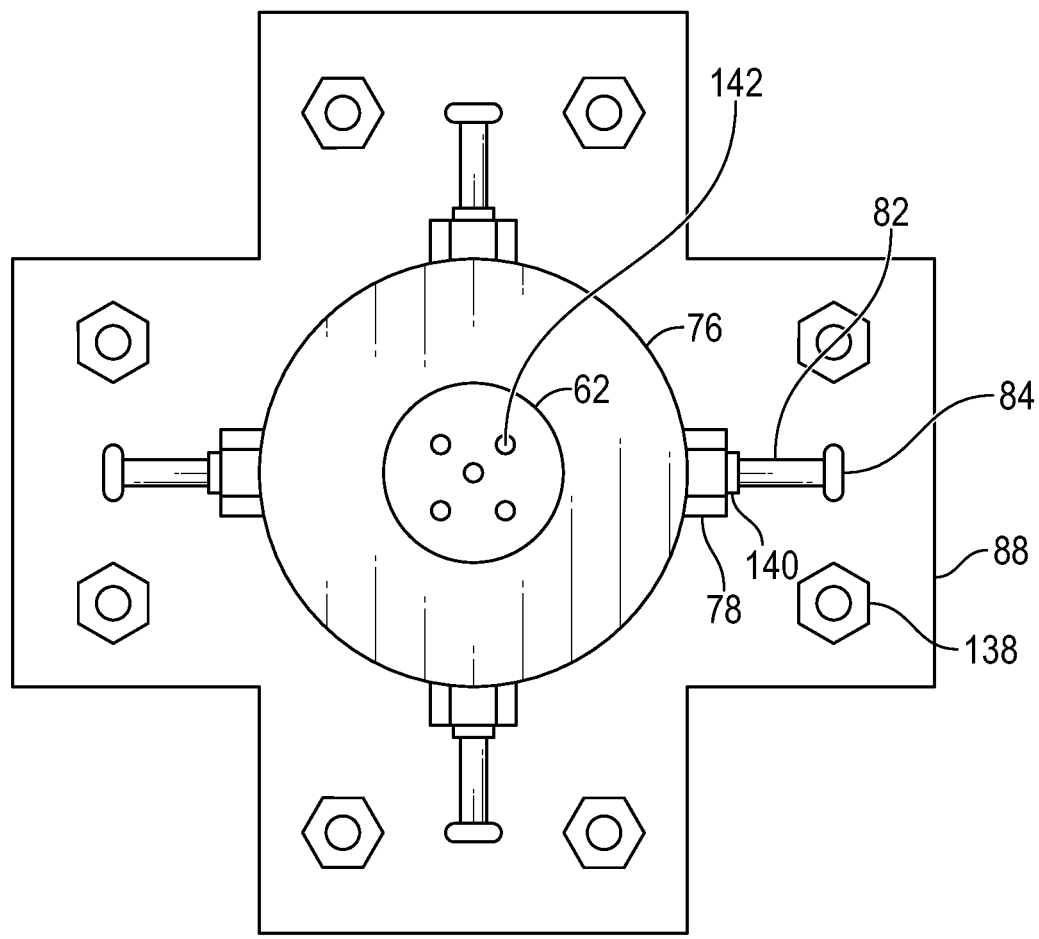
FIG. 8 illustrates a top, plan view of the centrifuge motor and supports, according to some representative embodiments.

In accordance with some embodiments, FIG. 8 shows a top view illustrating the centrifuge motor 76 and supports, comprising one or more main damping blocks 88; main damping anchor bolts 138 (and/or any other suitable couplers and/or fasteners); eye bolts 84; damping springs 82; vibration and mounting bushings 78; bolts 140 and/or other couplers and/or fasteners for motor and damping spring attachment; centrifuge motors 76; centrifuge shaft spindle housings 62; anchor screws 142 for securing the centrifuge tub to the centrifuge housing 34; and/or any other suitable components.

Figure 9:
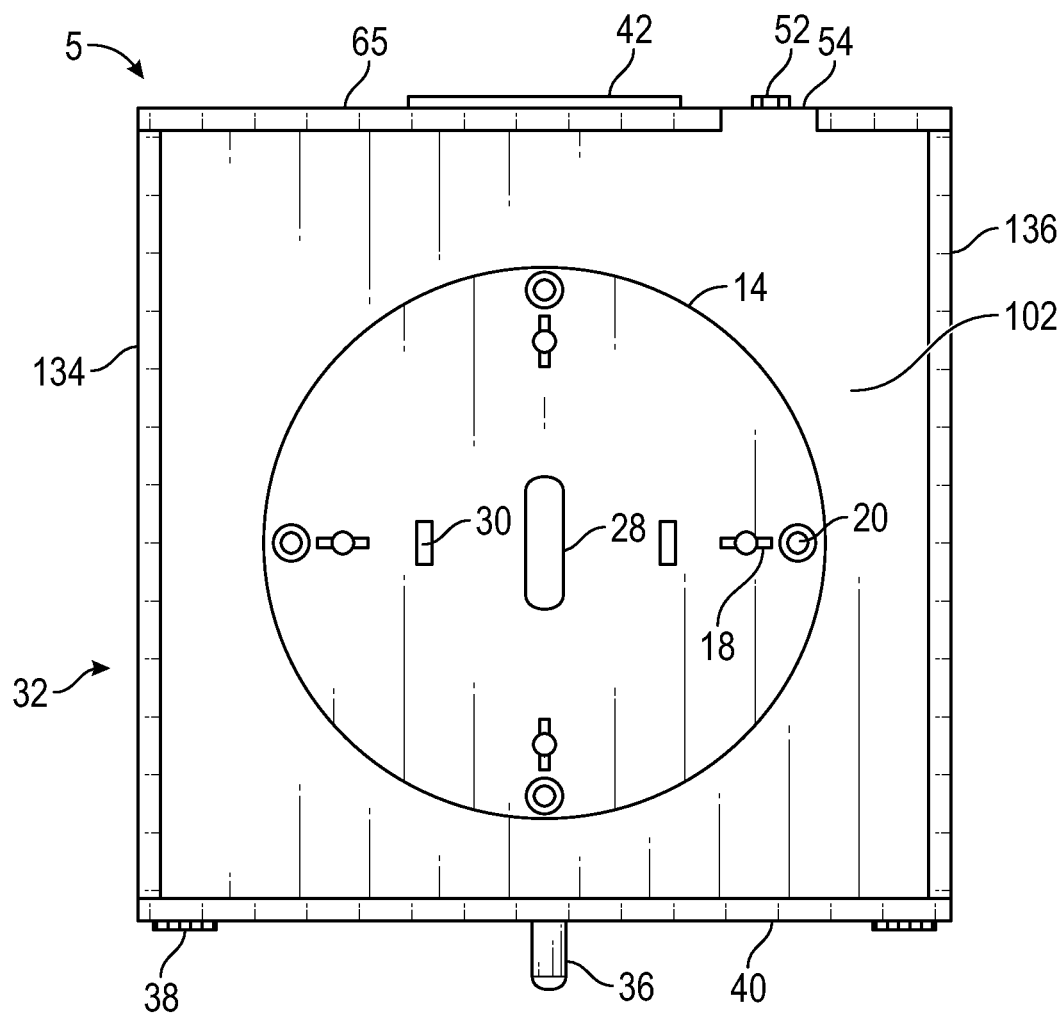
FIG. 9 illustrates a top, plan view of the centrifuge and the centrifuge housing with a top panel lid in an open position, according some representative embodiments.

FIG. 9 shows, in accordance with some embodiments, a top view of the centrifuge 32 with the top panel lid 40 in an open position, showing the position of the basket 10 secured into the centrifuge, and showing that, in some embodiments, the system 5 comprises one or more bottom panels 102 of the centrifuge housing 34, first side panels 134 of the centrifuge housing; access panels 54; hinges 52 (or any other suitable couplers) of the access panel; display consoles 42; front panels 65 of the centrifuge housing; second side panels 136 of the centrifuge housing; hinges 38 (and/or any other suitable couplers) that are coupled with the lid 40; handles 36 (e.g., shown with the lid 40 in an open position); fry roast basket lids 14, showing a position of the basket handle 12; bolts, wingnuts 18, and/or any other suitable couplers and/or fasteners to selectively couple the lid to the basket; centrifuge tub bolts 21 and/or any other suitable couplers and/or fasteners to couple the lid to the centrifuge tub; water vapor vents 30; and/or any other suitable component. Thus, in accordance with some embodiments, a fry basket 10 that is used in a deep fryer (e.g., at a restaurant, home, commercial enterprise, etc.) can be removed from the fryer and then be placed in and centrifuged in the described centrifuge 32.

Figure 10:
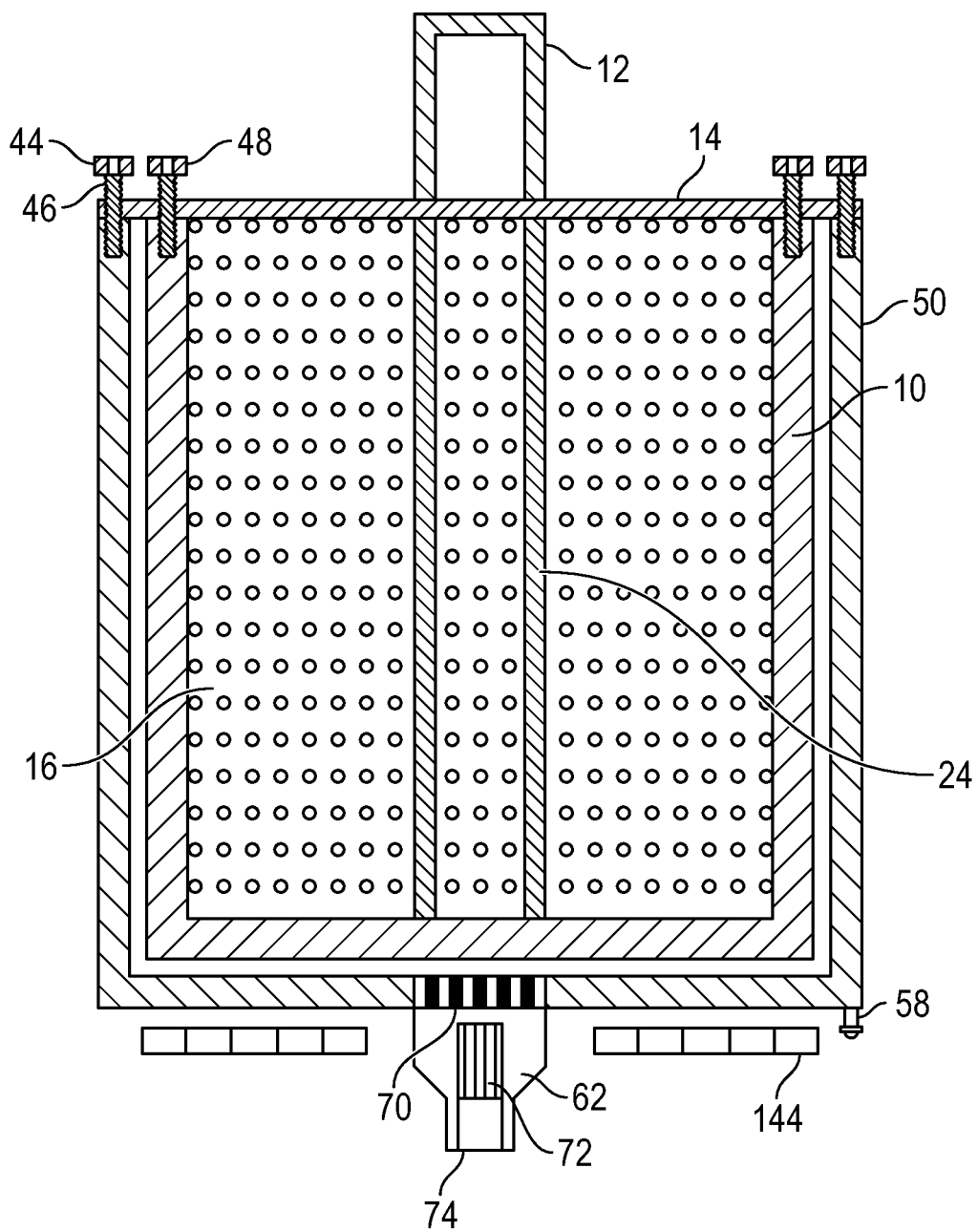
FIG. 10 illustrates a side, cross-sectional view of the fry roast basket in the centrifuge with one or more electromagnetic induction heating coils located adjacent to the centrifuge tub, according to some representative embodiments.

In some other embodiments, the food product can be fried and centrifuged in the same apparatus. In this regard, the centrifuge tub 50, the basket 10, and/or the food product can be heated in any suitable manner, including, without limitation, through the use of one or more heating elements, flames, microwave heaters (e.g., magnetrons, wave guides, stirrers, etc.), induction heaters, electric coils, infrared heaters, and/or other suitable type or combination of heaters. By way of non-limiting illustration, FIG. 10 shows that, in accordance with some embodiments, the fry roast basket 10 is disposed in the centrifuge 32 with one or more electromagnetic induction heating coils 144. In particular, FIG. 10 shows that, in some embodiments, the described centrifuge and/or frying system (or apparatus) 5 includes one or more fry roast basket lids 14; handles 12 of the fry roast basket; centrifuge tubs 50 (or centrifuge extraction tubs); stopcocks, drains, pumps, drain valves 58, and/or any other suitable component that is capable of removing fry medium from the centrifuge tub; electromagnetic induction heating coils 144 and/or any other suitable heater; centrifuge anchor bolts, wingnuts 48, and/or any other suitable couplers to selectively couple the lid to the basket; fry roast basket bolts 46, wingnuts 44 (or anchor nuts), and/or any other couplers and/or fasteners to selectively couple the lid to the centrifuge tub; anchor screws 70 and/or any other suitable couplers to connect the motor shaft housing to a bottom of the centrifuge tub; housing coverings 62 for the motor shaft spindle 72 that connects a bottom of centrifuge tub 50 to a motor shaft (and/or to any other suitable component that can pass power from a motor or other actuator) to the centrifuge tub and/or the basket; centrifuge motor shafts 74; perforated center partitions 24 (and/or any other suitable partitions) of the basket; perforated side walls 16 of the basket; and/or any other suitable component.

It should be noted that while some embodiments are configured to maintain the position of the heater with respect to the rotational movement of the centrifuge tub (e.g., the heater rotates with the tub), FIG. 10 shows that, in some embodiments, the centrifuge tub 50 is configured rotate while the heater (e.g., coils 144) maintains its position. Indeed, in some embodiments in which the heater comprises an inductive heater, flames, and/or any other suitable heating mechanism, the centrifuge (e.g., comprising metal and/or any other suitable material that can be heated by the inductive heater, where the heating unit comprises an inductive heater) can spin with respect to the heating unit.

Figure 11:
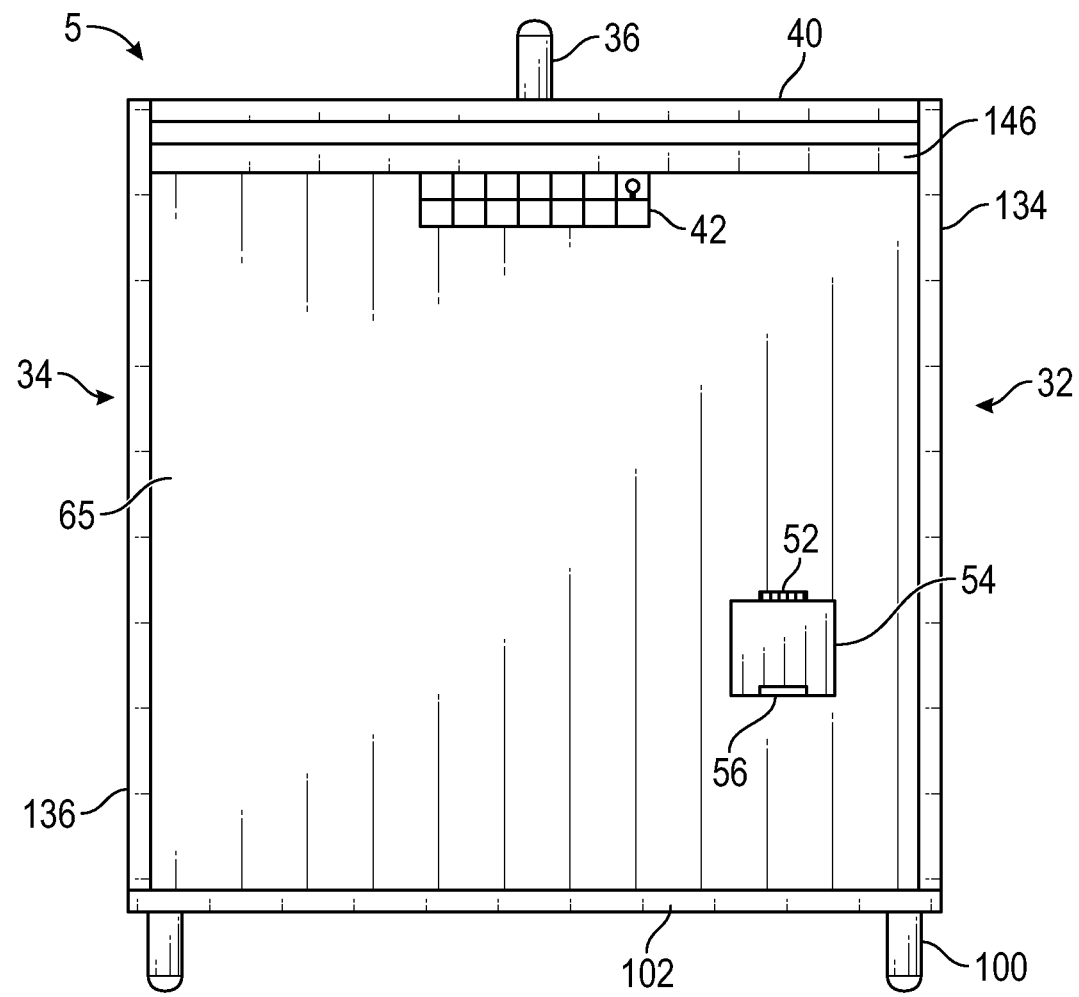
FIG. 11 illustrates a front, elevation view of the centrifuge housing, showing a computer control console display (and/or user interface), a handle, and a front panel access door, according to some representative embodiments.

FIG. 11 shows, in accordance with some embodiments, the described centrifuge 32 comprises at least one: front 65 of the centrifuge housing 34; handle 36 for the centrifuge lid 40; front support 146 of the front panel; first side panel 134 of the housing of the centrifuge; display console 42, control panel, switch, touchpad, touchscreen, button, and/or any other suitable control for the apparatus; access panel door 54; hinge 52 and/or any other suitable coupler and/or fastener for the access panel door; handle 56 of the access panel door; leg 100 of the centrifuge; bottom panel 102 of the centrifuge housing 34; second side panel 136 of the centrifuge; front panel 65 of the centrifuge housing; and/or any other suitable component.

Figure 12:
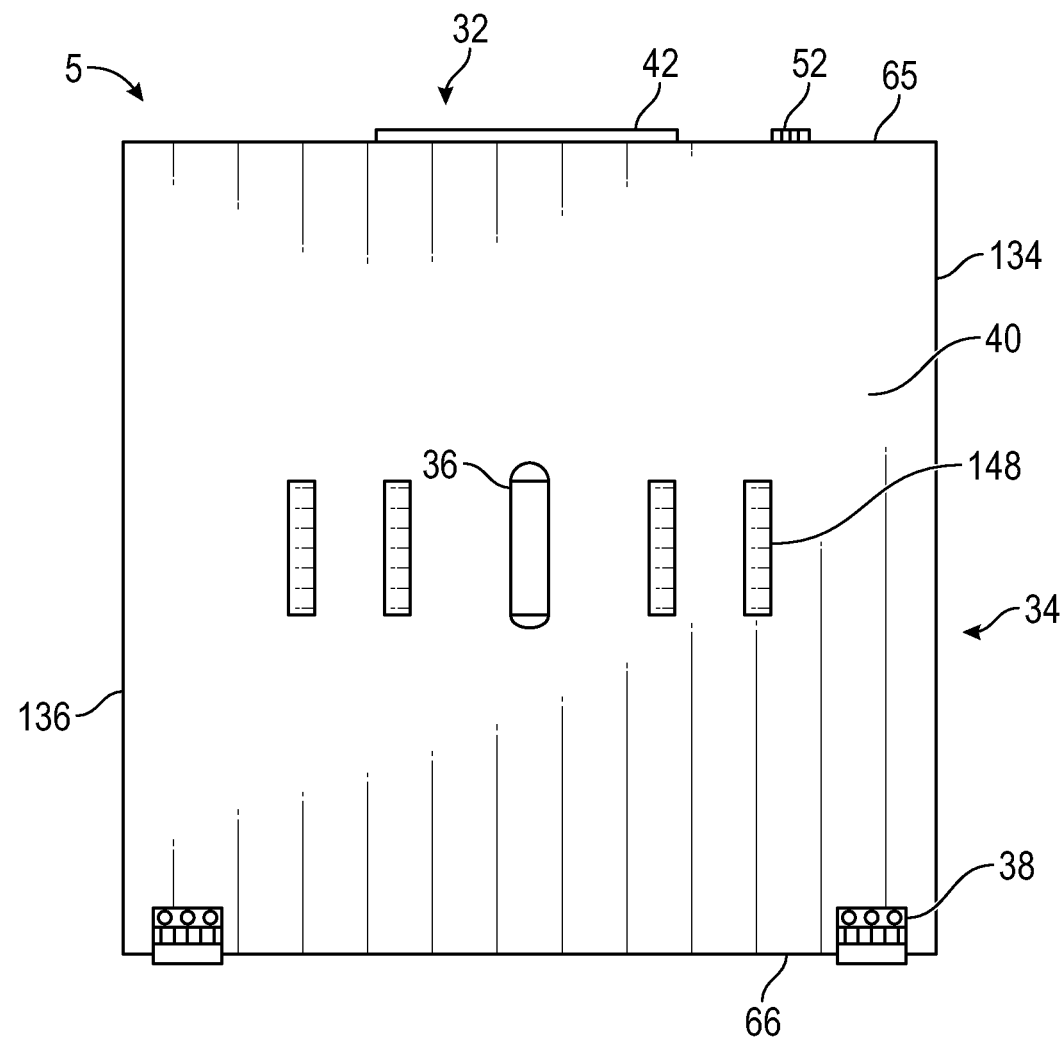
FIG. 12 illustrates a top, plan view of the centrifuge housing with hinges on its lid and a handle, according to some representative embodiments.

FIG. 12 depicts a top down view (top) of the centrifuge 32, showing that in accordance with some embodiments, the centrifuge 32 comprises one or more: display consoles 42 and/or any other suitable control panels; hinges 52 of a panel access door; front panels 65 of the centrifuge; first side panels 134 of the centrifuge; top panels 40 (or lids) of the centrifuge; ventilation slats 148, openings, filters, and/or any other suitable venting component in a top panel (and/or any other suitable portion) of the centrifuge; hinges 38 for the top panel or lid; back panels 66 of the centrifuge housing; second side panels 136 of the centrifuge housing; handles 36 of the lid; and/or any other suitable component.

Figure 13:
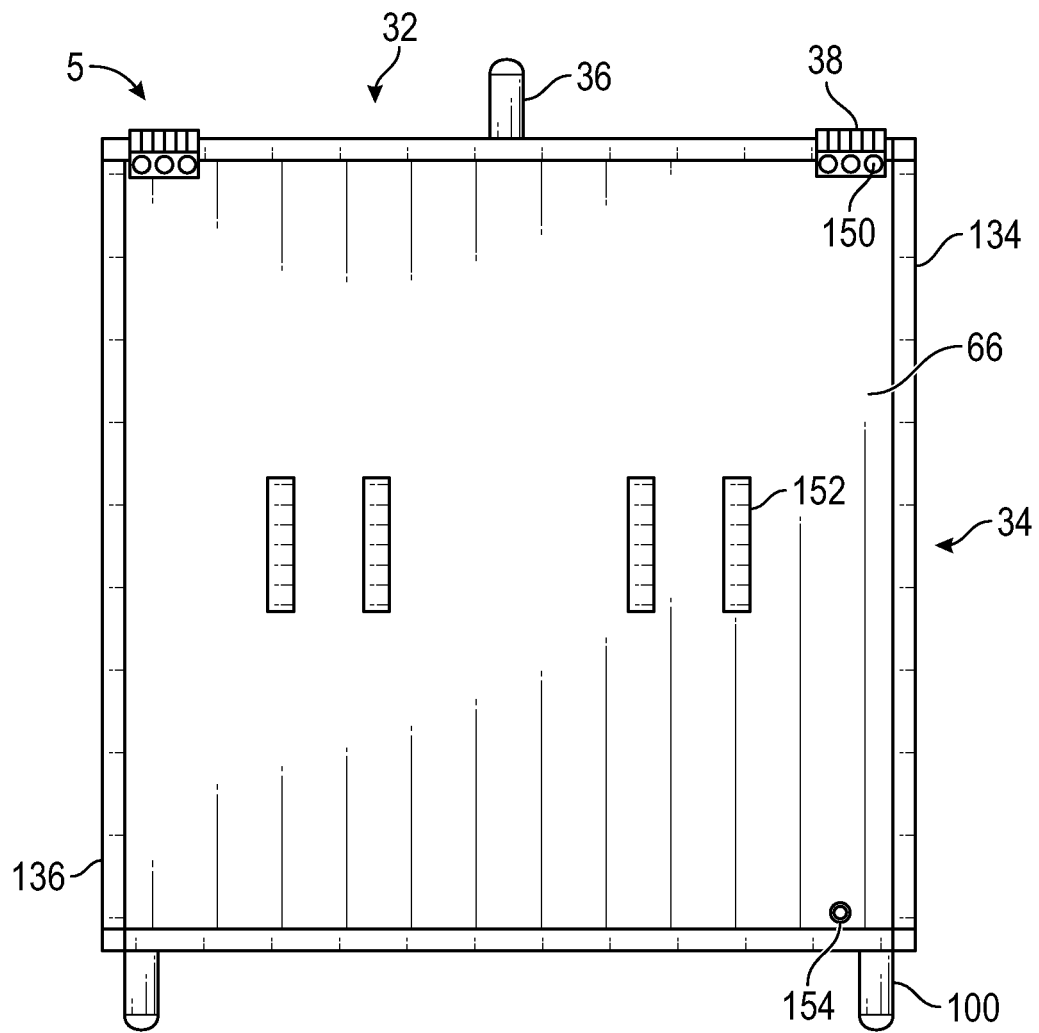
FIG. 13 illustrates a back, side view of the centrifuge, according to some representative embodiments.

FIG. 13 shows a back side view of the centrifuge 32, illustrating that, in accordance with some embodiments, the centrifuge comprises one or more: handles 36 (e.g., that couple to the lid 40 and/or to any other suitable portion of the centrifuge); hinges 38 and/or any other suitable couplers and/or fasteners that are configured to couple the lid to the centrifuge; first side panels 134 of the centrifuge; mounting screws 150 or other couplers (or fasteners) for the hinge 38; back panels 66 of the centrifuge; back panel venting slots 152, vents, filters, apertures, and/or any other suitable component that is configured to allow air, moisture, and/or heat to exit and or to enter into the centrifuge; legs 100; power supply inlets 154 to the centrifuge; second side panels 136; and or any other suitable components.

Figure 14:
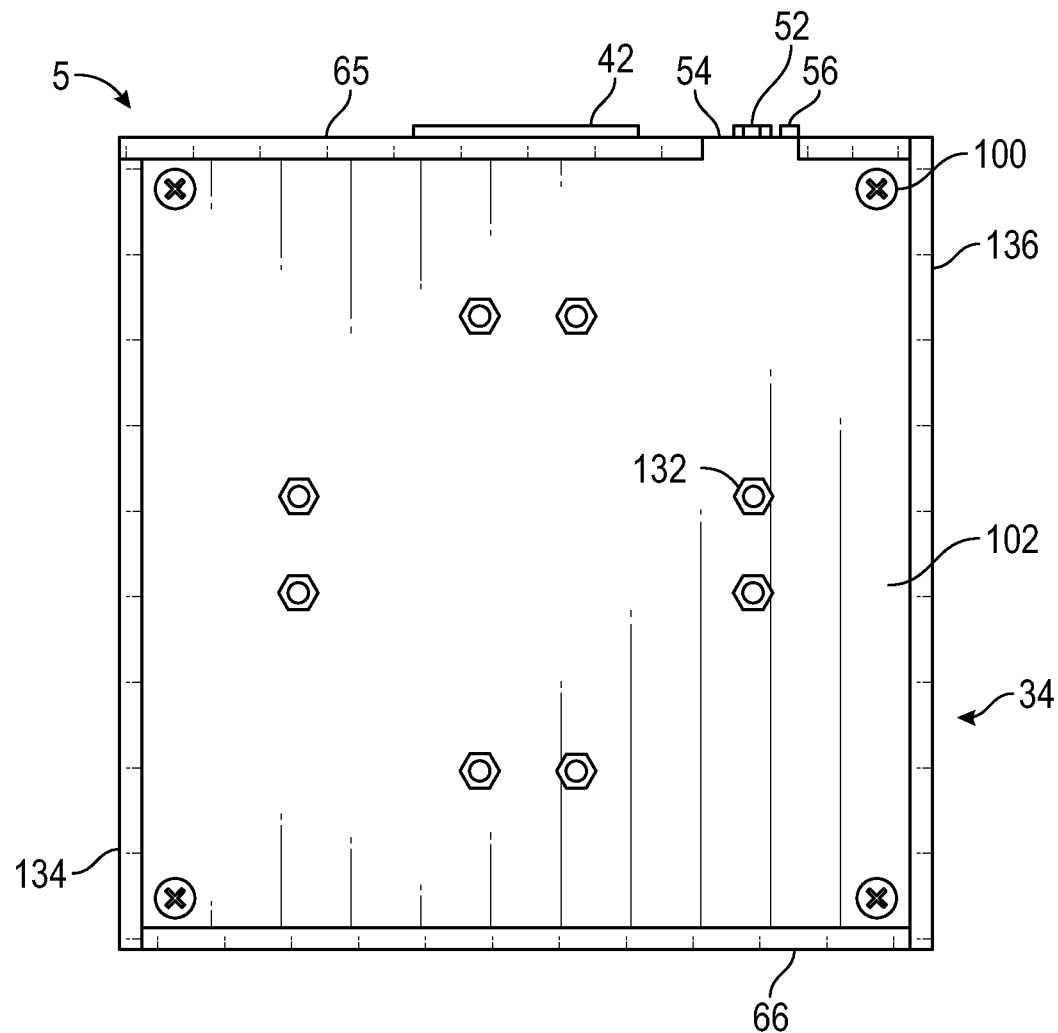
FIG. 14 illustrates a bottom plan view of the centrifuge housing comprising an anchor bolt pattern used to secure the centrifuge main damping block, the motor, and the motor supports to a centrifuge bottom panel housing, according to some representative embodiments.

FIG. 14 shows a bottom view of a representative embodiment of an anchor bolt 132 pattern that is used to secure the centrifuge main damping block 88, the motor 76, and/or the motor support arms 86. In particular, FIG. 14 shows that, in some embodiments, the described system 5 comprises one or more displays 42 and/or any other suitable controls on the front control panel 65 (and/or in any other suitable location); access panel doors 54; hinges 52 (and/or any other suitable coupler) for the access panel door; handles 56 for the access panel door; legs 100 on a bottom panel 102 of the centrifuge (and/or in any other suitable location); first side panels 134 of the centrifuge; centrifuge motor anchor bolts 132; second side panels 136 of the centrifuge; and/or any other suitable components.

Figure 15:
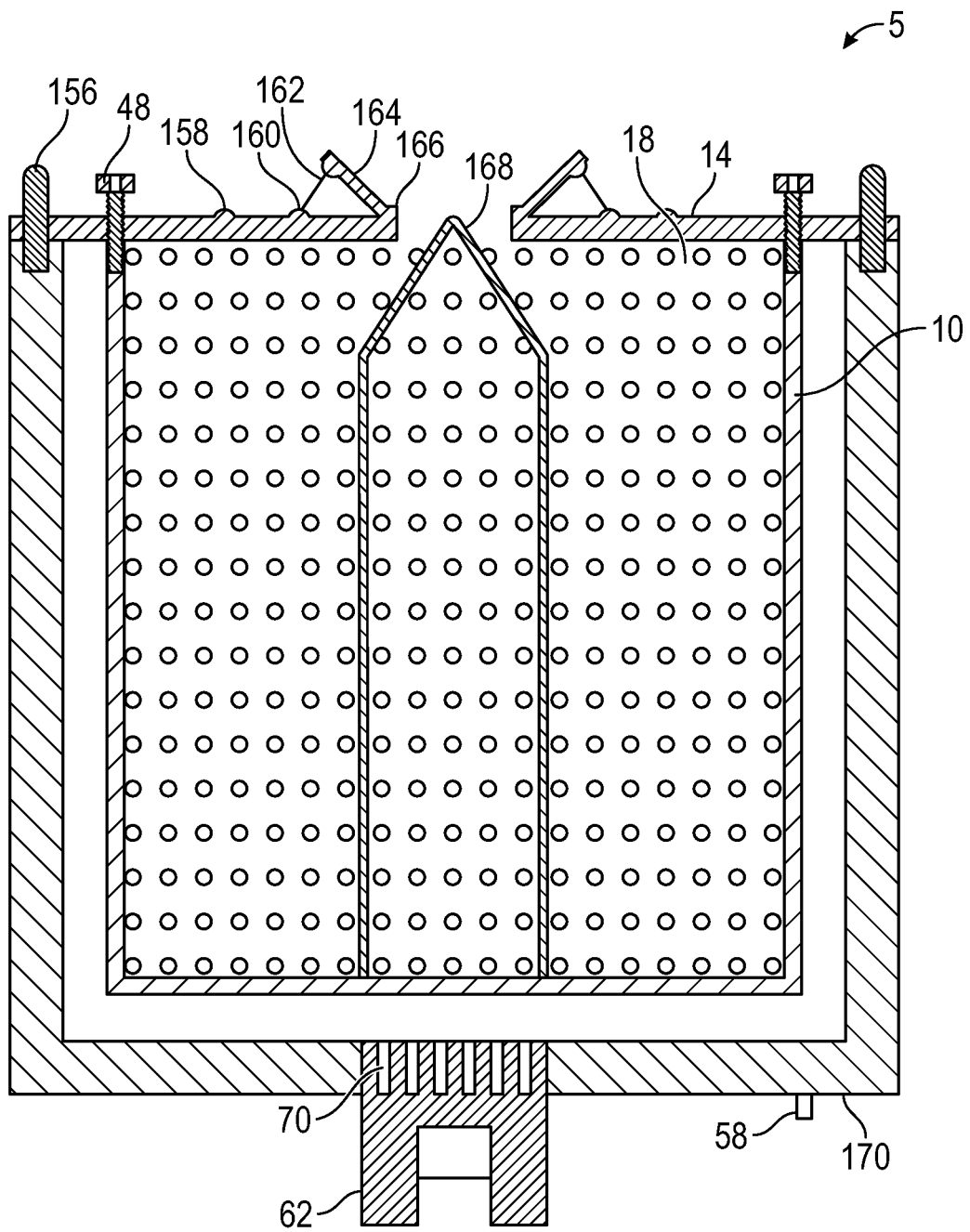
FIG. 15 illustrates a side, cross-sectional view of the centrifuge and the fry roast basket, wherein doors of the fry roast basket are open in accordance with some representative embodiments.

In accordance with some embodiments, FIG. 15 illustrates a side, cross-sectional view of an embodiment comprising the oil roast basket 10 having multiple doors 164 in an open position. In particular, FIG. 15 shows that, in accordance with some embodiments, the system 5 includes one or more centrifuge bolts 156 and/or any other suitable couplers and/or fasteners that are configured to couple the lid 14 and/or the basket 10 to the centrifuge tub 50; fasteners 158 (e.g., T-handle tight hold draw latches, gasket sealing draw latches, gasket sealing draw latches with a safety catch, heavy duty latch style toggle clamps, strikeless draw latches, and/or any other suitable type of fastener, including, without limitation, those discussed herein) for one or more lid door arms; anchors 160 for the lid door arms; lid door arms 162; lid doors 164; lid door hinges; oil basket lids 14; center partitions 168 of the basket 10; perforated side walls 16 of the basket; wingnuts, bolts 48, and/or any other suitable coupling mechanism, couplers, and/or fasteners that are capable of selectively locking the lid to the basket; centrifuge roast extraction tubs 170; tub drain valves 58, drains, pumps, and/or any other suitable mechanism that can be used to selectively drain fry medium from (and/or to refill) the tub; screws 70 and/or any other suitable mechanism, couplers, and/or fasteners for securing the tub to the centrifuge shaft housing; centrifuge shaft housings 62; and/or any other suitable components.

Figure 16:
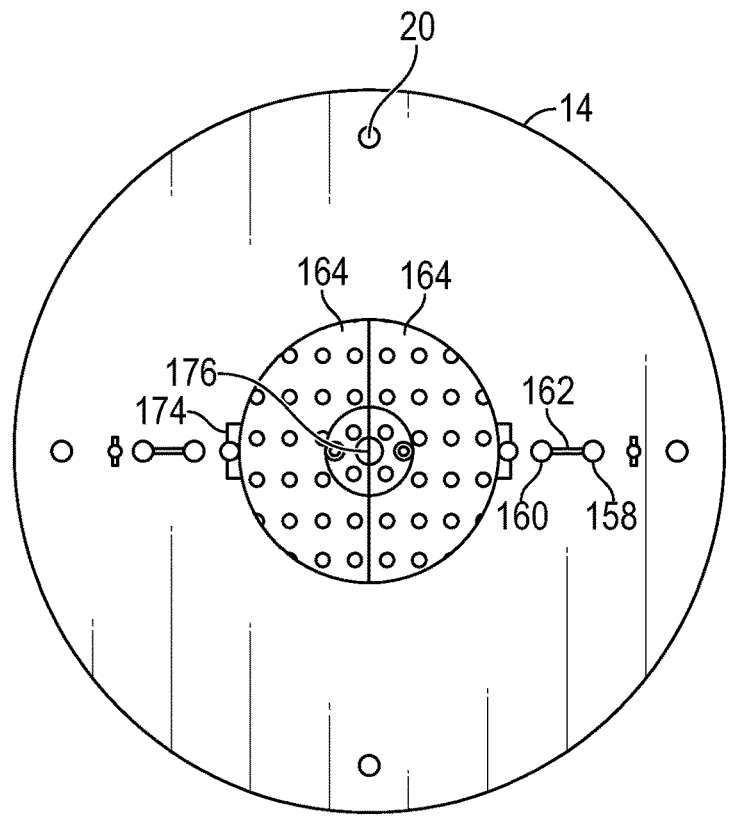
FIG. 16 illustrates a top, plan view of an embodiment of the fry roast basket with funnel lid doors folded down, in accordance with some representative embodiments, wherein the funnel lid doors are shown as being transparent, for illustration purposes.

In accordance with some embodiments, FIG. 16 depicts a top view of an embodiment of the oil roast basket 10, showing that while the basket can comprise any suitable component, in some embodiments, it comprises one or more oil roast basket lids 14; holes 20 through which the centrifuge bolts (or any other suitable fastener and/or coupler) extend; oil roast basket lid doors (shown as being transparent in FIG. 16); oil basket lid hinges 174; top points 176 of the center partition 24 of the oil roast basket; fasteners 158 158 (e.g., T-handle tight hold draw latches, gasket sealing draw latches, gasket sealing draw latches with a safety catch, heavy duty latch style toggle clamps, strikeless draw latches, and/or any other suitable type of fastener, including, without limitation, those discussed herein) for the lid door arm; lid doors 164; lid door arms 162; anchors 160 for the lid door arms; and/or any other suitable components.

Figure 17:
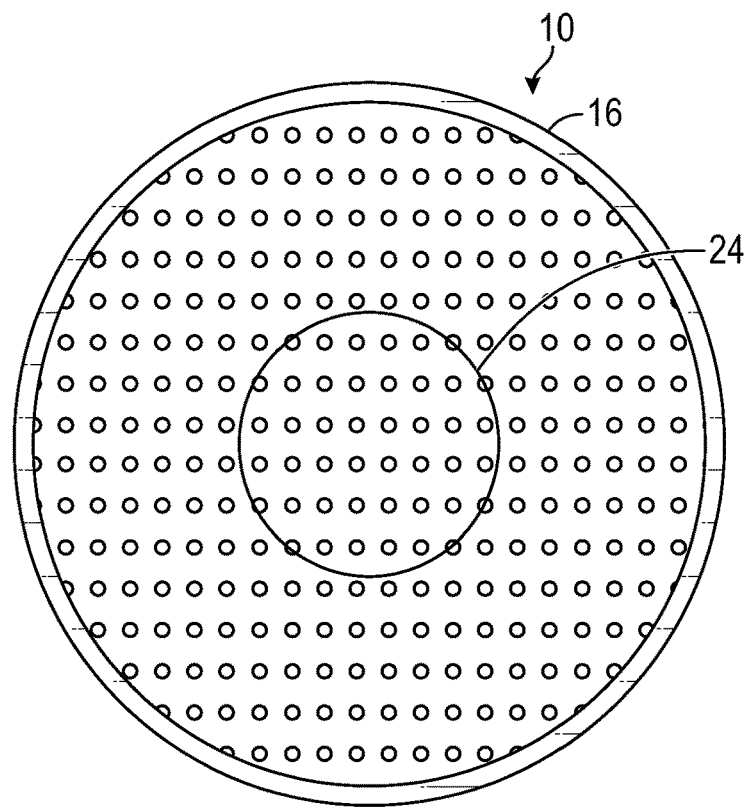
FIG. 17 illustrates a bottom, plan view of the fry roast basket, showing a center circular partition, in accordance with some representative embodiments.

FIG. 17 shows, in accordance with some embodiments, a bottom view of the oil roast basket 10. In this regard, while the basket can have any suitable component, FIG. 17 shows that in some embodiments it comprises one or more oil roast basket perforated side walls 16, perforated center partitions 24, and/or perforated floors 22.

Figure 18:
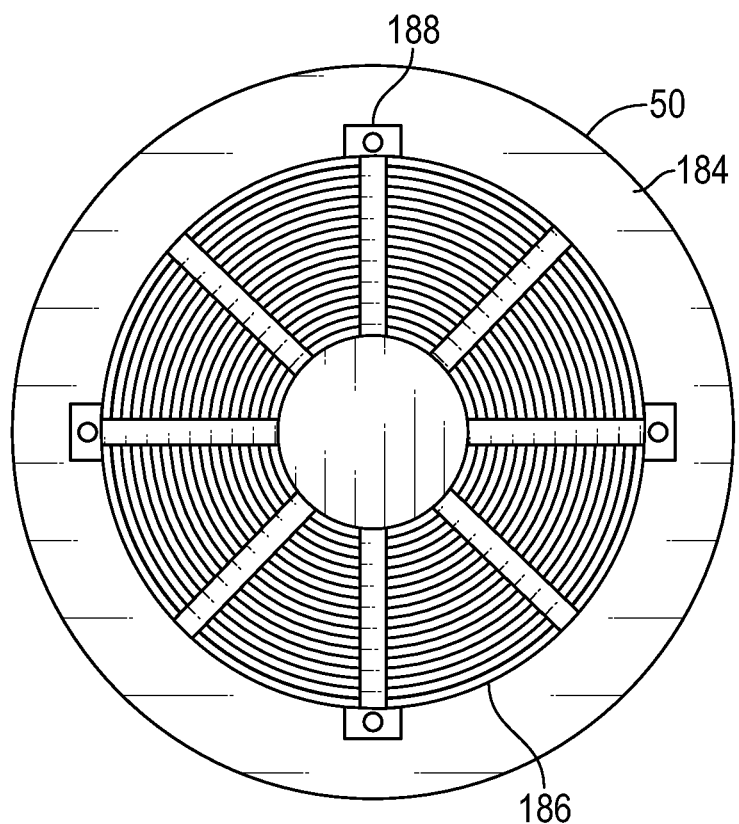
FIG. 18 illustrates a bottom, plan view of an embodiment of the electromagnetic induction heating coils and a centrifuge roast extraction tub (also referred to as the centrifuge tub), in accordance with some representative embodiments.

FIG. 18 shows, in accordance with some embodiments, a bottom view of electromagnetic induction heating coils and a centrifuge roast extraction tub 50, comprising one or more of: a bottom 184 of the centrifuge tub 50; electromagnetic induction heating coils 186; anchor points 188 where one or more bolts, rivets, welds, pins, clamps, screws, threaded engagements, mechanical engagements, nails, snaps, and/or any other suitable fastener and/or coupler can be used to secure a support arm (or any other suitable component) to the induction heating coils; and/or any other suitable components.

Figure 19:
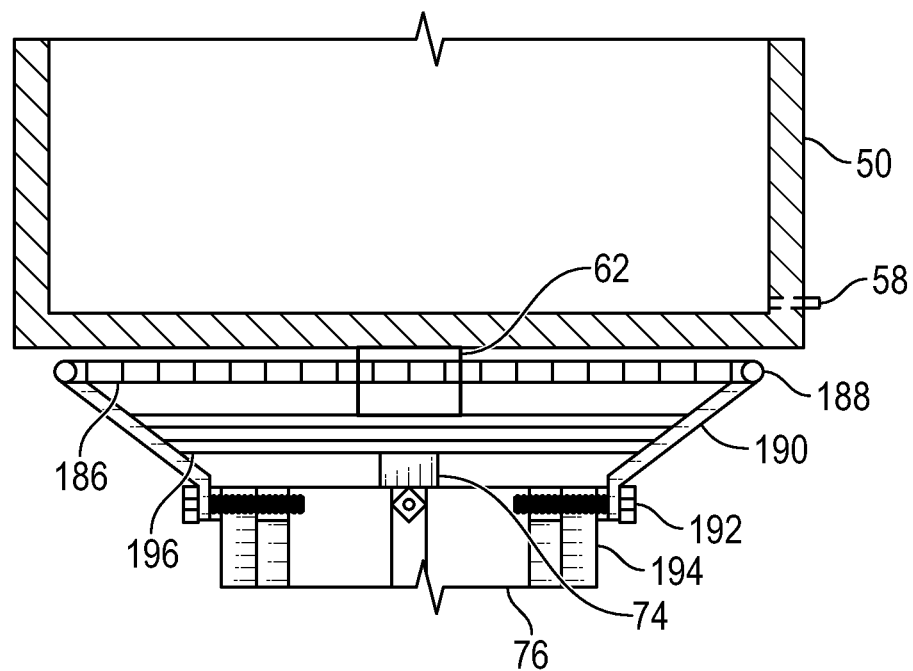
FIG. 19 illustrates a side, elevation, cutaway view of the electromagnetic induction heating coil assembly attached to the centrifuge motor and its position relative to the centrifuge tub and motor shaft housing, in accordance with some representative embodiments.

In accordance with some embodiments, FIG. 19 depicts a side view illustrating the centrifuge roast extraction tub 50, the centrifuge motor 76, and the electromagnetic induction heating coil assembly 186. In this regard, FIG. 19 shows that, in some embodiments, the system 5 includes one or more centrifuge tubs 50; drain valves 58, drains, pumps, filters, and/or other suitable component that is capable of draining and/or refilling the centrifuge tub; anchor points 188 where one or more bolts (and/or any other suitable fastener or coupler) secures a support arm to the electromagnetic induction heating coils 186; support arms 190 for the electromagnetic induction heating coils; attachment points 192 of one or more support arms to the centrifuge motor; bushings 194 for the support arms; centrifuge motors 76; sway arm supports 196 for the electromagnetic induction heating coil assembly; electromagnetic induction heating coils 186; centrifuge motor shaft housings 62; centrifuge motor shafts 74; and/or any other suitable components.

Figure 20:
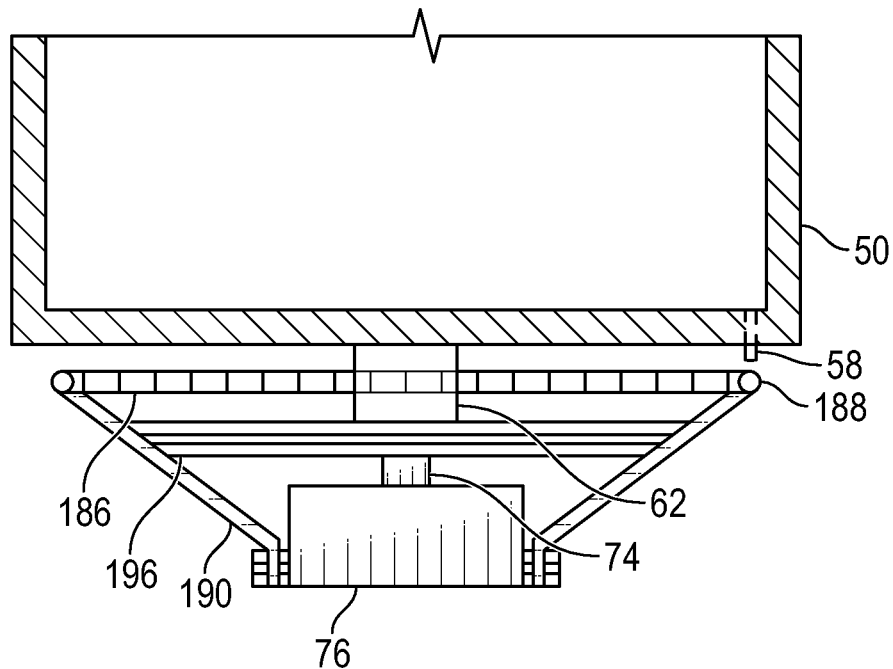
FIG. 20 illustrates a side, elevation, cutaway view of the electromagnetic induction heating coil assembly attached to the centrifuge motor and its position relative to the centrifuge tub and motor shaft housing, in accordance with some representative embodiments.

In accordance with some embodiments, FIG. 20 depicts a side view of an embodiment of a centrifuge roast extraction tub 50, a centrifuge motor 76, and an electromagnetic induction heating coil assembly 186. In particular, FIG. 20 shows an embodiment comprising one or more centrifuge tubs 50; anchor points 188 where a bolt, pin, screw, clamp, and/or any other suitable fastener or coupler secures one or more support arms to the electromagnetic induction heating coils 186; support arms 190 for the electromagnetic induction heating coils; sway arm supports 196 for the electromagnetic induction heating coil assembly; centrifuge motor shafts 74; centrifuge motors 76; centrifuge motor shaft housings 62; drain valves 58 and/or any other suitable component that can be used to drain and/or fill the centrifuge tub; and/or any other suitable components.

Figure 21:
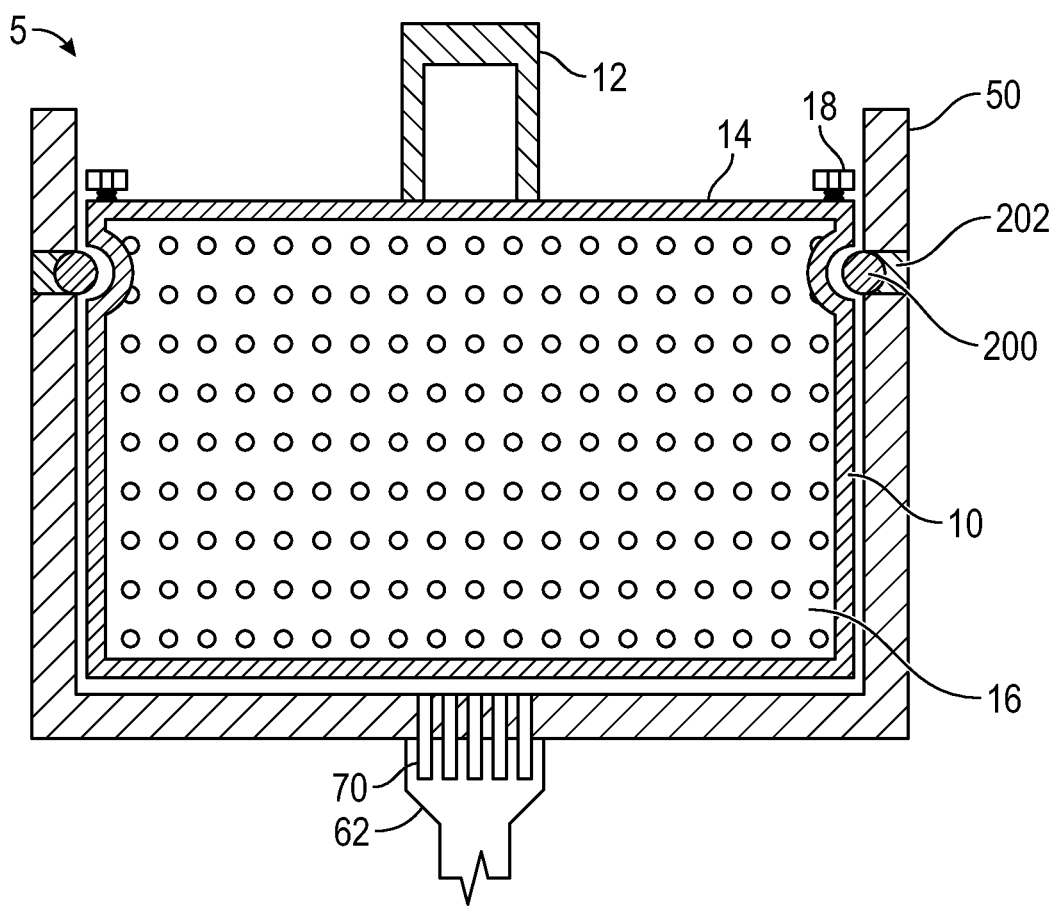
FIG. 21 illustrates a side, cross-sectional view of an embodiment of the centrifuge roast extraction tub with the fry roast basket secured in the tub and in the centrifuge (not shown in this drawing) along with the centrifuge motor shaft housing and anchor screws, in accordance with some representative embodiments.

In accordance with some embodiments, FIG. 21 illustrates a side view of an embodiment of the centrifuge roast extraction tub 50 with the basket 10 secured in the tub. In particular, FIG. 21 shows that some embodiments of the system 5 comprise one or more oil roast basket handles 12; centrifuge tubs 50; wingnuts 18 and/or any other suitable coupler and/or fastener for the oil basket lid 14; basket capture mechanisms 198 (e.g., one or more ball 200 and socket spring assemblies 202, detent mechanisms, catches, pawls, pins, couplers, recesses, processes, mating engagements, locking features, locks, catches, solenoids, actuators, and/or any other suitable mechanism that is capable of selectively retaining the basket within the tub; oil roast baskets 10; perforated side walls 16 of the oil roast basket; lids 14 of the oil roast basket; screws 70 and/or any other suitable coupler and/or fastener that is capable of attaching the centrifuge tub to the centrifuge motor shaft housing; centrifuge motor shaft housings 62; and/or any other suitable components.

Figure 22:
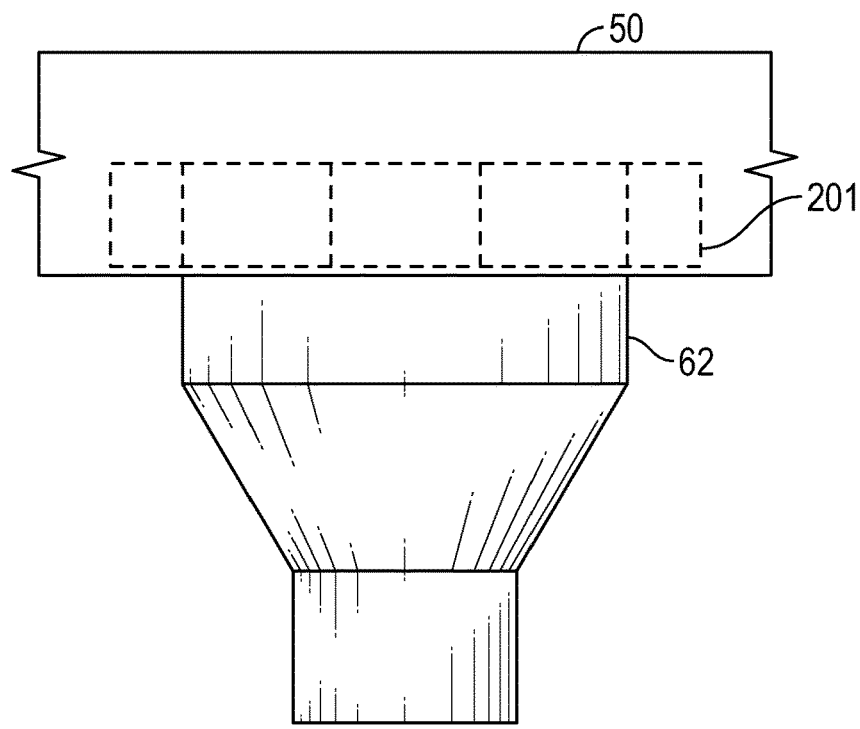
FIG. 22 illustrates a side, elevation view of the centrifuge roast extraction tub and the centrifuge motor shaft housing with gearing used in connection with the housing, in accordance with some representative embodiments.

FIG. 22 illustrates, in accordance with some embodiments, a side view of an embodiment of a portion of the centrifuge roast extraction tub 50. In this regard, FIG. 22 shows an embodiment of the centrifuge motor shaft housing 62 with gearing (e.g., centrifuge motor shaft housing gearing teeth 201) on an exterior of housing. While the shaft housing gearing teeth can perform any suitable function, in some embodiments, the gearing on the shaft housing deflects some of the load off the bolts and/or other fasteners that secure the motor spindle housing to the centrifuge tub. Additionally, in some embodiments, the gearing increases torque, extends the life of the motor shaft housing, reduces replacement and maintenance costs, and/or aids in acceleration and deceleration of the centrifuge.

Figure 23:
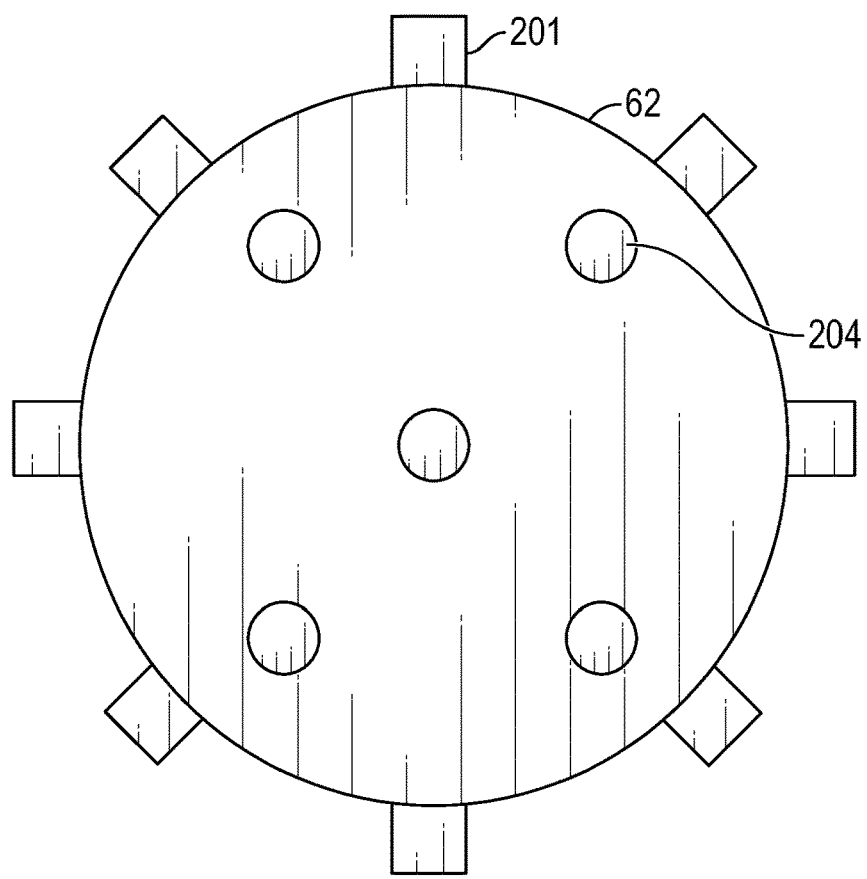
FIG. 23 illustrates a top, plan view of the centrifuge motor shaft housing with gear teeth and motor shaft housing anchor screws, in accordance with some representative embodiments.

In accordance with some embodiments, FIG. 23 illustrates a top view of an embodiment of a centrifuge motor shaft housing 62 with gear teeth 201 and motor shaft housing anchor screws 204 (and/or any other suitable couplers and/or fasteners), disposed in any suitable location.

Figure 24:
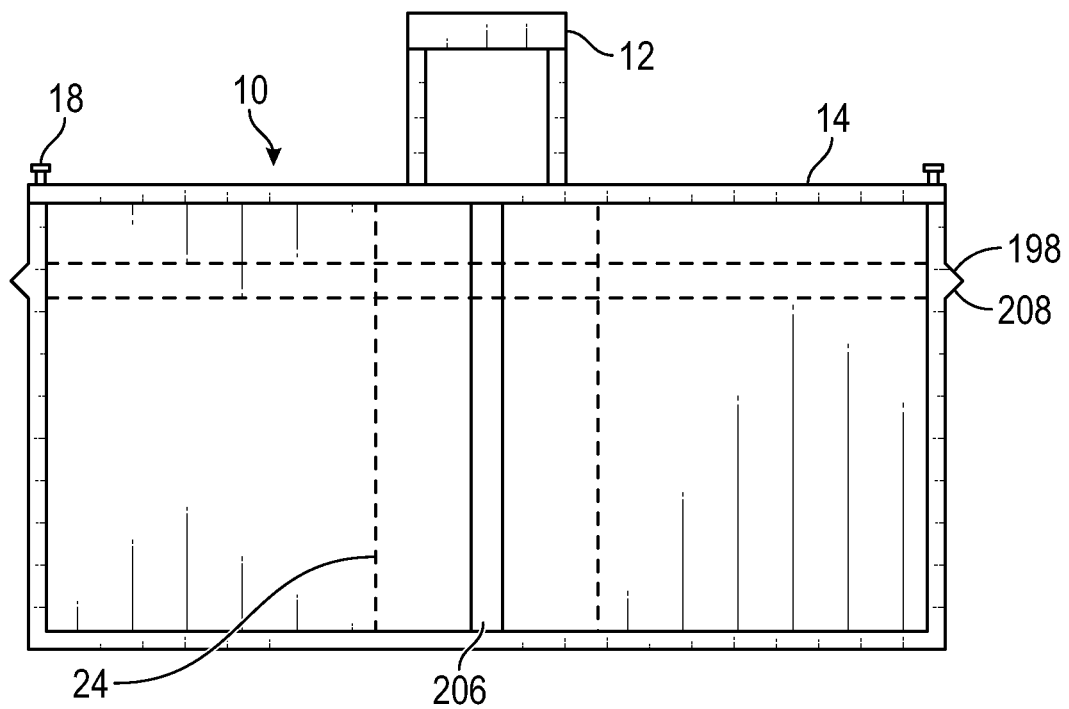
FIG. 24 illustrates a side view of the oil roast basket, wherein the basket is configured to heat multiple foods, and wherein the basket includes internal basket wall separators (or partitions), and a central basket partition, in accordance with some representative embodiments.

FIG. 24 shows, in accordance with some embodiments, a side cross-sectional view of the oil roast basket 10 that is (or that is configured to be) subdivided to form multiple internal compartments for keeping food products separated within the basket. While the basket can be configured to be subdivided in any suitable manner (including, without limitation, by having one or more partitions be permanently formed therein, by having one or more removable partitions be disposed in any suitable location within the basket; by having one or more partitions, removable or permanent, radiate from a center portion of the basket towards a wall of the basket; and/or in any other suitable manner, FIG. 24 shows an embodiment in which the basket 10 has one or more internal basket wall separators (e.g., central basket partitions 24, partitioning walls 206 that extend from a center portion of the basket and/or a central basket partition to a wall of the basket, and/or any other suitable partition). Thus, in some embodiments, the internal compartment of the basket can be subdivided in any suitable manner (e.g., with a central tower, with one or more internal rings that are concentric with the central internal compartment of the basket, in segments, like pieces of a pie, and/or in any other suitable manner).

Additionally, FIG. 24 shows that, in some embodiments, the basket 10 comprises one or more processes, rings that extend as processes 208 from the basket 10, recesses, catches, protuberances, pawls, pins, recessed rings, and/or any other suitable basket capturing mechanism 198 that is configured to selectively retain the basket within the tub 50. In this regard, while FIG. 24 shows that the basket capture mechanism 198 comprises a ring that extends as a process 208 around a perimeter of the basket 10, in some embodiments (not shown) such a process is configured to be selectively captured by one or more detents, ball and spring mechanisms, recesses, mating mechanisms, actuators, solenoids, magnets, and/or any other suitable component or components of the centrifuge tub 50 that are configured to selectively capture the process.

Figure 25:
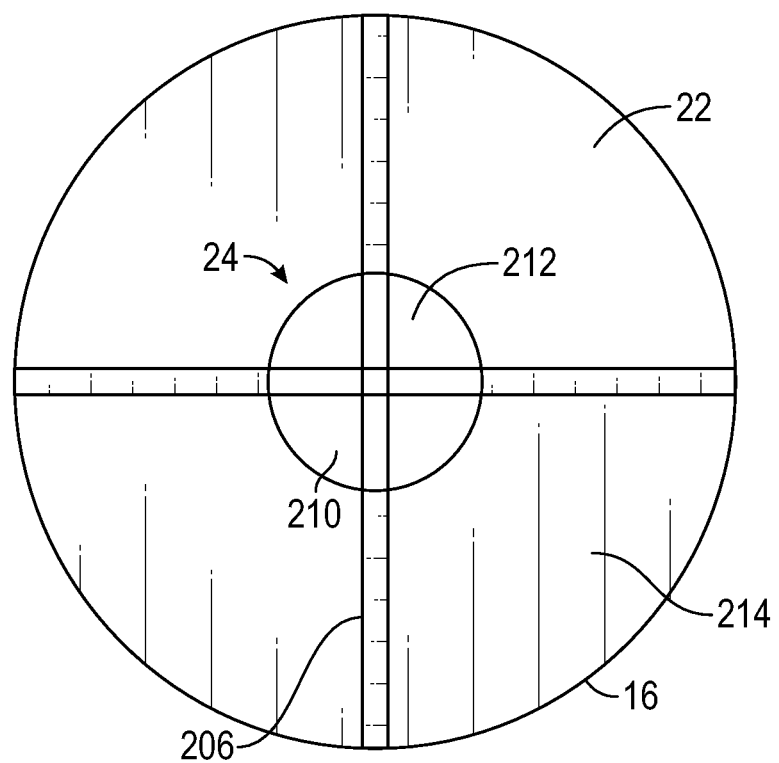
FIG. 25 depicts a top, plan view of the oil roast basket, wherein the basket is configured to heat multiple foods, showing the internal basket wall separators guides and a bottom of the oil roast basket, in accordance with some representative embodiments.

FIG. 25 shows, in accordance with some embodiments, a top view looking down into basket 10, showing internal basket wall separators or partitioning walls 206. In particular, FIG. 25 shows an embodiment in which the basket comprises a partition tower 210 (e.g., that allows for food product to be placed in 1, 2, 3, 4, 5, 6, 7, 8, or more central partitions 212). Additionally, FIG. 25 shows an embodiment in which food product can be placed in 1, 2, 3, 4, 5, 6, 7, 8, or more outer partitions 214 (or partitions near the side walls 16 of the basket).

Figure 26A:
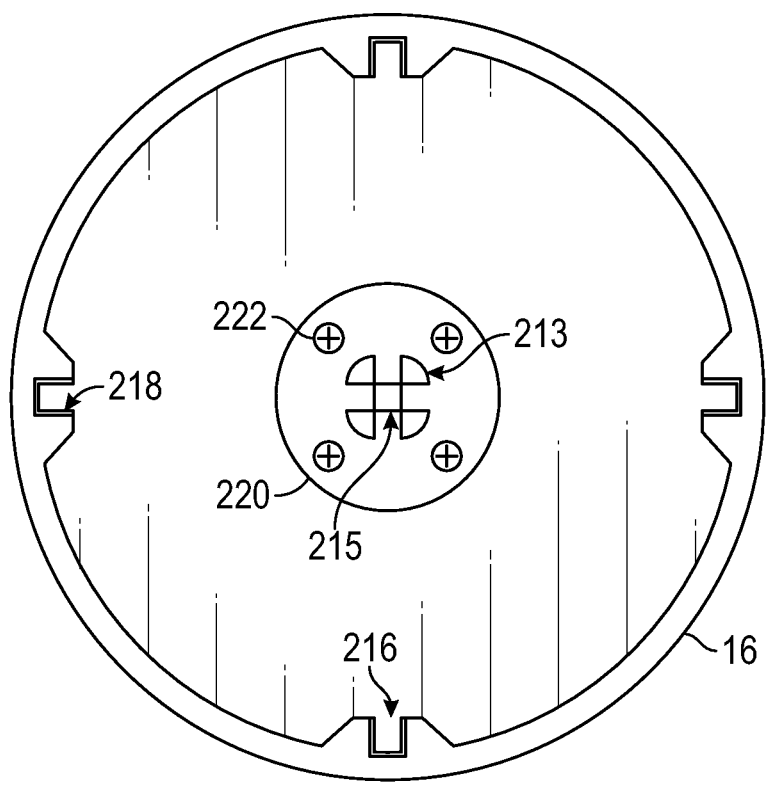
FIG. 26A illustrates a top, plan view of the oil roast basket comprising a central partition tower, in accordance with some representative embodiments.
Figure 26B:
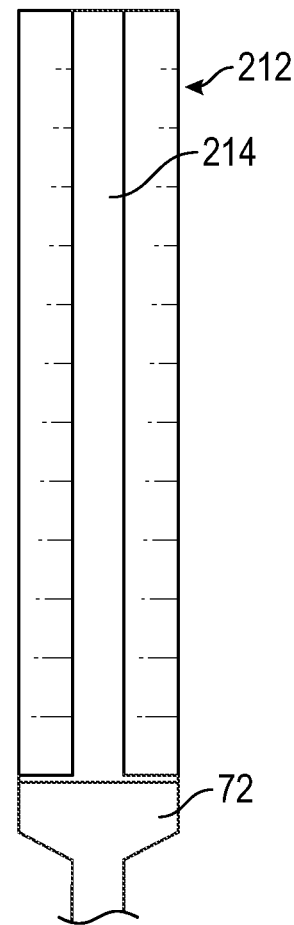
FIG. 26B illustrates a side view of the central partition tower, in accordance with some representative embodiments.

As another example of how the basket 10 can be subdivided, FIGS. 26A and 26B show that, in some embodiments, the basket 10 comprises a central partition tower 213 having one or more partition guides (e.g., slots 215, clips, mating engagements, mechanical engagements, grooves, ridges, clamps, couplers, fasteners, and/or any other suitable mechanisms that can hold a partitioning wall in a desired location) that are aligned with one or more corresponding partitioning guides (e.g., corresponding slots 216) of the side wall 16 and/or floor 22 of the basket. Additionally, while the partitioning guides can have any suitable feature (e.g., comprising a mating recess (as shown), a mating process, and/or any other suitable coupling mechanism), FIG. 26A shows that some embodiments of the partitioning guides (e.g., 215 and/or 216) comprise one or more partition guide seals 218. In this regard, while such seals can perform any suitable function, in some embodiments, they help hold the partitions in place, prevent fry medium from entering into the slots, prevent vibration and noise at a contact point of the partition and centrifuge tub wall, reduce ware at a contact point of partition and centrifuge tub wall, extend service life of the partition, prevent warping or metal fatigue at a contact point of partition and centrifuge tub wall, and/or perform any other suitable function.

Where the basket 10 comprises a central partition tower 213, the tower can couple to the basket and/or the centrifuge tub 50 in any suitable manner, including, without limitation, via one or more fasteners (e.g., bolts, screws, rivets, welds, pins, catches, mechanical engagements, frictional engagements, threaded engagements, and/or in any other suitable manner). By way of non-limiting illustration, FIGS. 26A-26B show some embodiments in which the central partitioning tower 213 comprises a flange 220 (and/or any other suitable component that couples to the floor 22 of the basket, the motor spindle 72, the motor shaft housing 62, and/or to any other suitable component, in any suitable manner, including, without limitation, via one or more fasteners (e.g., bolts 222) and/or couplers.

Figure 27:
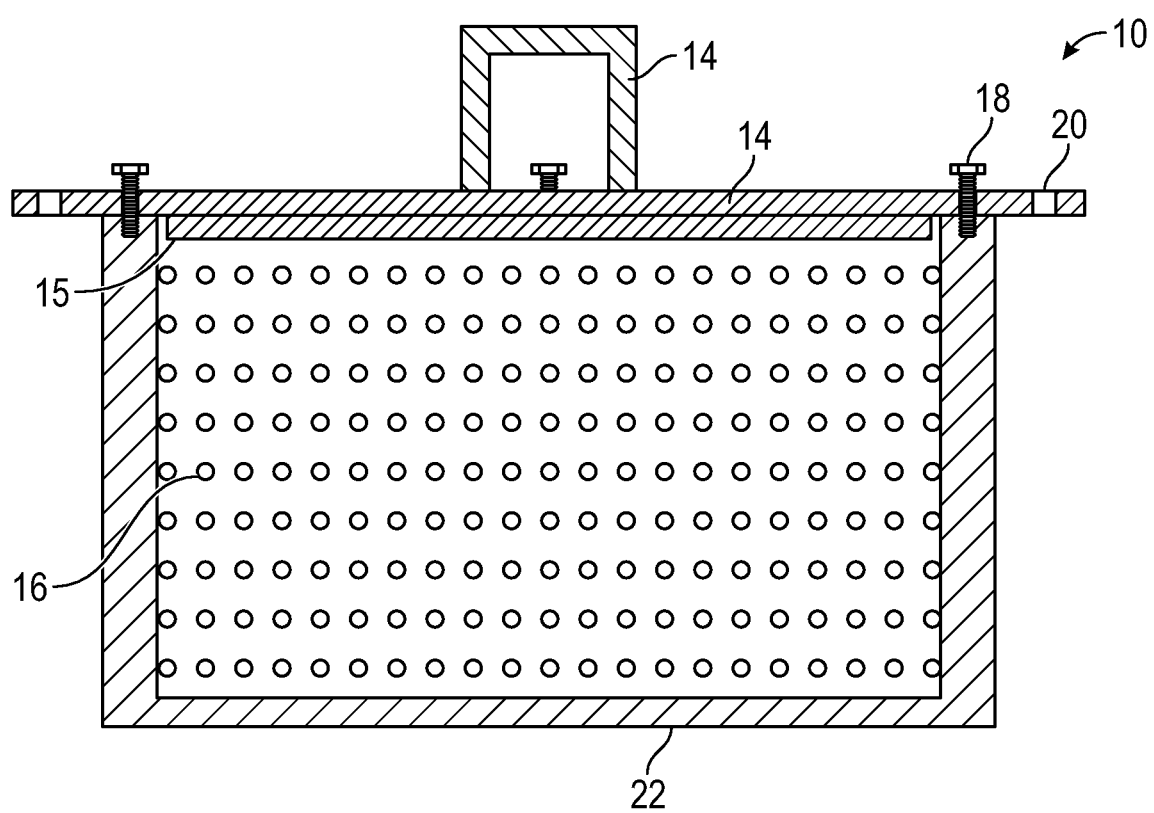
FIG. 27 illustrates a side, cutaway view of the basket, in accordance with some representative embodiments.

While the basket lid 14 can have any suitable configuration and/or component (e.g., being flat, not extending into the basket, extending into the basket, being free from vents or perforations, being perforated, having vents, and/or having any other suitable feature), FIG. 27 shows that, in some embodiments, a portion 15 of the lid 14 is configured to extend down into the basket 10. While having a portion of the lid extend down into the basket can perform any suitable function, in some embodiments, it can force food products to be completely submerged in the fry medium (e.g., to prevent some food products from cooking less than others).

Figure 28A:
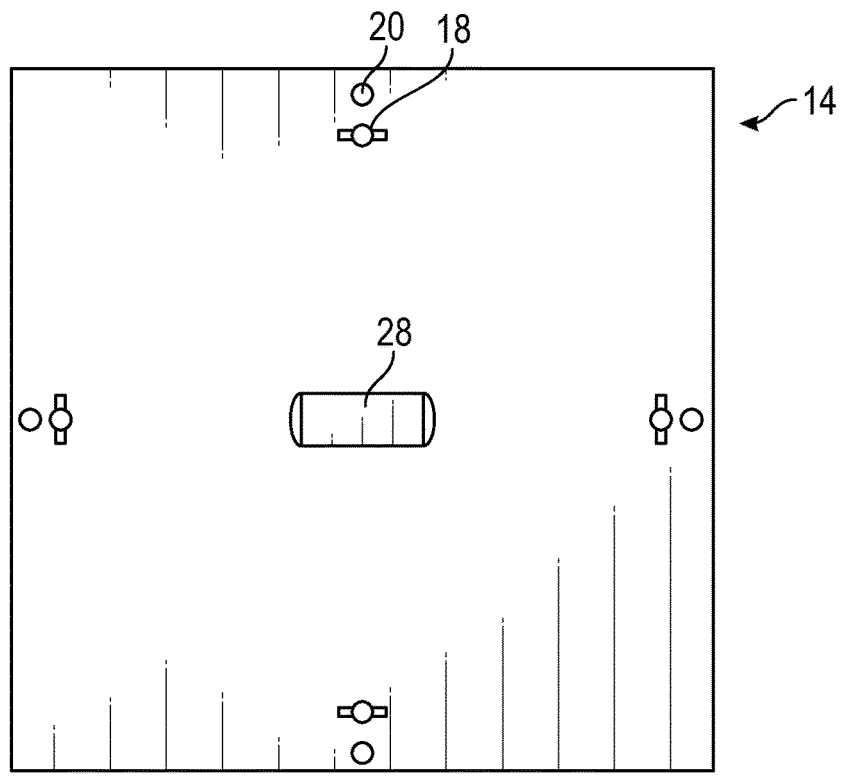
FIGS. 28A-28B respectively illustrate top, plan views of the basket's lid and the centrifuge tub, in accordance with some representative embodiments.
Figure 28B:
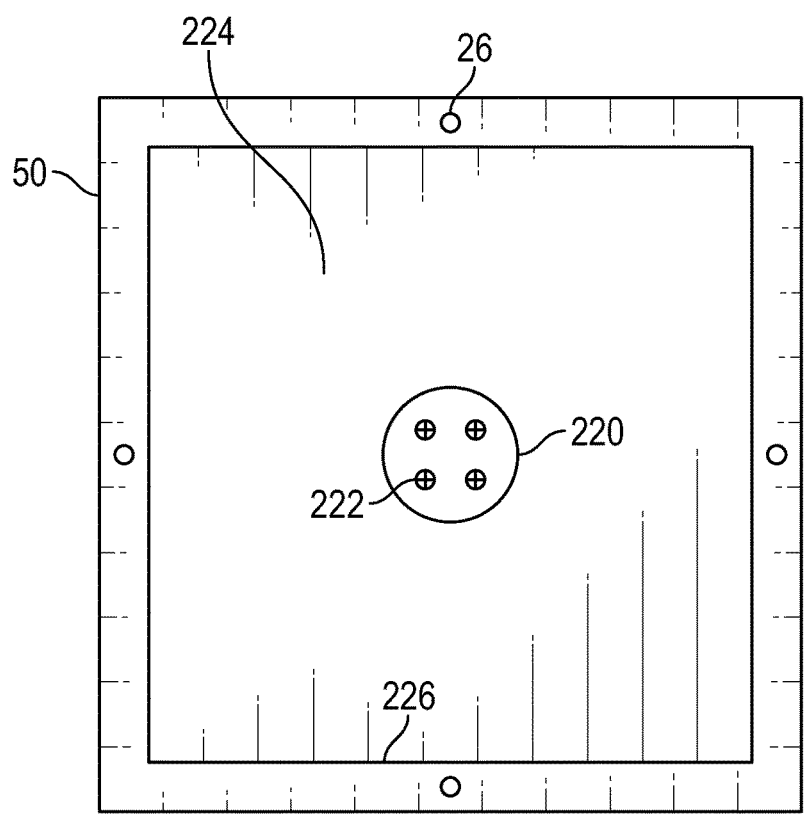

While several of the drawings included herein show the basket 10 and/or the centrifuge tub 50 as having circular perimeters, such items can (as stated earlier) have any other suitable shape. By way of non-limiting example, FIGS. 28A-28B show some embodiments in which the basket lid 14 (and hence the basket 10) as well as the centrifuge tub 50 have a polygonal perimeter (e.g., being square shaped). While having such a shape can perform any suitable function, in some embodiments, it allows a food product to be fried in an existing fryer (e.g., having a polygonal reservoir) to maximize the amount of food product that is fried.

Additionally, while the basket and centrifuge tub can have divergent shapes (e.g., one being round and the other being square), in some embodiments, both the basket and the tub have similar shapes. Indeed, in some embodiments, the basket is similar in shape to, and is slightly smaller than, the internal compartment 224 (e.g., as defined by the walls 226) of the tub.

Figure 29A:
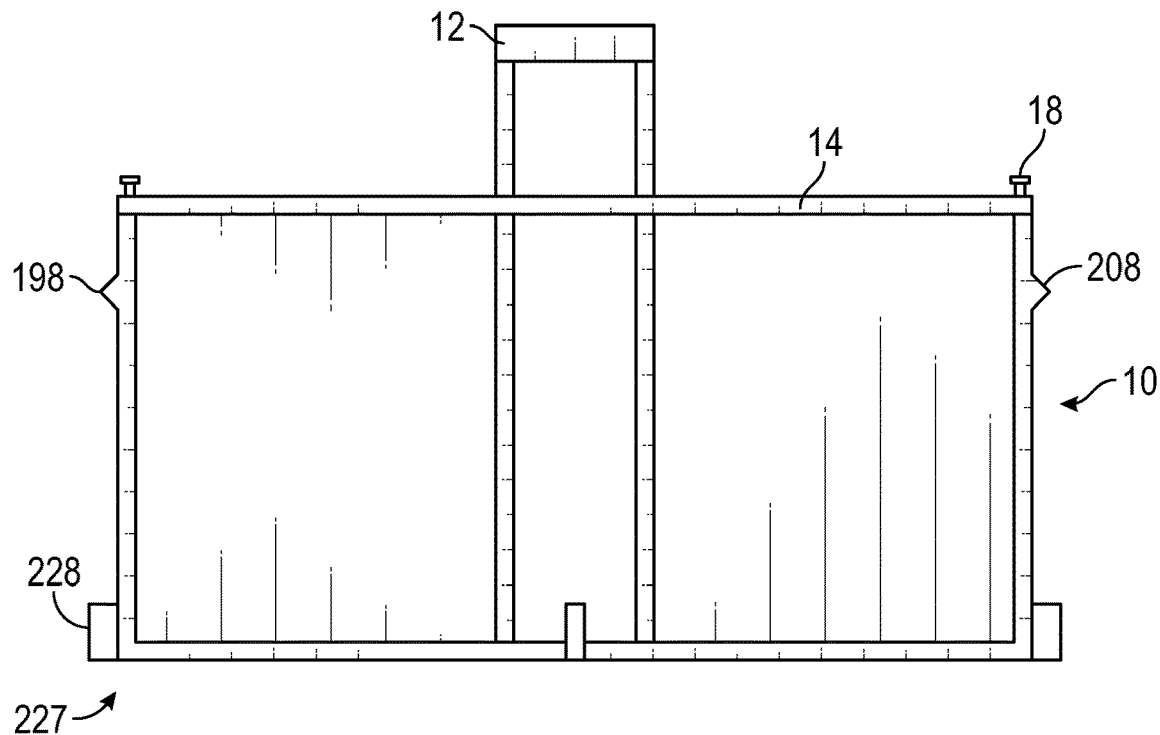
FIGS. 29A-29B respectively illustrate side, cutaway views of the basket and its lid, in accordance with some representative embodiments.

The described system 5 can be modified in any suitable manner that allows it to be used to centrifuge a food product. In this regard, FIG. 29A shows that, in some embodiments, the basket 10 comprises one or more basket guides 228 (e.g., processes, protrusions, recesses, grooves, and/or any other suitable features that help guide the basket into the centrifuge tub 50 in a desired rotational orientation). By way of non-limiting illustration, FIG. 29A shows an embodiment in which the basket 10 comprises one or more protrusions 227 that are configured to mate with one or more recesses (not shown) in the centrifuge tub.

Figure 29B:
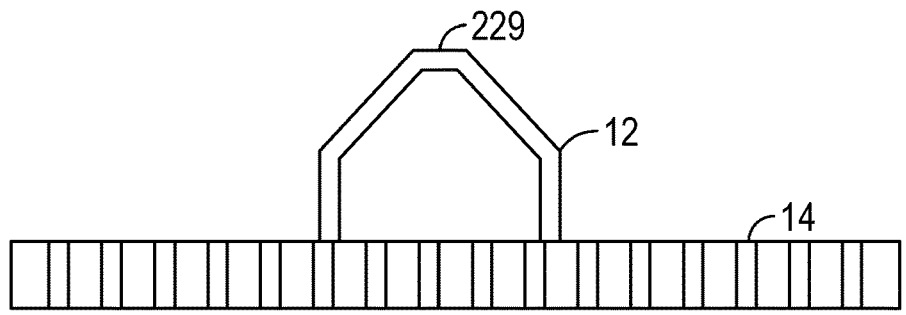
Figure 29C:
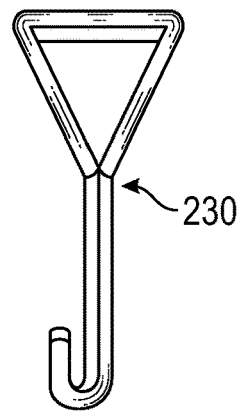
FIG. 29C illustrates a perspective view of a lid hook or holder, in accordance with some representative embodiments.

As another example, FIG. 29B shows an embodiment in which the basket lid 14 is perforated (as discussed above) and comprises a handle 12 having an apex 229 such that the lid can readily and safely be picked up with any suitable device (e.g., a hook 230, as shown in FIG. 29C).

FIGS. 30A-33B show several additional modifications that can be made to the described system 5. In this regard, any and all of the features, components, and characteristics that are discussed in FIGS. 30A-33B and that could possibly be used with the systems, apparatus, and components of FIGS. 1-29C, can be used with such systems, apparatus, and components. Similarly, any and all of the features, components, and characteristics that are discussed in FIGS. 1-29C and that could possibly be used with the systems, apparatus, and components of FIGS. 30A-33B, can be used with such systems, apparatus, and components.

While the described system 5 can have any suitable feature (e.g., as discussed above), FIGS. 30A-32D (see e.g., FIG. 30R) show that, in some embodiments, the system 5 comprises one or more fry roast baskets 10, centrifuge tubs 50, ventilation systems 232, heaters 234, actuators 236, reservoirs 238, system lids 240, control systems 242, cord systems 244, filtration systems 246, liquid nitrogen systems 248 (see FIGS. 30V and 30W), and/or any other suitable feature.

With regards to the fry roast baskets 10, the basket can have any suitable feature (e.g., as discussed above). In one example, the basket can be any suitable size (e.g., being sized for industrial, commercial, private, bulk, single serving, and/or any other suitable uses). By way of non-limiting illustration, FIGS. 30J and 31A-31C show some embodiments in which the basket 10 is relatively small in size. In another example, any suitable portion of the basket can define one or more holes, vents, apertures, and/or other suitable perforations that are disposed in any suitable number, location, pattern, size, and shape, and that have any other suitable characteristic. By way of non-limiting illustration, FIGS. 31A-31C show some embodiments in which the lid 14, the side walls 16, and/or the bottom or floor 22 of the basket 10 define one or more perforations that are configured to allow fry medium to pass through the perforations into (and/or out of) the basket 10, while preventing the food product (e.g., coffee beans) from passing through the perforations.

In another example, the basket 10 can be subdivided in any suitable manner (e.g., as discussed above). Indeed, in some embodiments, the basket comprises one or more partitions (e.g., central partitions 24, central partition towers 213, partitioning walls 206), internal walls, partition guides (e.g., slots 215 and/or 216), and/or any other suitable feature that allows an internal compartment of the basket to be subdivided.

In another example, the lid 14 can have any suitable component or characteristic, including, without limitation, being substantially flat, not having any portion of the lid extend into the basket 10, not coupling to the basket, coupling to the basket, not coupling to the centrifuge tub 50, coupling to the centrifuge tub, having one or more vents, being free from vents, and/or having any other suitable characteristic. By way of non-limiting illustration, FIGS. 31A-31C show some embodiments in which a portion 15 of the lid 14 is configured to extend into the basket 10 when the lid 14 is coupled to the basket 10 (e.g., to help ensure that all food product in the basket 10 is submersed in the fry medium during heating). Additionally, FIGS. 31A-31C show some embodiments in which the basket's lid 14 is not configured to couple directly to the centrifuge tub 50 (not shown in FIGS. 31A-31C). Instead, FIGS. 31A-31C show that, in some embodiments, the lid 14 is configured to selectively couple to and decouple from the basket 10, such that the basket and/or the lid 14 can rotate independent of the tub 50.

Where the lid 14 is configured to selectively couple to the basket 10, the lid can couple to the basket in any suitable manner (e.g., as described above), including, without limitation, through the use of one or more bolts 18, screws, nuts, wingnuts, threaded engagements, clamps, mechanical engagements, frictional engagements, twist-lock mechanisms, fasteners (e.g., pins, screws, snaps, pawls, catches, hook and loop fasteners, straps, hinges, and/or any other suitable fasteners), and/or in any other suitable manner. By way of non-limiting illustration, FIGS. 31A-31C show some embodiments in which one or more latching mechanisms 17 (e.g., wire bail latches, anchor Hermes latches, gasket sealing draw latches with safety catch, tight-hold draw latches with a safety catch, strikeless draw catches with a safety latch, strikeless adjustable-grip draw latches, and/or any other suitable latches and/or fasteners) are used to couple the lid 14 to the basket 10. Additionally, while the latching mechanisms (and/or any other suitable coupling mechanisms) can be disposed in any suitable location, FIG. 31A shows that, in some embodiments, the latching mechanisms 17 are disposed on opposite sides of the basket to help balance out a weight of the basket 10.

Figure 30D:
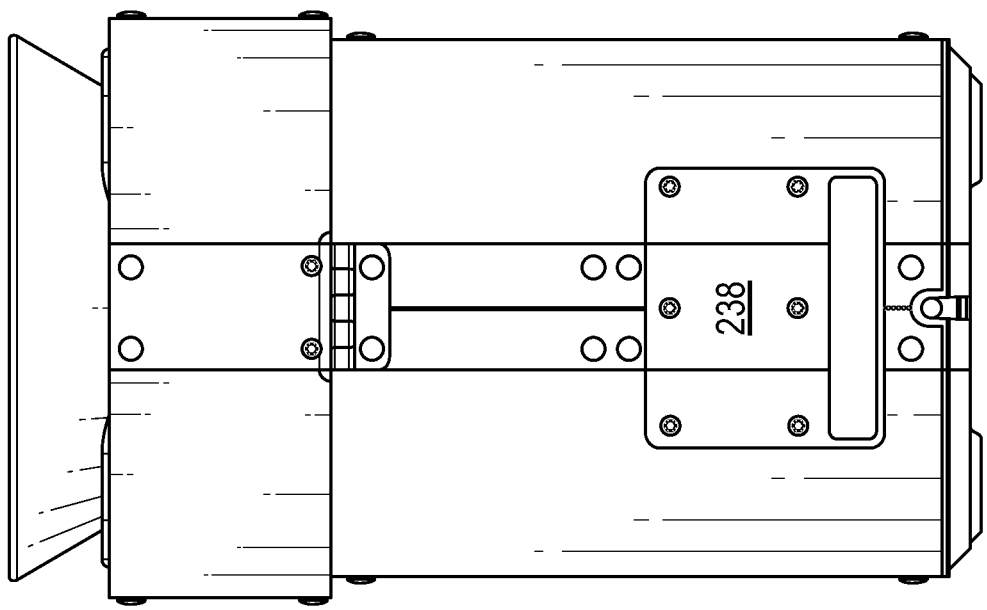
Figure 30C:
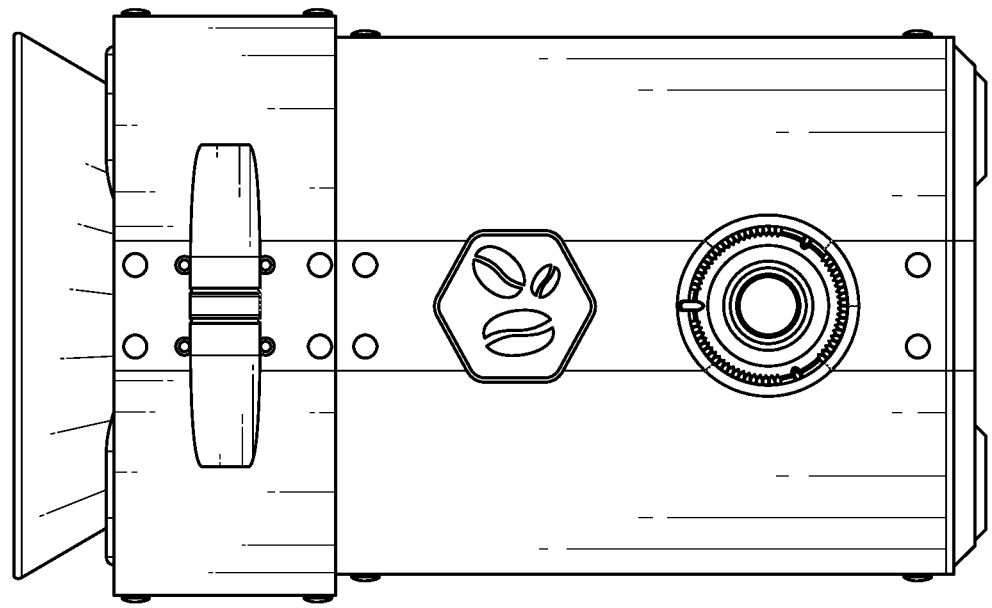
Figure 30F:
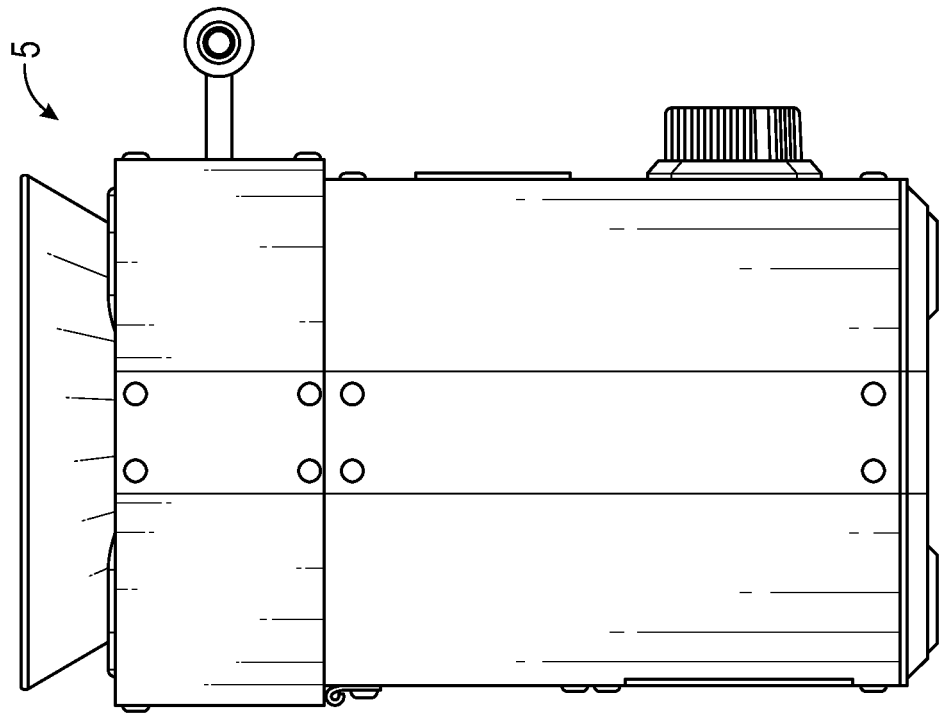
Figure 30E:
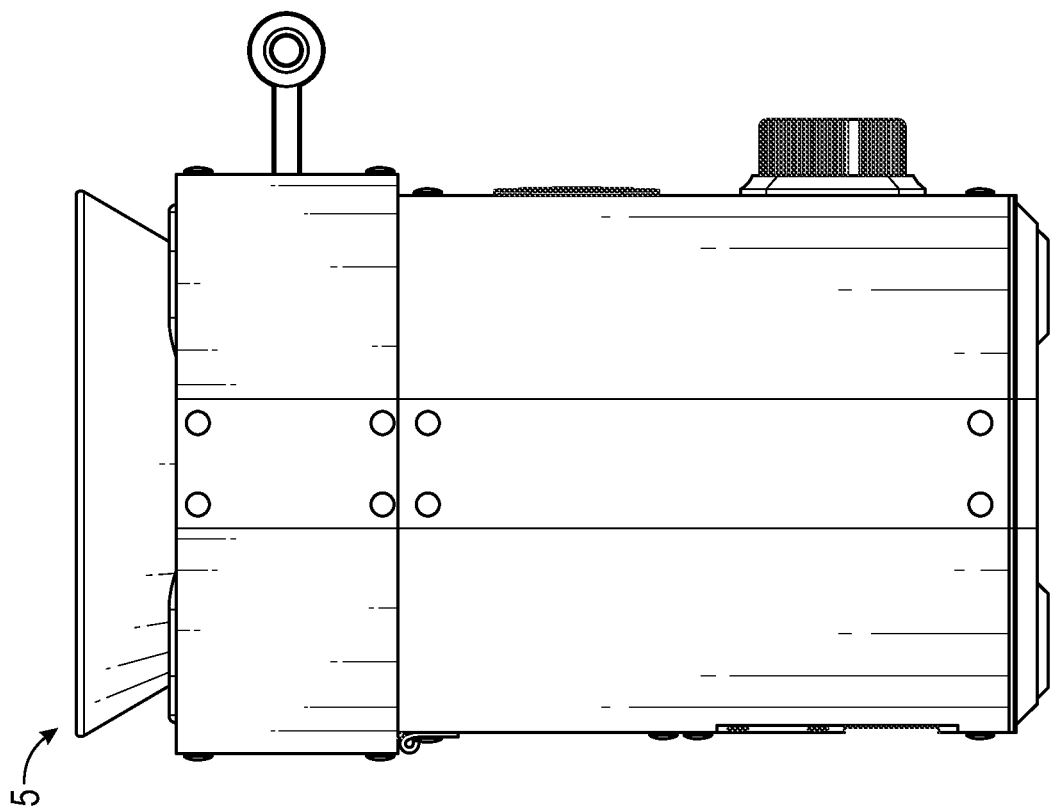
Figure 30G:
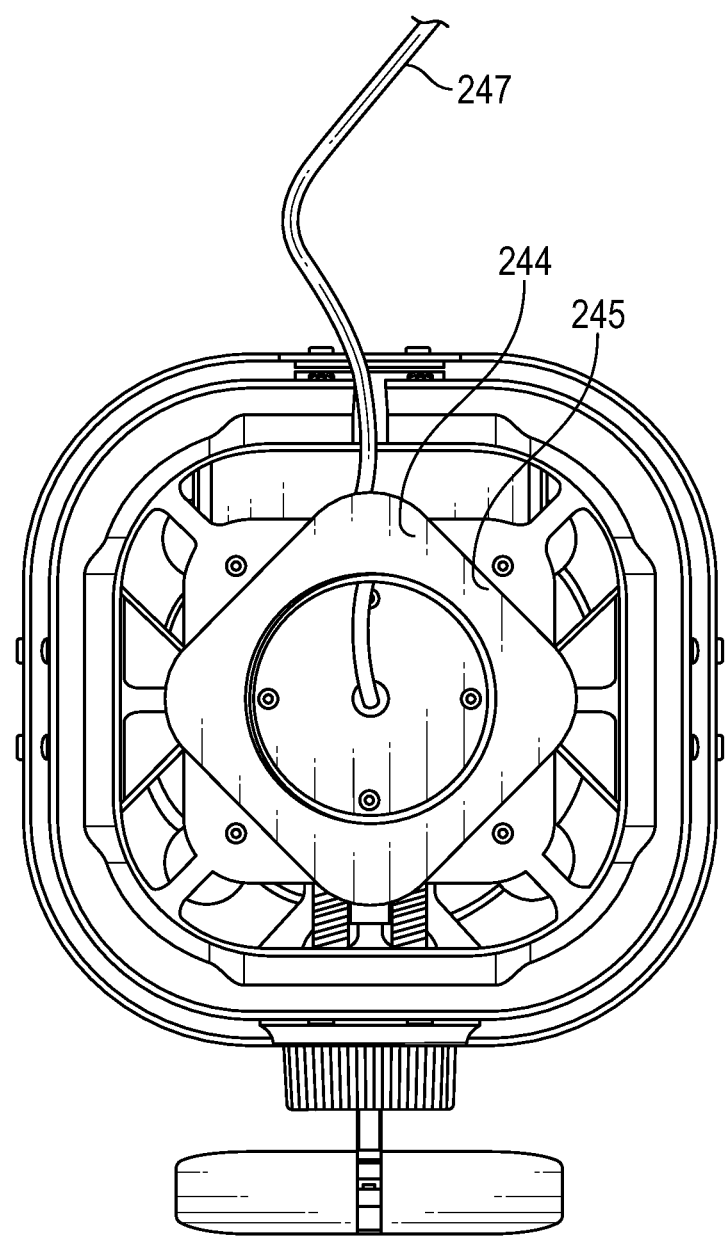
Figure 30I:
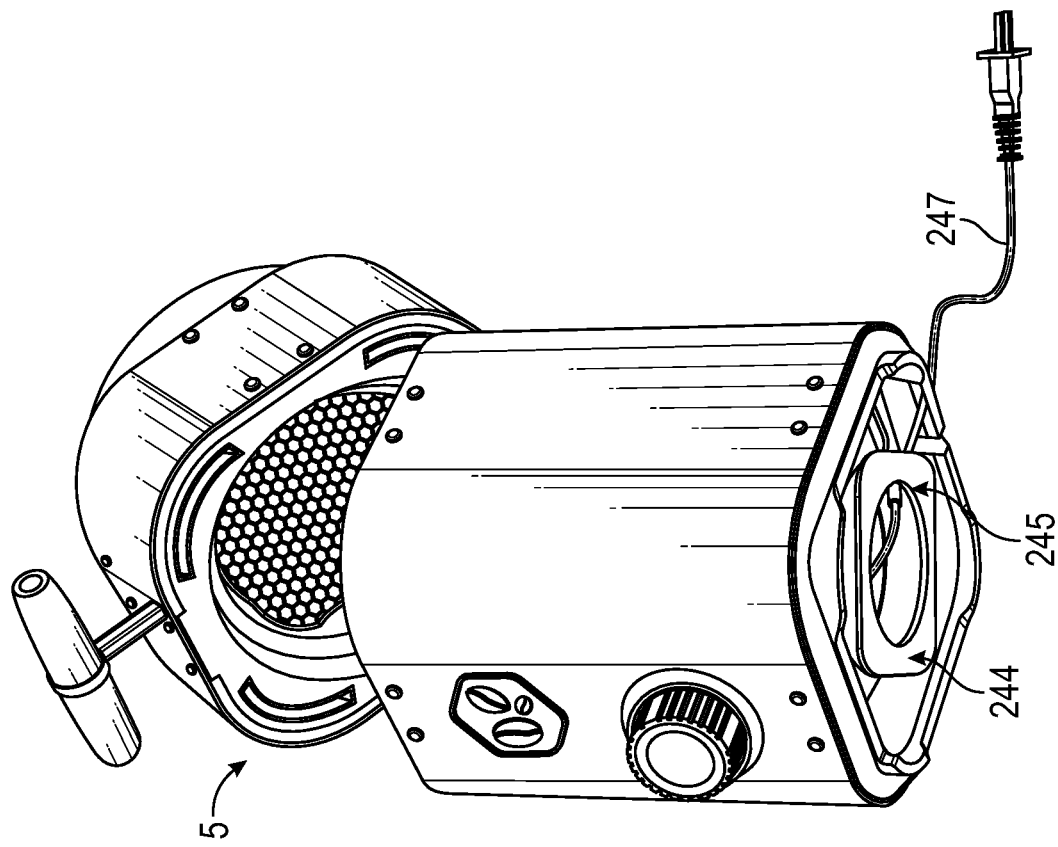
Figure 30H:
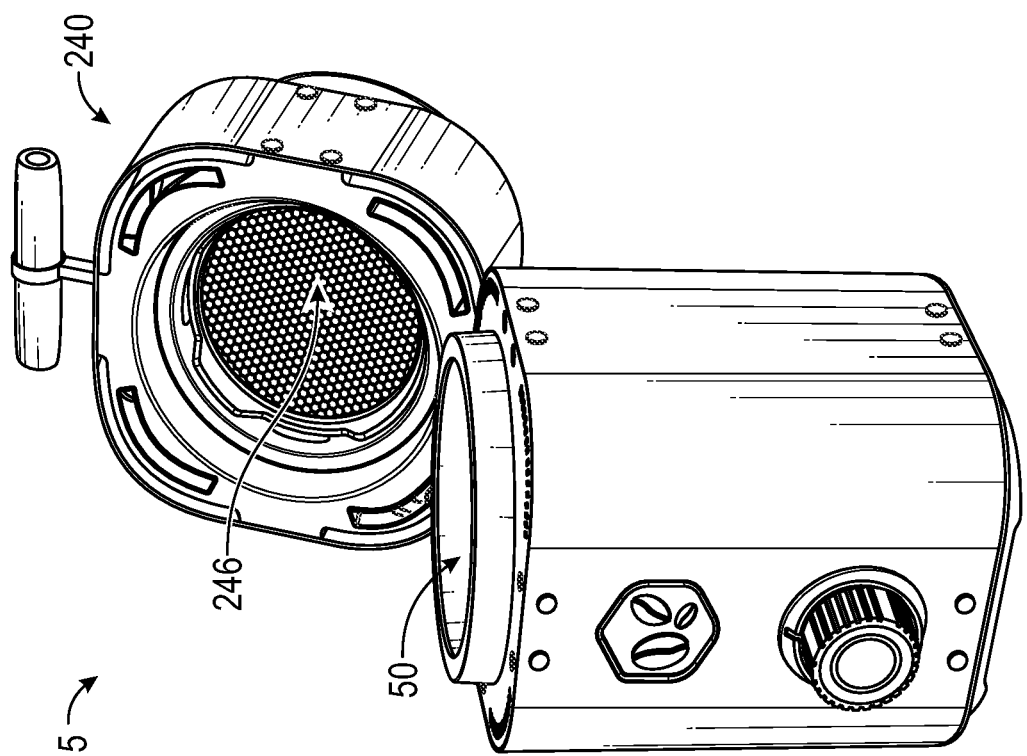
Figure 30K:
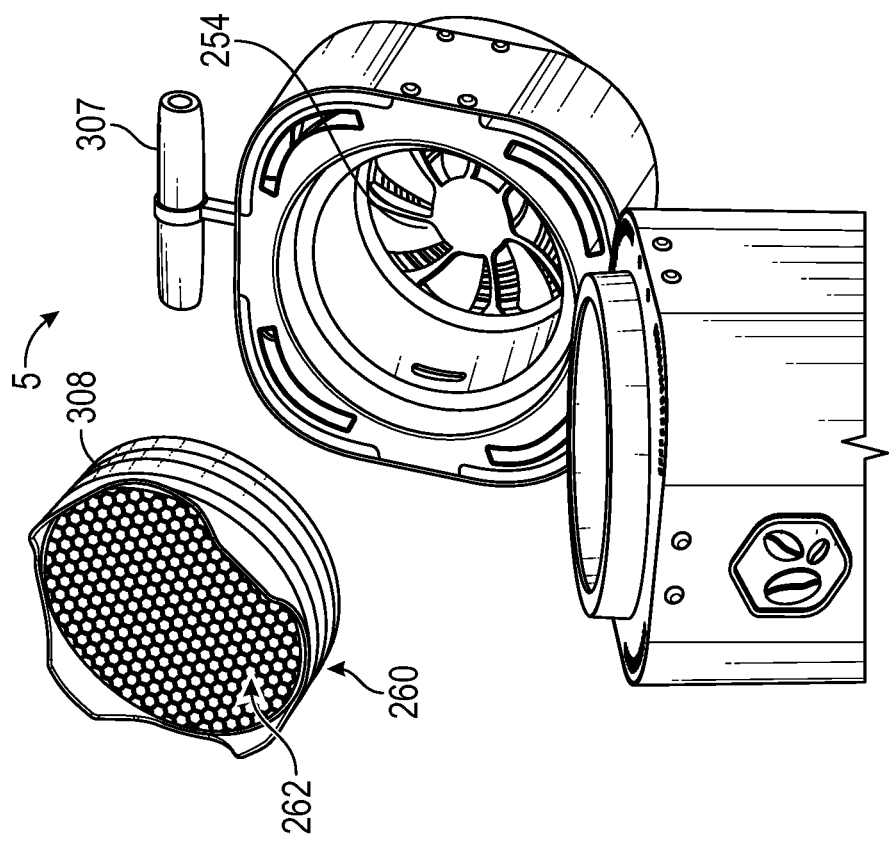
Figure 30J:
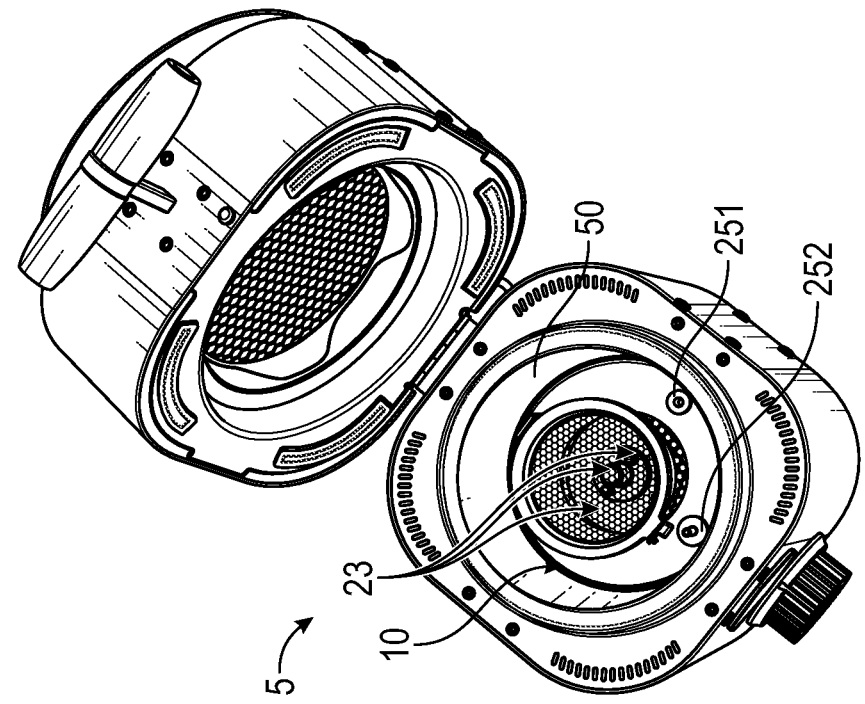
Figure 30L:
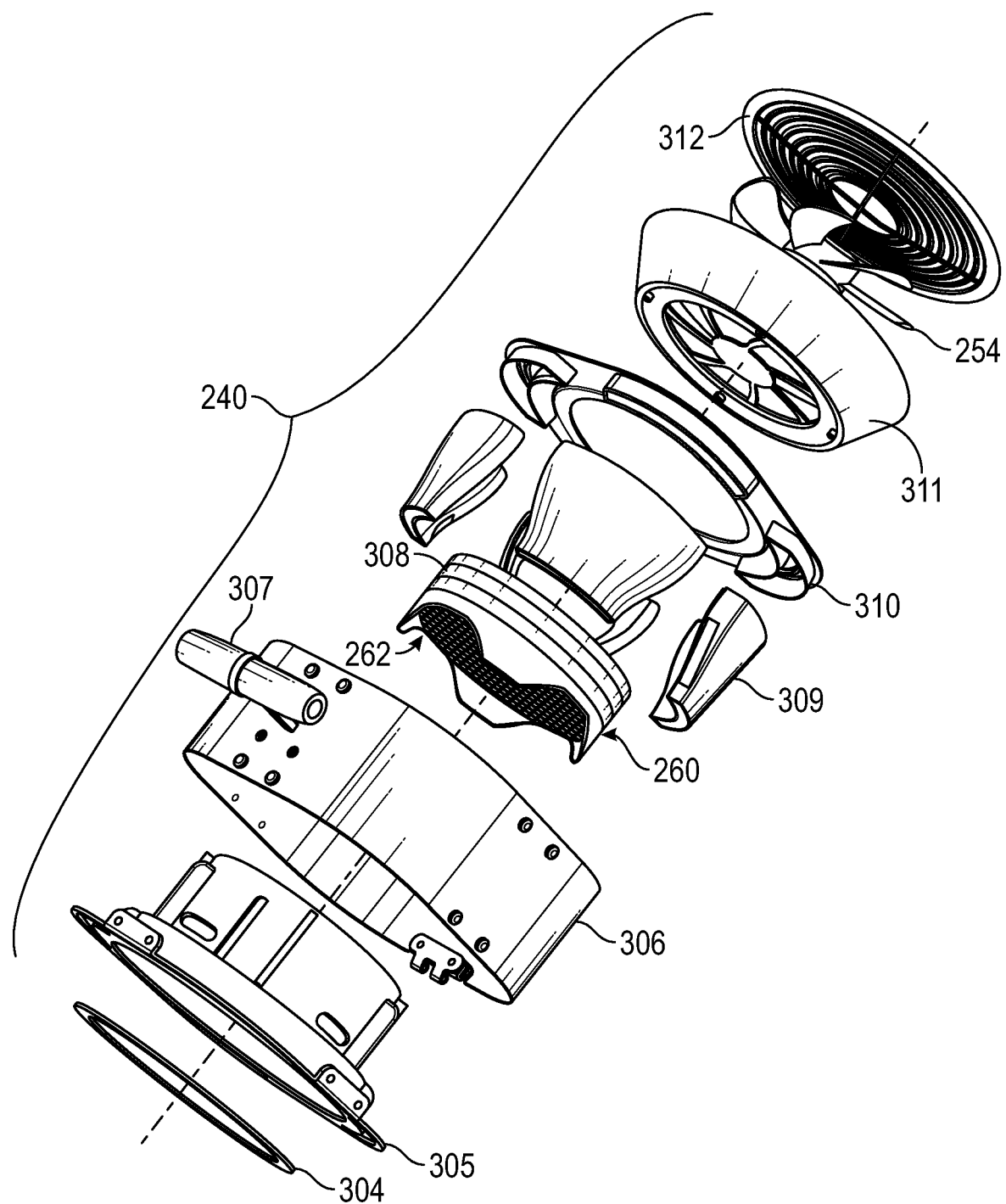
FIG. 30L illustrates an exploded, side perspective view of a lid of the system, in accordance with some representative embodiments.
Figure 30M:
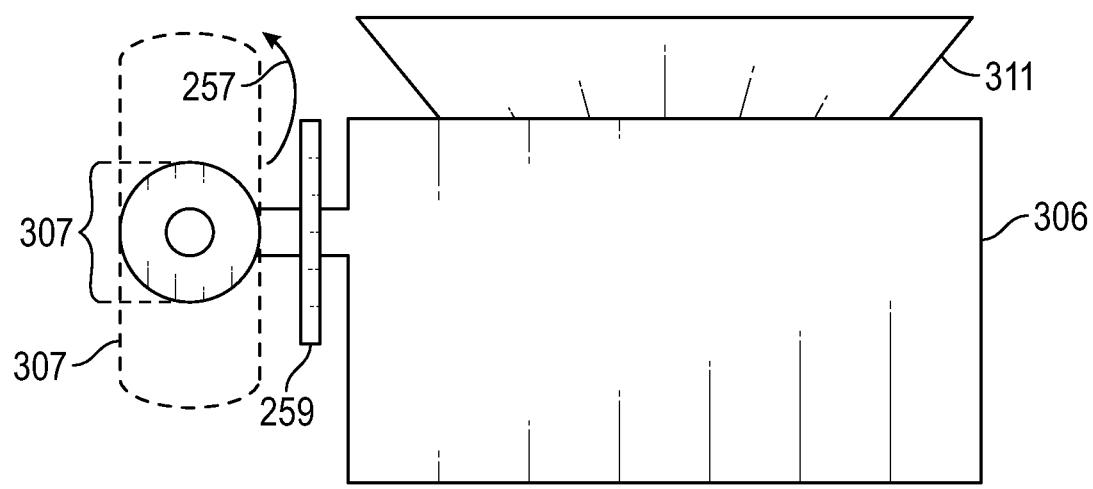
FIGS. 30M-30N illustrate different views of a handle on the system's lid, in accordance with some representative embodiments.
Figure 30N:
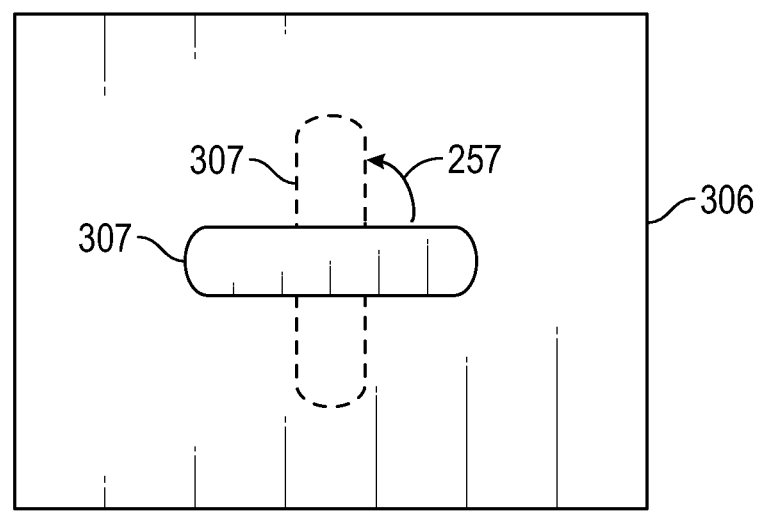
Figure 30O:
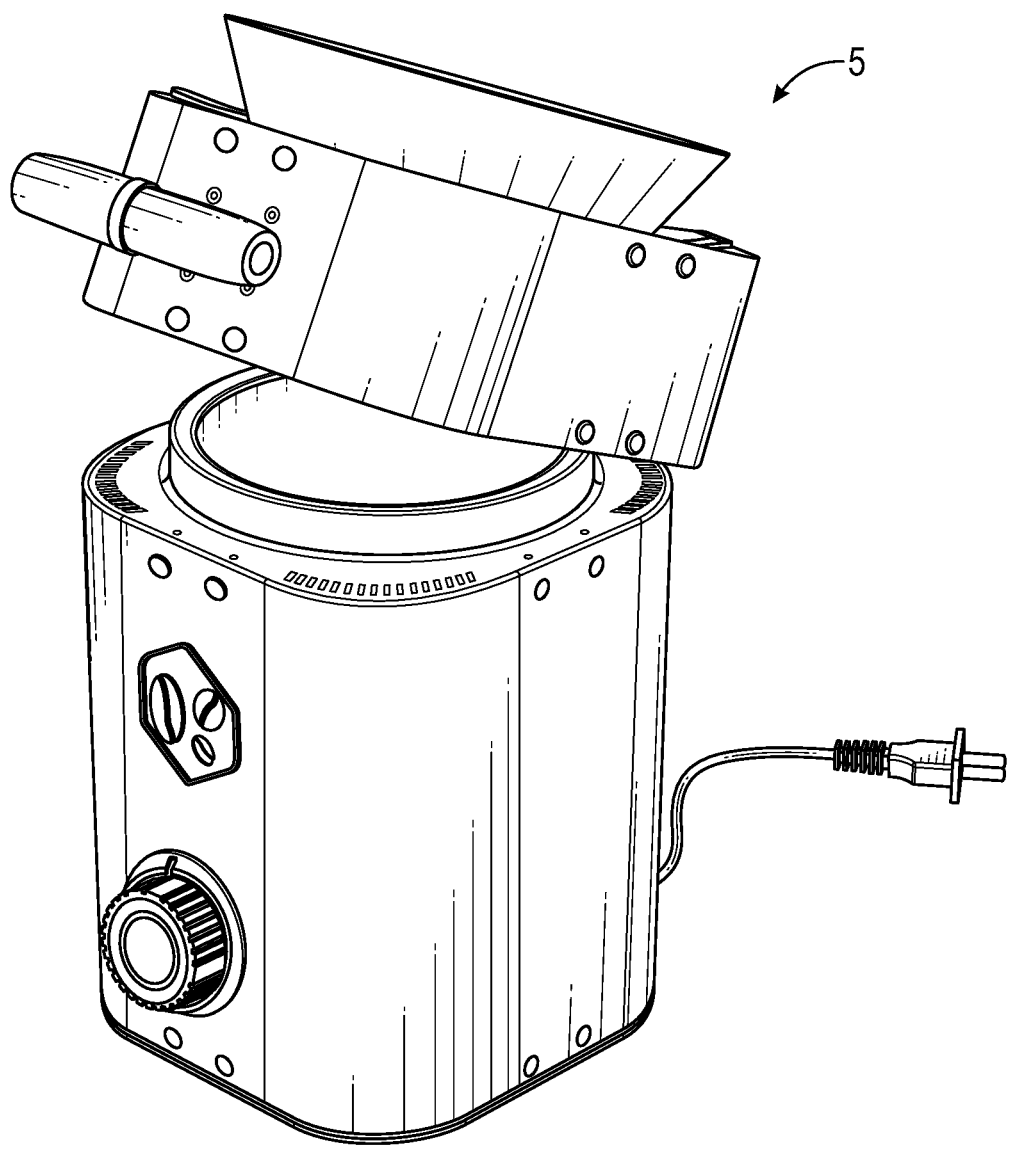
Figure 30P:
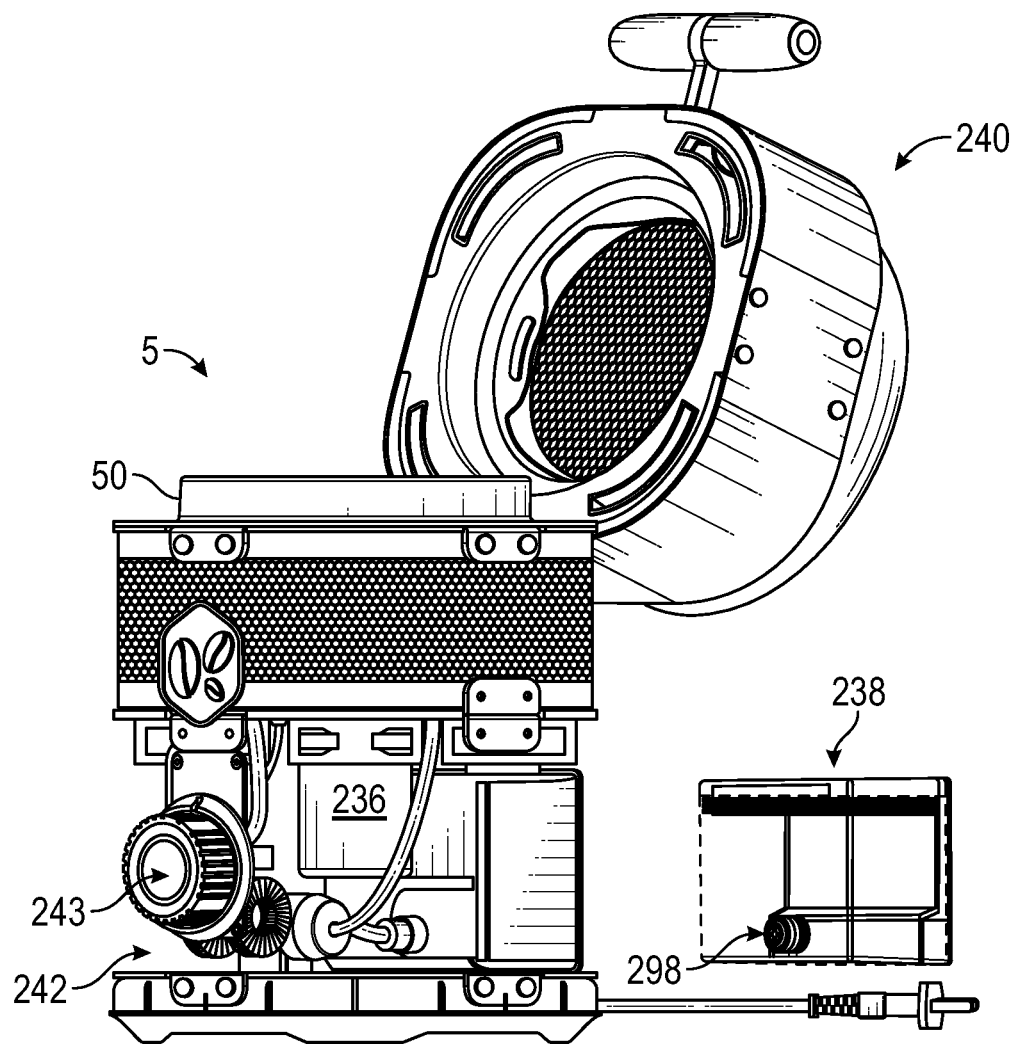
FIGS. 30P-30W each illustrate a partially disassembled and/or a partial cutaway view of the described system, in accordance with some representative embodiments.
Figure 30Q:
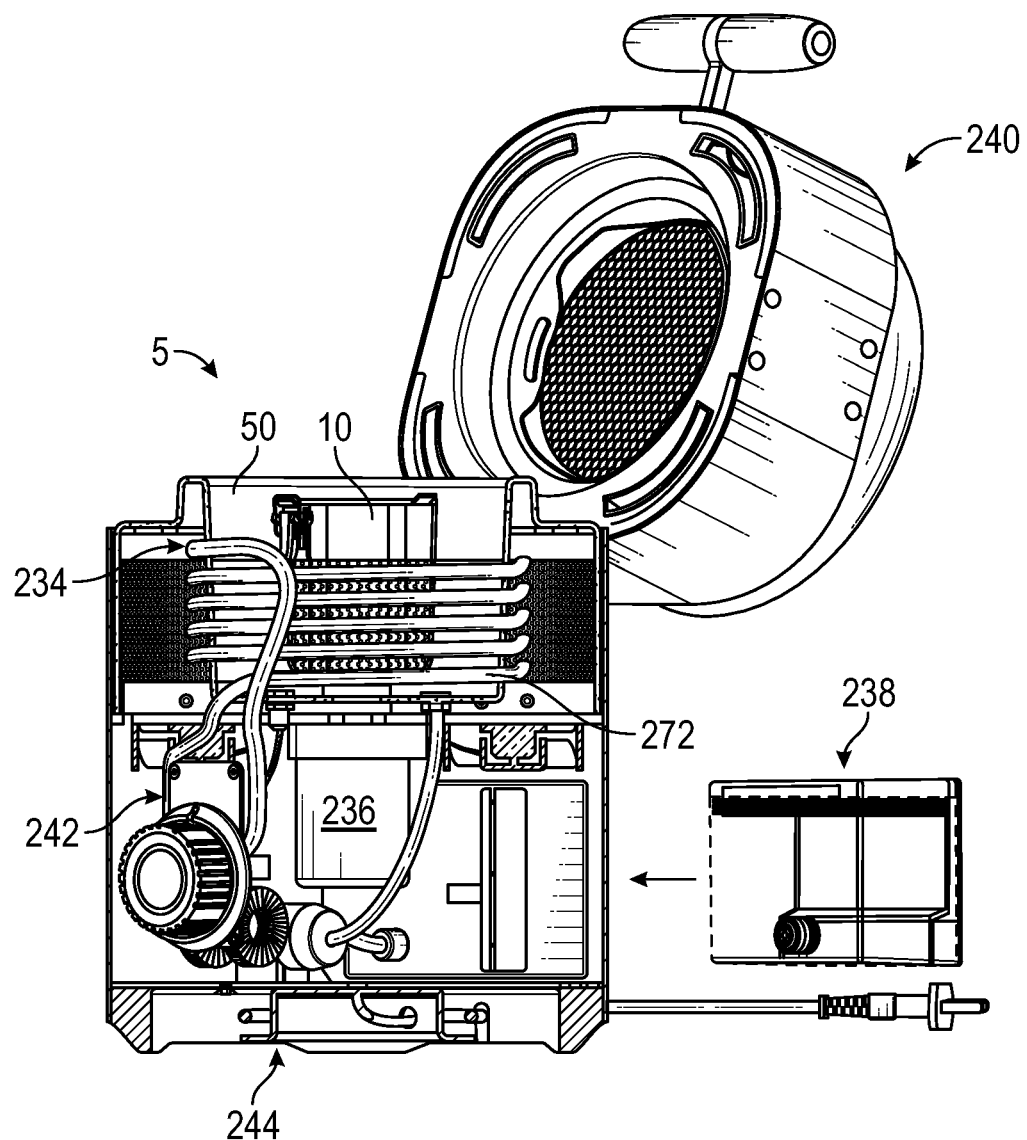
Figure 30R:
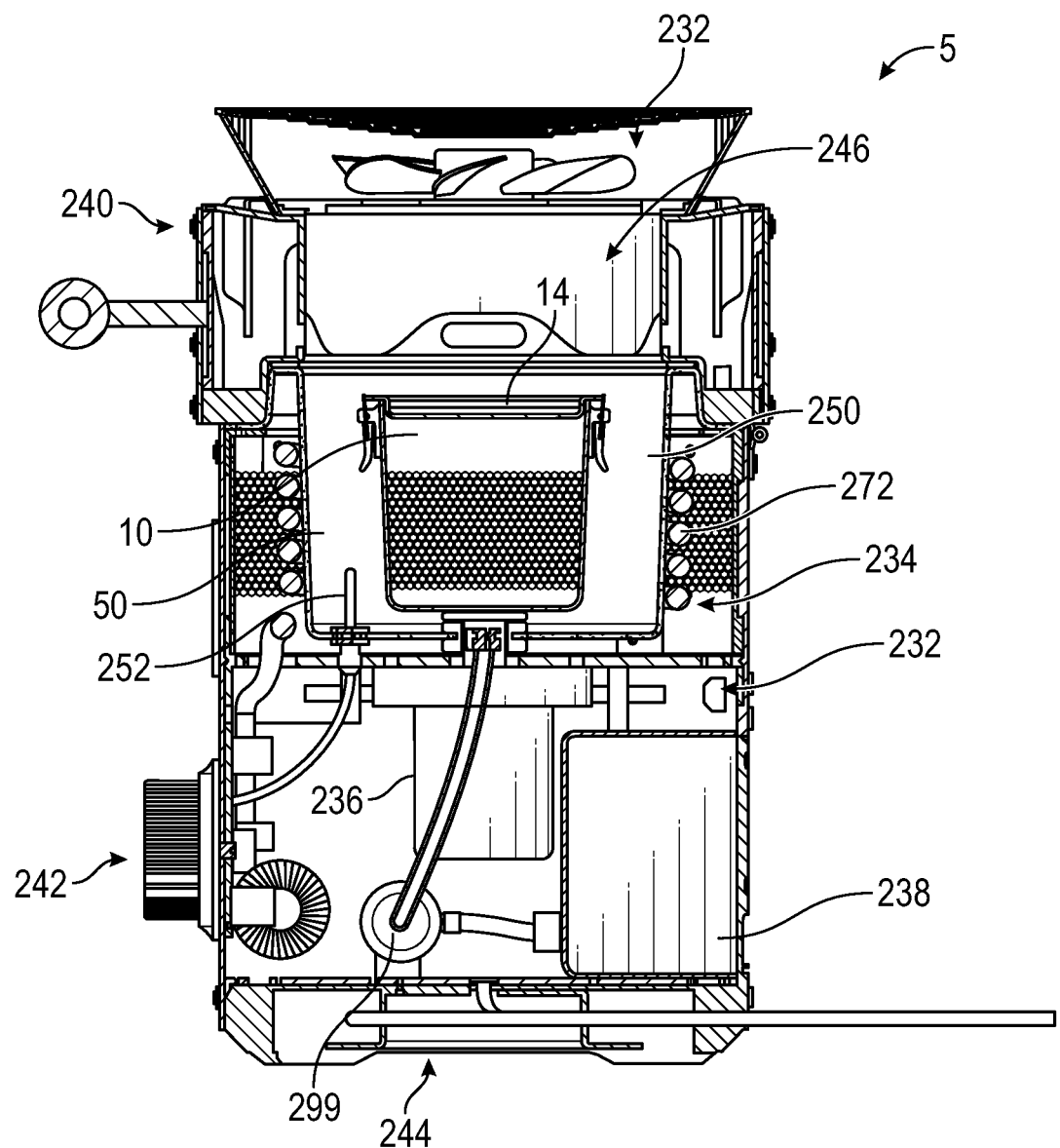
Figure 30S:
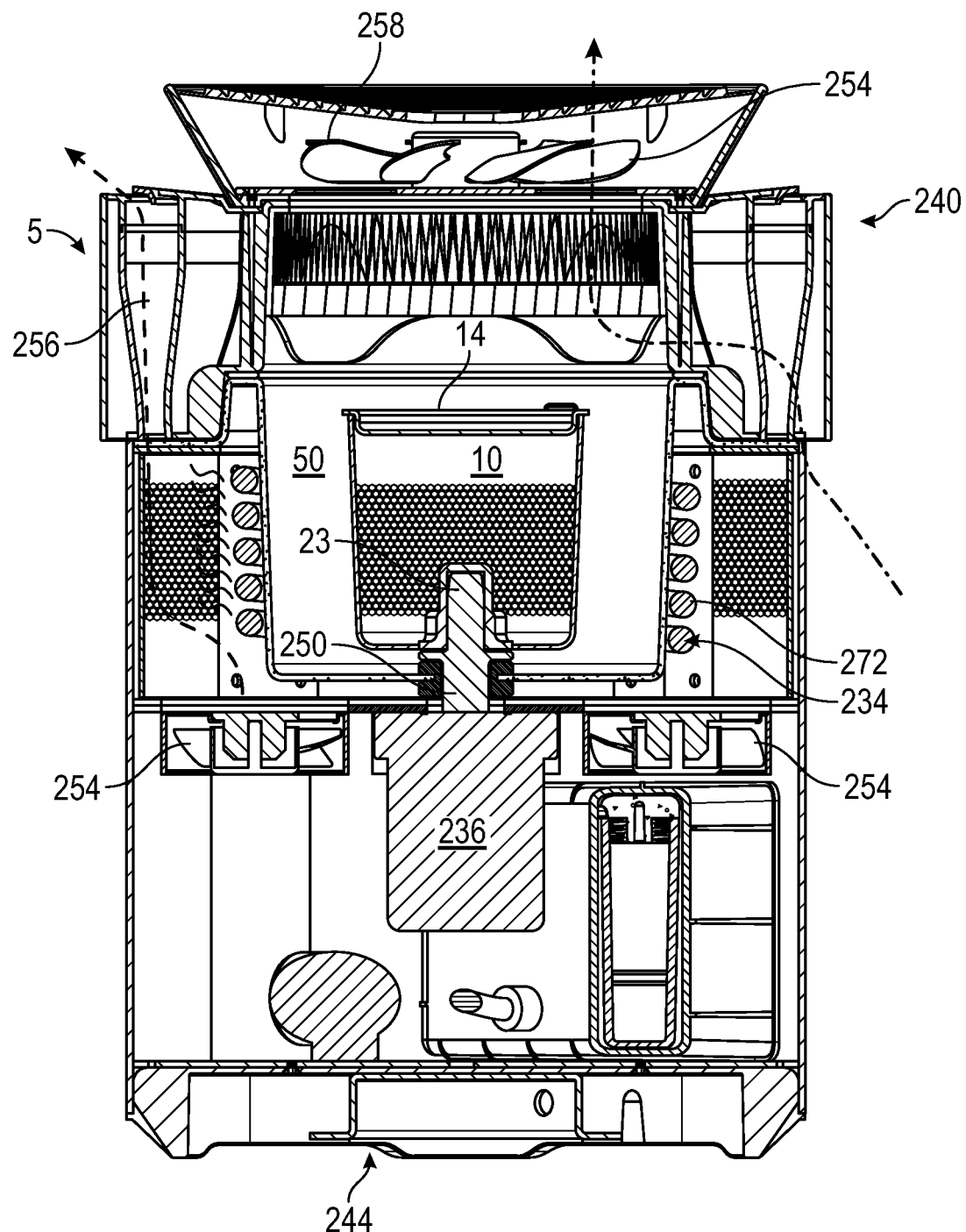

Although in some embodiments, the basket 10 is configured to rotate with the centrifuge tub 50 (e.g., to have its rotational movement be enslaved with the rotational movements of the tub), FIGS. 30J and 30Q-30X show that, in some other embodiments, the basket 10 is configured to spin with respect to the tub 50. In this regard, the basket can be rotatably coupled to the tub and/or to any other suitable portion of the system 5 in any suitable manner. Indeed, in some embodiments in which the basket is configured to spin with respect to the tub, the basket is permanently and rotationally coupled to the tub (e.g., the basket is welded, bonded, riveted, and/or otherwise permanently coupled to a bearing and/or a motor axle that is powered by the actuator 236). In some other embodiments, however, the basket is configured to be selectively and rotationally coupled to, and to be decoupled from, the tub via one more mating processes, mating recesses, clamps, catches, frictional engagements, splines, keyed mating elements, mechanical engagements, adhesives, gears, crimps, electromagnetic contact surfaces, magnetic locks, and/or in any other suitable manner. By way of non-limiting illustration, FIGS. 30J and 31B-31C show some embodiments in which the basket 10 comprises one or more recesses 19 that are configured to mate with one or more processes 23 (see FIG. 30S) that are disposed within the tub 50 (e.g., on a waterproof bearing 250 (see e.g., FIG. 30S), motor axle, and/or on any other suitable component of the system 5).

With reference now to the centrifuge tub 50, the centrifuge tub can (as described above) have any suitable component or characteristic that allows it to hold the fry medium and the basket 10 (e.g., for cooking or otherwise heating the food product). Indeed, in some embodiments, the tub comprises and/or is otherwise associated with one or more thermometers and/or thermocouples that are configured to determine a temperature of the fry medium (e.g., to cause the heater 234 and/or control system 242 to raise the temperature of the fry medium, to lower the temperature of the fry medium, to turn off the heater, to increase a temperature of the heater, to lower a temperature of the heater, to turn on one or more fans in the system 5, and/or to perform any other suitable purpose). By way of non-limiting illustration, FIGS. 30J and 30R show some embodiments in which the tub 50 comprises a thermocouple 252 that is in signal communication (e.g., via one or more wires and/or wireless connections) with the control system 242 (see e.g., FIG. 30R).

Additionally, in some embodiments, the system 5 (e.g., the centrifuge tub 50 and/or any other suitable part of the system) comprises one or more sensors to determine a level of fry medium in the tub. Indeed, in some embodiments, the tub comprises one or more point level sensors, ultrasonic sensors, conductive sensors, capacitive oil level sensors, oil level sensors, and/or any other suitable sensors that are configured to measure a level of fry medium in the tub. In such embodiments, the sensors can communicate with the control system 242 for any suitable purpose, including, without limitation, to cause the system to add additional fry medium to the tub, to remove excess fry medium from the tub, to determine if the system has been knocked or jostled, and/or for any other suitable purpose.

Some embodiments of the centrifuge tub 50 comprise one or more drains, drain valves 58, pumps, stopcocks, and/or any other suitable mechanism that is configured to allow the fry medium to be introduced and/or removed from the tub. By way of non-limiting illustration, FIG. 30J shows an embodiment in which the centrifuge tub 50 comprises one or more drain valves 251.

With respect to the ventilation system 232, some embodiments of the system 5 optionally comprise one or more ventilation systems that are configured to cool one or more portions of the system 5, to cool the food product, to cool the fry medium, to help filter off-gassing and airborne particulates released from the contents of the basket 10 and/or the centrifuge tub 50, to help filter ambient air around the system, to help diffuse aroma from the system into ambient air, to help liquid nitrogen (discussed below) vaporize, and/or for any other suitable purpose. In this regard, the system can comprise any suitable number of fans, impellers, chimneys, ducts, filters, valves, vacuums, components that are configured to open and/or close one or more chambers and/or conduits in the system, and/or other suitable devices that are configured to move, direct, filter, control, and/or otherwise modify airflow in the system. By way of non-limiting illustration, FIG. 30T shows an embodiment in which the system 5 comprise at least three fans 254 and a number of internal chimneys and/or other ducts 256.

Figure 30T:
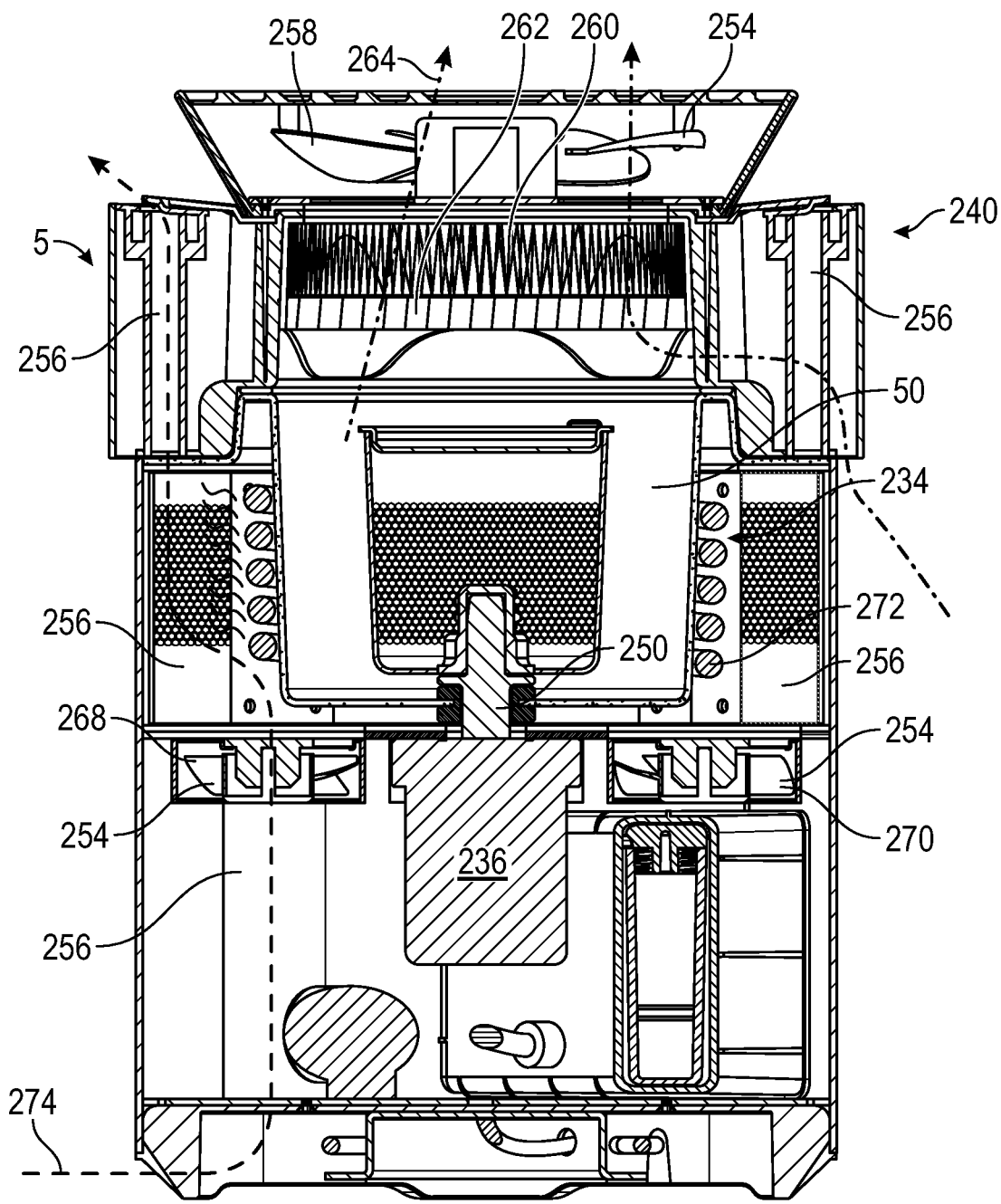
Figure 31C:
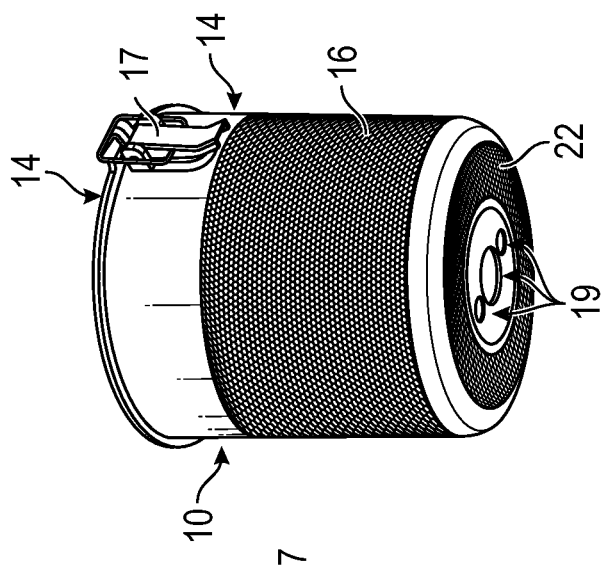
FIGS. 31A-31C different perspective views of the basket, in accordance with some representative embodiments.
Figure 31B:
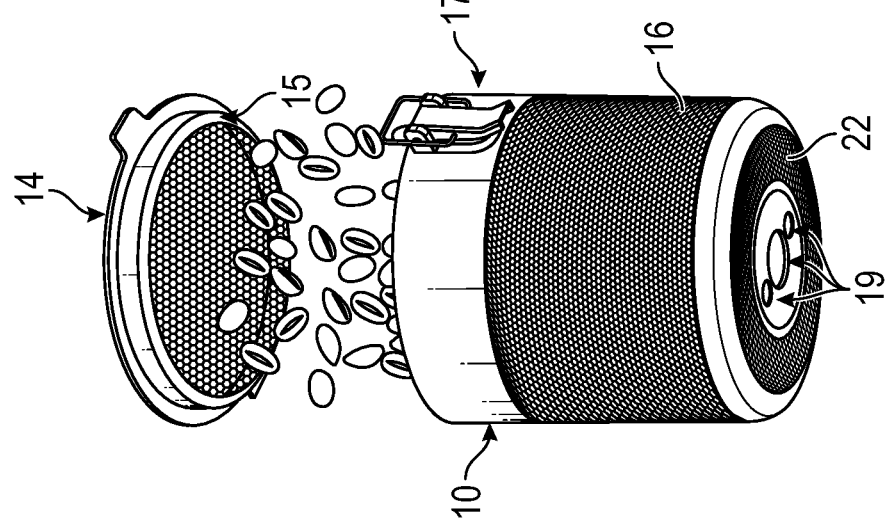
Figure 31A:
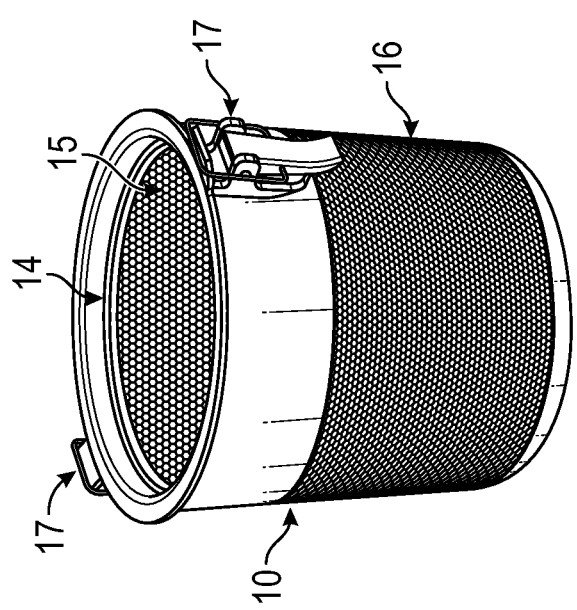

While one or more ventilation systems 232 can have any suitable configuration and can function in any suitable manner, FIG. 30T show that, in some embodiments, a fan 258 is disposed in the lid 240 so as to draw moisture, smoke, fry medium particulates, and/or particulate matter out of the centrifuge tub 50 (e.g., as illustrated by arrow 264) and optionally through one or more filters 260 and/or catalyzing materials 262 (e.g., to help ensure that: hot oils and/or water do not sputter from the system 5, particulates are filtered from the air, and/or to perform any other suitable function). Additionally, FIG. 30T shows in some embodiments, the fan 258 in the lid is configured to draw in ambient air (e.g., as illustrated by arrow 266) and (in some embodiments) to run such air past one or more filters 260 and/or catalyzing materials 262. Thus, in some embodiments, the system is configured to act as an air filter and to clean air around the system.

As another example of a ventilation system, FIG. 30T shows that, in some embodiments, the system 5 comprises one or more fans or impellers (e.g., fans 268 and/or 270) that are configured to blow air past the heater 324 (e.g., heat element 272). While such a configuration can perform any suitable function, in some embodiments it helps to cool the system (e.g., as shown by arrow 274) so as to keep an exterior surface of the system cool to the touch, to cool down the roasted food product, to keep the system from overheating, to cool down the fry medium, and/or for any other suitable reason.

Figure 30U:
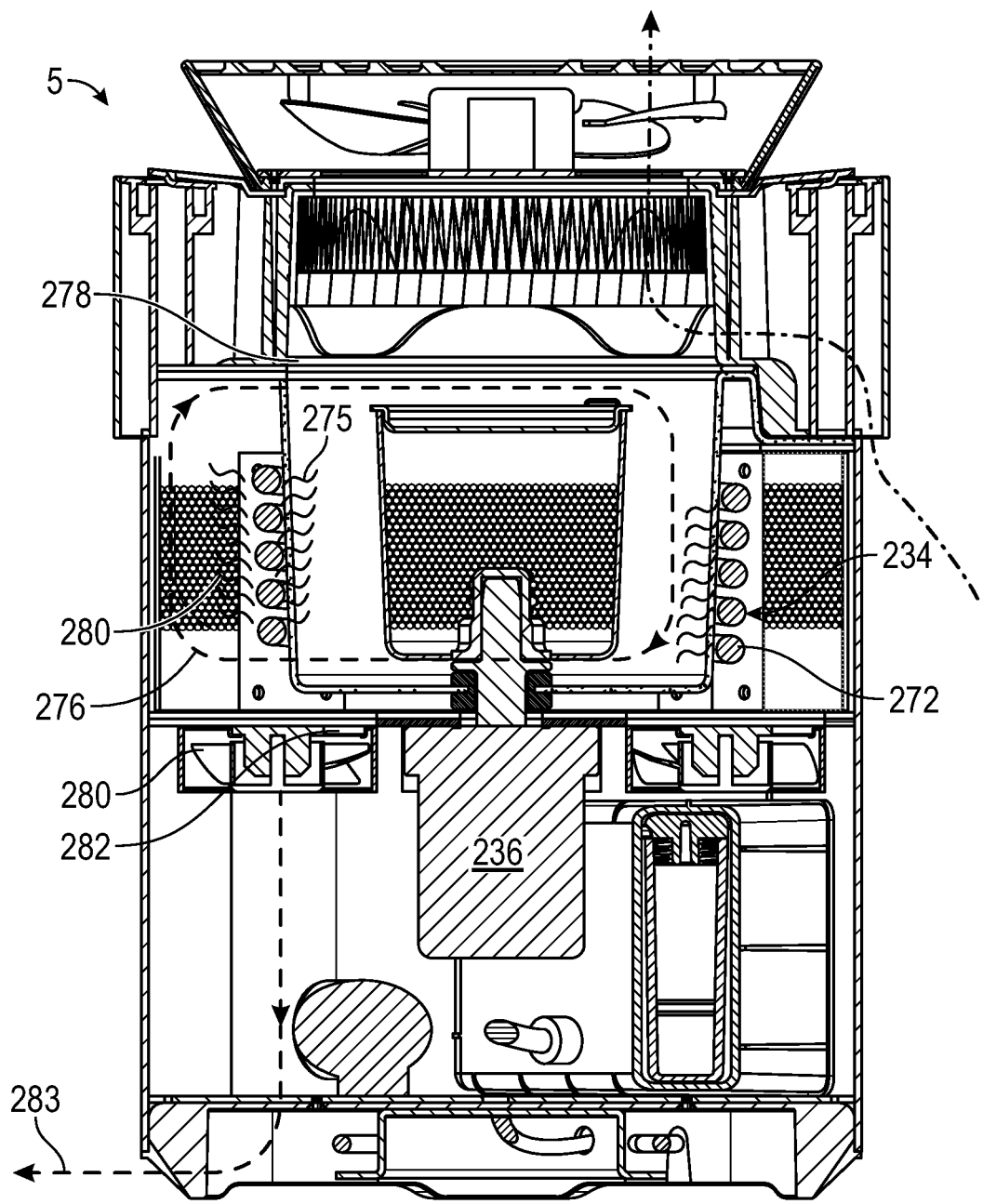

In yet another example of a suitable ventilation system, FIG. 30U shows an embodiment in which the system 5 is configured to recirculate air and/or heat within a recirculating roasting chamber 275 (e.g., a chamber in the system in and/or around the centrifuge tub 50, for instance where the tub has a lid). In some such embodiments, the system is closed, or configured to selectively close off, the recirculating roasting chamber such that the system is capable of not directly venting outside (e.g., while the roasting is taking place and/or at any other suitable time). Additionally, in some embodiments, the system is configured to subject the recirculating roasting chamber to a vacuum (or at least a partial vacuum (e.g., as illustrated at by arrow 283 in FIG. 30U) at any suitable time, including, without limitation, during roasting, during centrifugation, and/or at any other suitable time (e.g., to reduce smoke and/or soot). In any case, where the system comprises a recirculating roasting chamber (e.g., where the system is configured to recirculate air (as shown by arrow 276 in FIG. 30U); to not directly vent air from within the centrifuge tub and/or the heating element 272 to ambient air during roasting, and/or at any other suitable time; and/or to subject the recirculating roasting chamber to a partial vacuum), the system can comprise any suitable component. By way of non-limiting illustration, FIG. 30U shows an embodiment in which the system 5 comprises one or more heat transfer exchange fins 278, vacuums and/or heat exhaust fans 280, one-way vacuum air valves 282, and/or any other suitable component.

With respect to the heater 234, the described system 5 can comprise any suitable type of heater (e.g., as mentioned above) that is configured to heat the centrifuge tub 50, the fry medium, the basket 10, and/or a food product. Indeed, in some embodiments, the heater comprises one or inductive heaters (such as induction heating coil assembly 186), heating elements, sheathed heating elements, volcanic sheathed heating elements, metal heating elements, composite heating elements, burners, torches, flames, radiators, infrared heaters, boilers, heat pumps, microwaves, and/or any other suitable heater. By way of non-limiting illustration, FIGS. 30Q through 30U show some embodiments in which the heater 234 comprises one or more electric heating elements 272. Additionally, FIG. 30V shows that in some embodiments, the heater 234 comprises one or more microwave heaters 284 (e.g., comprising one or more magnetron tubes 286, wave guides 288, step-up transformers 290, power supplies, non-ferrous baskets 292, non-ferrous centrifuge tubs 293, wave stirrers 294, and/or any other suitable component).

Figure 30V:
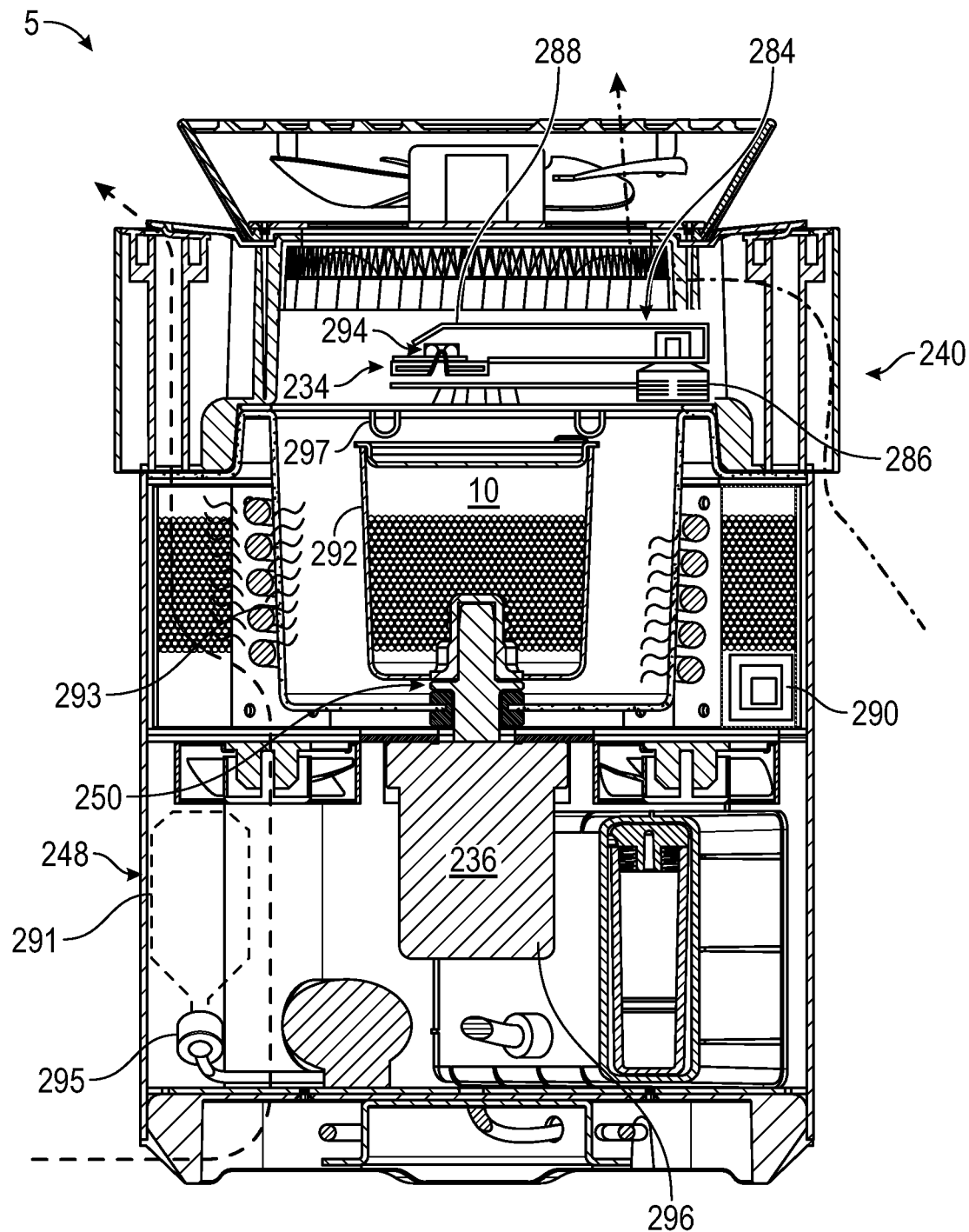

Additionally, while (in accordance with some embodiments of the described system) one or more heaters 234 are configured to rotate with the centrifuge tub 50, in some other embodiments (e.g., as shown in FIGS. 30U and 30V) the heater 234 is configured to be fixed in place with respect to the centrifuge tub 50 and/or the system 5. Moreover, while the heater can be disposed in any suitable location with respect to the tub 50 (e.g., around, below, on one or more sides of, within, and/or in any other suitable location with respect to the tub), FIG. 30U shows an embodiment in which at least a portion of the heater 234 is wrapped around a portion of the centrifuge tub 50. In accordance with some other embodiments, however, FIG. 30V shows an embodiment in which a portion of the heater 234 (e.g., a microwave heater 284) is disposed above the centrifuge tub 50 (e.g., in the lid 240) and/or in any other suitable location. In some such embodiments, the microwave heater may heat the food product which in turn further heats the fry medium.

With respect to the actuator 236, the described system 5 can (as described above) comprise any suitable component that is configured to spin the basket 10 and/or centrifuge tub 50 (e.g., to remove fry medium from the basket). In this regard, some examples of suitable actuators comprise one or more motors, rotary actuators, belt drive systems, hydrostatic drive systems, geared systems, direct drive systems, indirect drive systems, pneumatic rotary actuators, hydraulic rotary actuators, electromagnetic drive systems, and/or any other suitable component that is configured to spin the basket. By way of non-limiting illustration, FIG. 30V shows an embodiment in which the system 5 comprises a motor 296 that directly drives rotation of the bearing 250 and/or motor axle that couples to the basket 10.

With reference now to the reservoirs 238, although some embodiments of the described system 5 lack any reservoir for storing the fry medium once it is released from the centrifuge tub 50, in some other embodiments, the system comprises one or more reservoirs that are located in the system and/or that are configured to be in fluid communication with the system to allow fry medium to be drained from the tub, to be moved from the reservoir to the tub, to be discarded in or from the reservoir, to be filtered and recycled, and/or to otherwise be handled when the fry medium is exiting, is entering, and/or is not otherwise entirely within the tub.

Where the system 5 comprises one or more reservoirs 238, the reservoirs can be disposed in any suitable location, including, without limitation, below, above, in front of, in back of, and/or to the side of the centrifuge tub, inside an apparatus comprising the centrifuge and heater 234, outside such an apparatus, and/or in any other suitable location. By way of non-limiting illustration, FIGS. 30H and 30Q show that, in some embodiments, the reservoir 238 is disposed at a back side of the system 5 (e.g., below the centrifuge tub 50). Additionally, while some embodiments of the reservoir are permanently coupled to the system, FIGS. 30H and 30Q show some other embodiments in which the reservoir 238 is selectively removable from the system 5.

Where the reservoir 238 is selectively removable from the system 5 (e.g., to change out oil, to discard old oil, and/or for any other suitable purpose), the reservoir can have any suitable characteristic. Indeed, in some embodiments, the reservoir comprises a disposable container that is configured to be punctured (e.g., like a KEURIG™ cup) when it is placed in the system such that the container can be emptied and refilled any suitable number of times. Although such a puncture can be formed in any suitable portion of the container, in some cases, it is located in an upper portion of the container (e.g., such that when it is time to discard the container, the container can be removed from the system; a sticker, piece of tape, and/or any other suitable plug can be applied to the puncture; and the container can be discarded).

In some embodiments, the reservoir 238 comprises one or more valves, stopcocks, two-way valves, male valves, female valves, spring-loaded valves, and/or any other suitable component that is capable of being selectively closed to retain fry medium within the reservoir when the reservoir is removed from the system 5. Indeed, in some embodiments, the reservoir comprises a spring-loaded valve that is configured to automatically close when the reservoir is removed from the system. By way of non-limiting illustration, FIGS. 30P and 32A-32D show some embodiments in which the reservoir 238 comprises one or more male valves 298 having an internal valve structure 300 that is configured to automatically close the valve 298 when the reservoir 238 is withdrawn from the system 5.

Figure 32A:
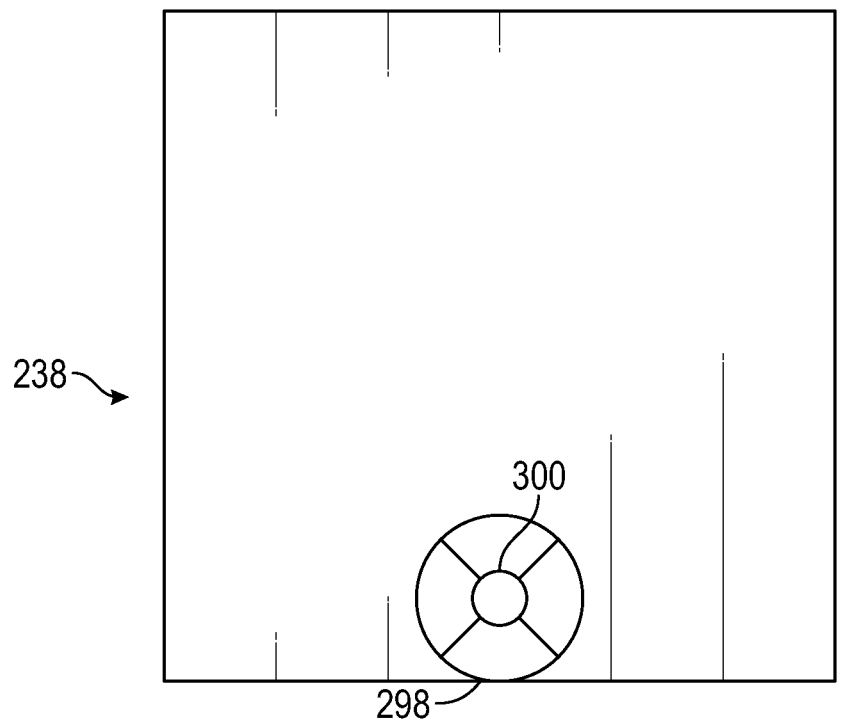
FIGS. 32A-32D show various view of a fry medium reservoir, in accordance with some representative embodiments.
Figure 32B:
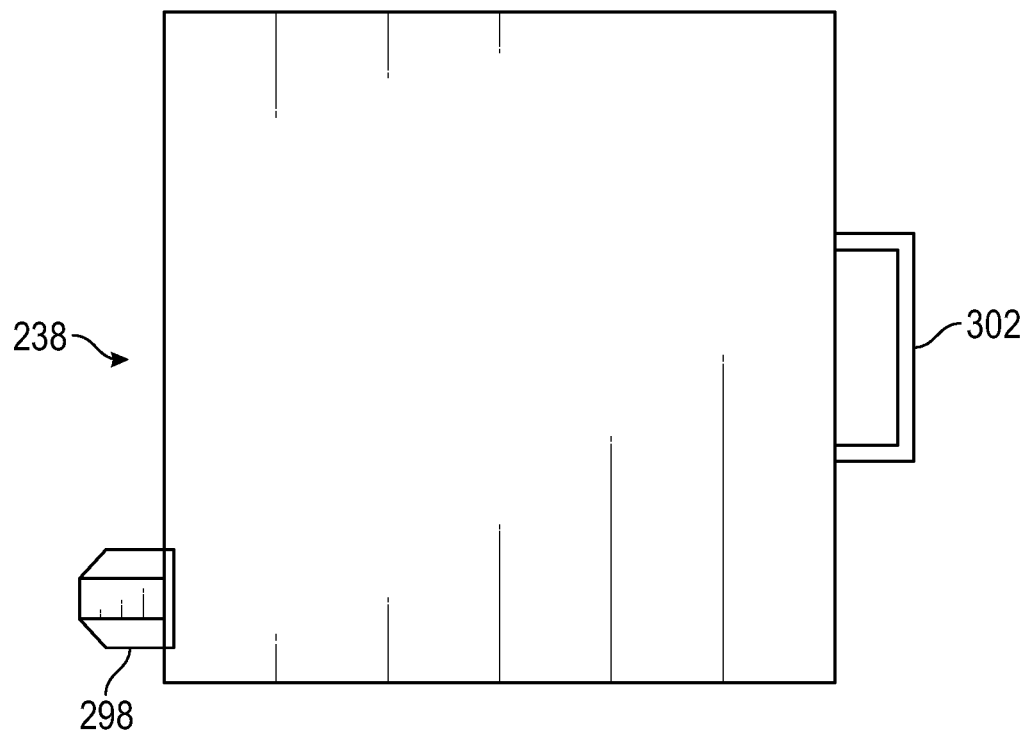
Figure 32C:
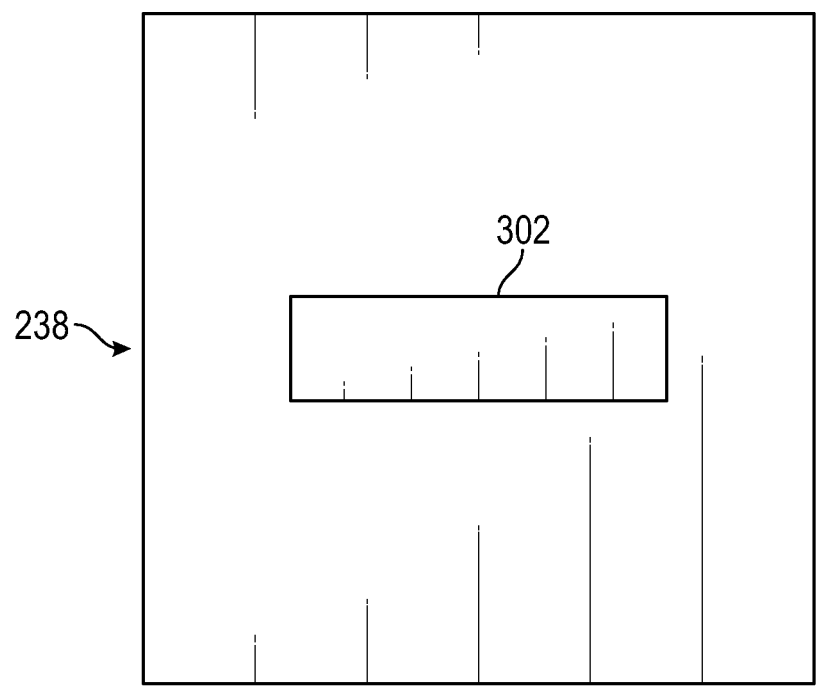
Figure 32D:
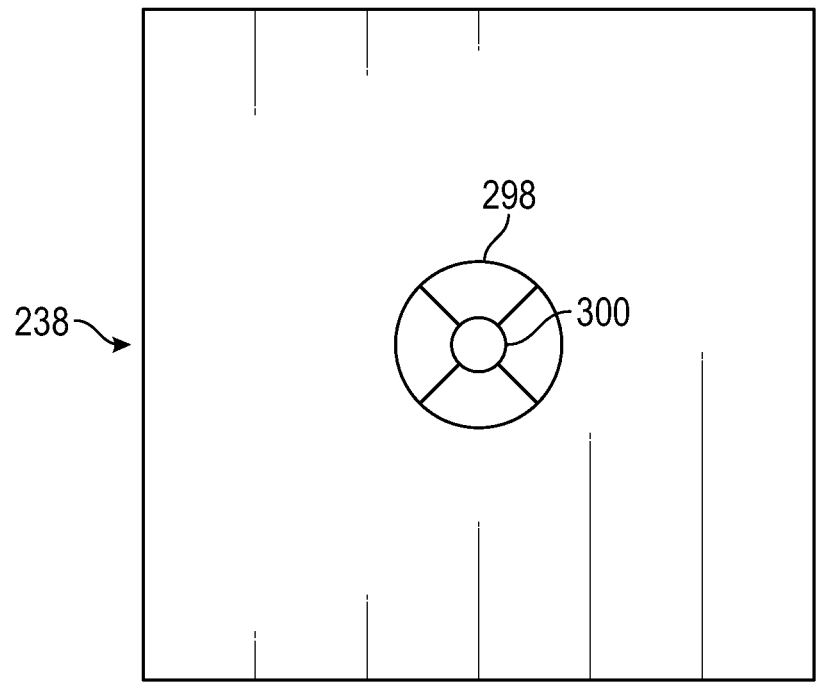
Figure 33:
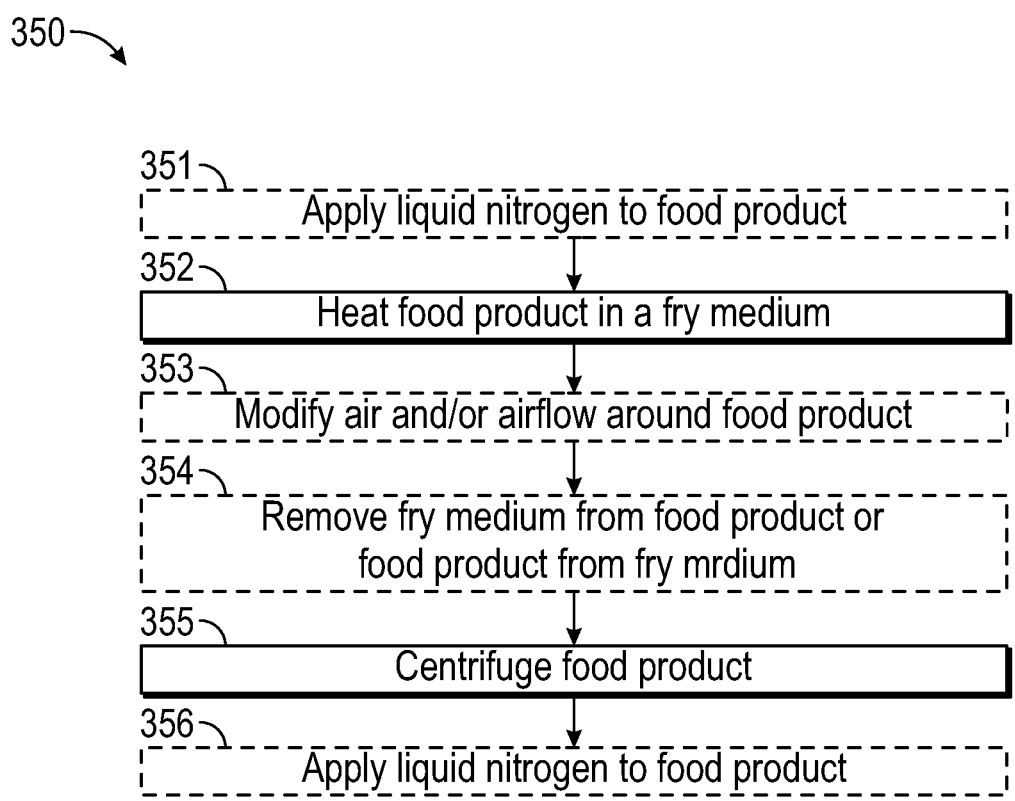
FIGS. 33-36D include flowcharts that depict different representative embodiments of method for using the described systems.

As an additional characteristic, some embodiments of the reservoir 238 comprise one or more handles, straps, knobs, and/or other features that are configured to facilitate manipulation of the reservoir 238. By way of non-limiting illustration, FIGS. 32B and 32C show some embodiments in which a backside of the reservoir 238 comprises one or more handles 302.

In addition to the aforementioned features, the reservoir 238 can comprise any other suitable feature. Indeed, in some embodiments, the reservoir comprises one or more insulative materials to protect users from being burned when hot fry medium has been introduced into the reservoir. In some embodiments, the reservoir comprises (or is otherwise used with) one or more heat-dissipating materials, heatsinks, fins, fans, and/or other mechanisms that are configured to help cool the reservoir relatively quickly. In still other embodiments, the reservoir comprises one or more QR codes, bar codes, RF IDs, and/or any other suitable feature that the system can use to determine when a particular batch of fry medium (e.g., a disposable reservoir) was added to the system (e.g., so that system 5 can indicate when a particular batch of oil is old and should be removed from the system).

With reference now to the system lid 240, the lid can comprise any suitable feature that allows it to cover the basket 10 during roasting and/or centrifugation. By way of non-limiting illustration, FIG. 30L shows that, in some embodiments, the lid 240 comprises one or more: roasting chamber seals 304 (e.g., one or more seals comprising silicon, rubber, plastic, metal, and/or any other suitable material to help seal the system; to direct air steam, smoke, and/or off-gassing up through the filter 260; and/or for any other suitable purpose; internal structures 305 (e.g., to funnel and direct air to a filter); heat shields 306 (e.g., to protect a user from some of the hottest parts of system 5, for aesthetics, and/or for any other suitable reason); handles 307 (e.g., to open, close, lock, and/or unlock the lid 240); filters 260 and/or catalyzing materials 262 (e.g., to filter and/or catalyze reactions in materials found in air leaving and/or in proximity to the system); filter seals 308 (e.g., a flexible seal comprising silicon, rubber, and/or any other suitable material and/or tabs for easy removal) that is configured to selectively retain the filter and/or the catalyzing material in the lid; heat exhaust chimneys 309 (e.g., to direct airflow through the lid); heat shield upper covers 310 (e.g., to cover the chimneys and provide an egress for some air that passes through the system; fan shields 311 (e.g., to cover the fan and/or to help direct airflow); fans 254 (e.g., to draw air from and/or into the system); fan covers 312; and/or any other suitable components.

Where the system lid 240 comprises one or more handles 307, the handles can function in any suitable manner. By way of non-limiting illustration, FIGS. 30M-30N show some embodiments in which the handle 307 is configured to be rotated to one position (e.g., along arrow 257) to lock the lid 240 in a closed position (e.g., when the handle is vertical) and/or to be rotated to another position to allow the lid to open. In some embodiments, the system is configured to only heat the oil and/or to spin the basket 10 when the lid is locked in the closed position. Thus, in some embodiments, it is easy to see whether or not the system 5 can be started.

Additionally, the handle 307 can have any other suitable component. For instance, the handle can be any suitable shape. Additionally, FIG. 30M shows that, in some embodiments, the handle 307 comprises one or more heat shields 259 to help protect a user from being burned.

With respect to the control system 242, the system 5 can comprise any suitable component or characteristic that allows it to control one or more functions of the system. Indeed, in some embodiments, the control system comprises one or more dials, knobs, buttons, switches, touchpads, touchscreens, printed circuit boards, wireless connections (e.g., to a phone, BLUETOOTH™ device, and/or to any other suitable computer device), and/or any other suitable user interface; sensors (e.g., to determine if the basket 10 and/or centrifuge tub 50 is properly balanced, to determine a heat of the system, to detect errors or damage in the system, to run diagnostics on the system, to measure G forces of the basket 10 and/or tub 50, to weigh an amount of food product added to the basket, to determine if the lid 240 is closed and/or locked, to detect smoke, to determine if the system is level, to determine if the system is vibrating, to correct any errors, to rebalance the food product, and/or to perform any other suitable function); processors and/or computers (e.g., as discussed below); programs; routines; setting selections; notifications; alerts; and/or any other suitable component or characteristic. By way of non-limiting illustration, FIG. 30P shows an embodiment in which the control system 242 comprise one or more knobs that can be set to a particular setting (e.g., temperature; spin speed; spin time; cooking setting, such as light, medium, or dark; for a particular food item, such as coffee, shrimp, or corndog; and/or to any other suitable setting).

With respect to the cord system 244, the described system 5 can comprise have any suitable cord system that allows the system to be powered. Indeed, in some embodiments, the system comprises a cord that extends from the system without any storage device for the cord. In some other embodiments, the cord comprises a break away cord (e.g., a magnetically coupled cord and/or any other suitable cord) that is configured to readily disconnect from the system when the cord is pulled (e.g., to prevent the system from falling when a child or anyone else pulls on the cord). In still other embodiments, the system comprises one or more catches, recesses, spindles, spools, and/or any other suitable type of holder that is configured to hold the cable. In accordance with still other embodiments, FIGS. 30I and 30G show some examples in which the system 5 comprises a spring-loaded cable spool 245 that is configured to allow the cord 247 to be extended, to be selectively retained at a desired extension, and/or to be selectively rewound around the spool (e.g., when the cord is extended past a certain position, when the cord is pulled abruptly, and/or in any other suitable manner).

With respect to the filtration systems 246, although some embodiments of the described system 5 lack any type of filtration system, some other embodiments comprise one or more filters (e.g., filter 260) that are disposed in any suitable location and that are configured to filter: fry medium; air, moisture, smoke, pollutants, and/or other airborne materials that would otherwise be released from the system; and/or ambient air around the system. In this regard, the filter can comprise any suitable filer, including, without limitation, one or more HEPA filters, washable filters, electrostatic filters, spun glass filers, photocatalytic air purifiers, pleated filters, paper filters, cellulose filters, canister filters, and/or any other suitable filters. Indeed, in some embodiments, the filter comprises a washable HEPA filter.

Additionally, where the filtration system 246 optionally comprises one or more catalytic materials 262, the system 5 can comprise any suitable catalytic materials. In this regard, some non-limiting examples of such materials include gold particles, rhodium, platinum, palladium, cerium, iron, manganese, nickel, ceramic materials, and/or any other suitable catalytic materials that can be used to help induce a chemical reaction to render less dangerous chemicals that are produced by the system and that could otherwise be dangerous or unwanted (e.g., to break down ammonia, noxious gases, hydrocarbons, VOCs, nitrogen oxides (NO and $NO_2$ (together called $NO_x$)), carbon monoxide, nitrogen oxides ($NO_x$), and/or any other suitable materials that are produced as the system functions).

In some embodiments, the system 5 is optionally configured to apply liquid nitrogen (and/or any other chemical, material, and/or ingredient) to a food product at any suitable time, including, without limitation, before the food product is heated in the fry medium, as the food product spins in the basket, after the food product has been heated, after the food product has been spun in the basket 10, and/or at any other suitable time. In this regard, the application of liquid nitrogen to a food product (e.g., coffee beans) can perform any suitable function, including, without limitation, changing a texture, coloration, taste, aroma, mouthfeel, shelf life, and/or any other suitable characteristic of the food.

Figure 30W:
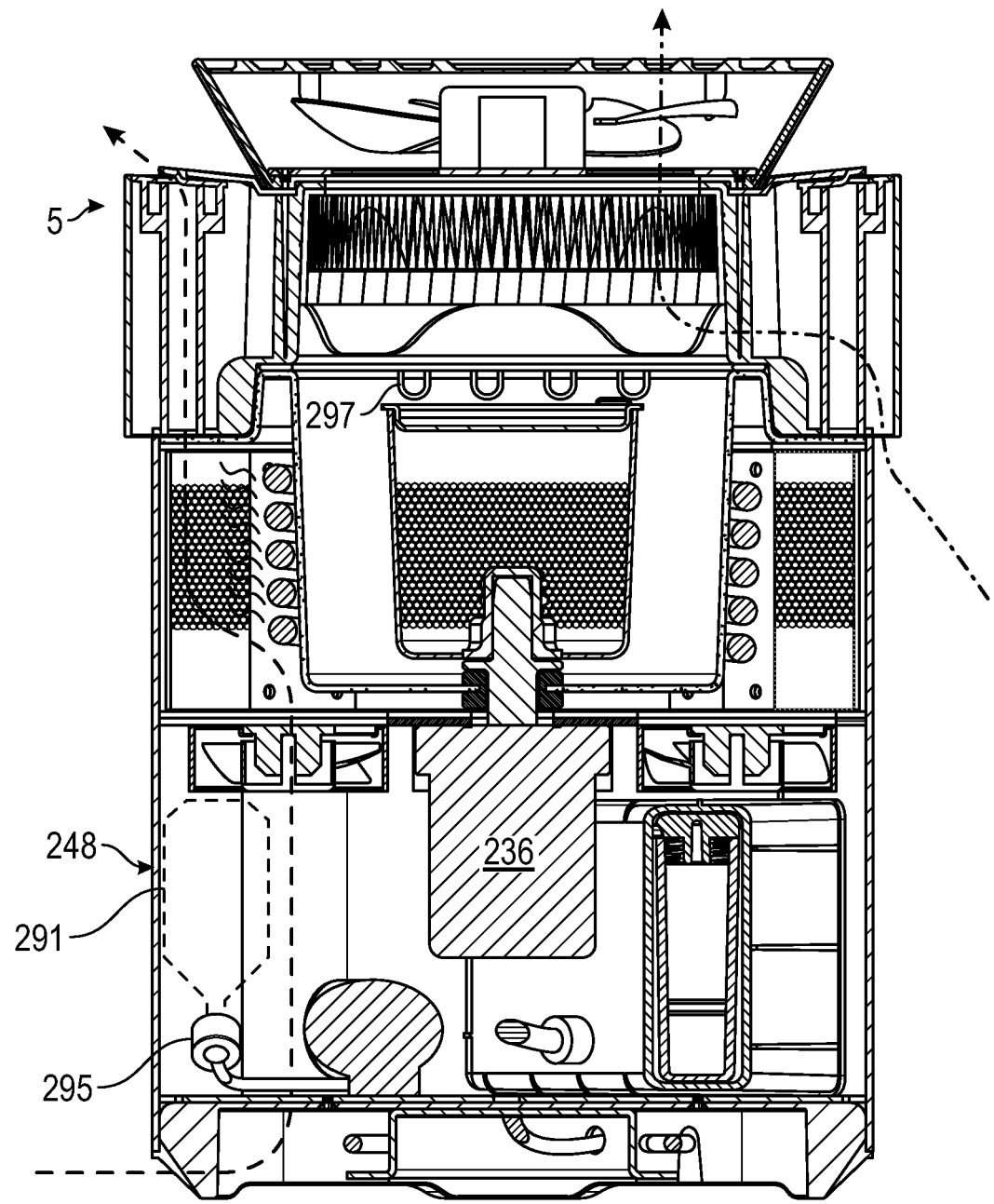
Figure 30X:
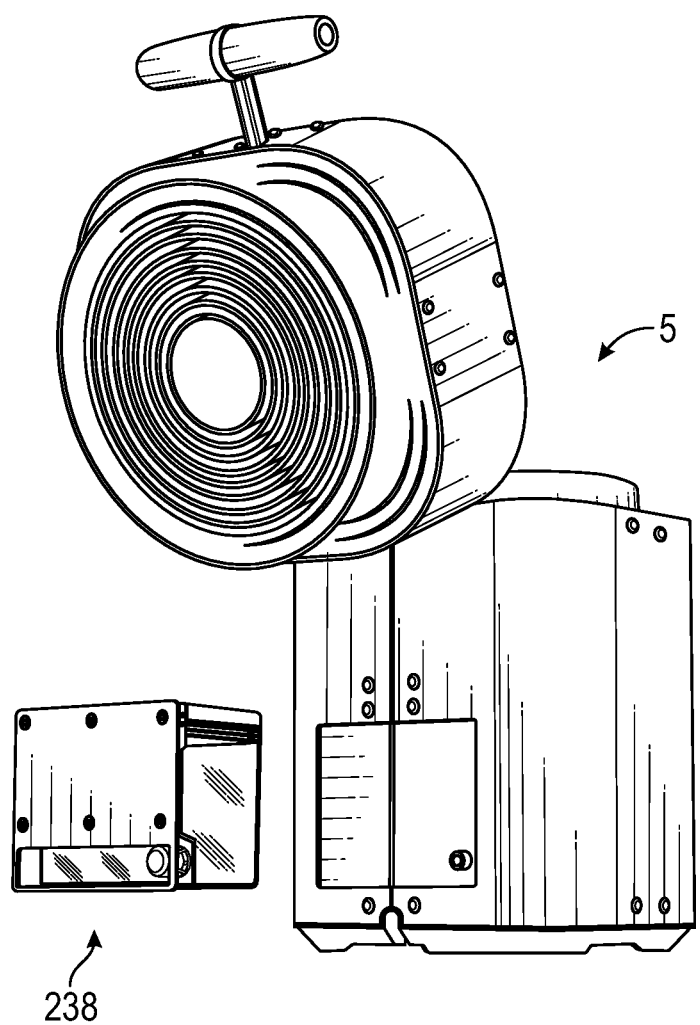

The system 5 can be configured in any suitable manner that allows it to apply liquid nitrogen (or any other chemical, material, and/or ingredient) to a food product. Moreover, the system can comprise any suitable component or characteristic that allows it to perform such a function. By way of non-limiting illustration, FIGS. 30V and 30W show some embodiments in which the system 5, is in fluid communication with one or more cartridges 291 and/or other containers that comprise liquid nitrogen and/or any other suitable ingredient. Additionally, such figures show that, in some embodiments, the system 5 comprises one or valves 295 that are configured to selectively release liquid nitrogen and/or one or more other ingredients, to one or more nozzles 297 that are configured to apply the liquid nitrogen (and/or other ingredients) to the food product.

In addition to the aforementioned components and characteristics, the described system 5 can comprise any other suitable component or characteristics that allows it to function as described herein. For instance, some embodiments of the described system comprise one or more pumps (e.g., pumps 299, as illustrated in FIG. 30R) that are configured to pump fry medium into and/or out of the centrifuge tub 50, to pump a material through the nozzles 297, and/or to perform any other suitable function.

Additionally, in some embodiments, the system 5 comprises one or more brakes (e.g., motor shaft brakes) that are configured to stop the basket 10 from spinning (e.g., as controlled by the control system 242). Furthermore, in some embodiments, the system comprises one or more automatic locks that are configured to automatically lock and/or unlock the lid 240 at any suitable time as the system functions (e.g., during roasting and/or centrifugation). Moreover, some embodiments of the described system 5 comprise one or more weights that are located in a lower portion of the system to lower a center of gravity for the system and to help prevent the system from falling over.

The described system 5 can be used in any suitable manner. In this regard, while all of the methods described herein can have one or more portions thereof be rearranged, reordered, omitted, replaced, substituted, performed simultaneously, performed separately, repeated, and/or otherwise be modified in any suitable manner, in some cases, the described method includes heating one or more food products (e.g., coffee beans) in a fry medium (e.g., cooking oil) and then having the food product be centrifuged to remove at least a portion of the fry medium from the food product (e.g., the beans). By way of non-limiting example, FIGS. 34-36C depict some representative embodiments of the described methods.

In this regard, FIG. 34 shows that in one method, the method 350 optionally includes (as shown at box 351) applying liquid nitrogen (or any other suitable material) to a food product before the food product is heated or roasted. Box 352 further shows that some embodiments of the method 350 continue (as shown at 352) as the food product is heated in the fry medium (e.g., either in the same apparatus that comprises the centrifuge 32 and/or in a separate apparatus). Box 353 shows that, in some embodiments, the method optionally includes modifying an airflow around the basket 10 (e.g., vacuuming out air in the recirculating roasting chamber 275, blowing air through the chamber or past the heater 234, shutting off venting from the heater to ambient air, and/or otherwise modifying air flow in the system 5). Box 354 shows that some embodiments optionally include removing the fry medium from the basket 10 (e.g., via one or more pumps 299, drains, and/or in any other suitable manner) and/or the basket from the fry medium. Box 355 further shows that some embodiments involve spinning the food product (e.g., at any suitable time, speed, and gravitational force) to remove excess fry medium from the food product. In this regard, some items (e.g., soft food products) can be spun at slower speeds than some other items (e.g., hard food products) to ensure that the food items are not deformed and/or destroyed in the spinning process. Box 356 shows that after the food product has been centrifuged, some embodiments of the method include optionally applying liquid nitrogen (and/or any other material) to the food product while and/or after it is centrifuged.

Figure 34A:
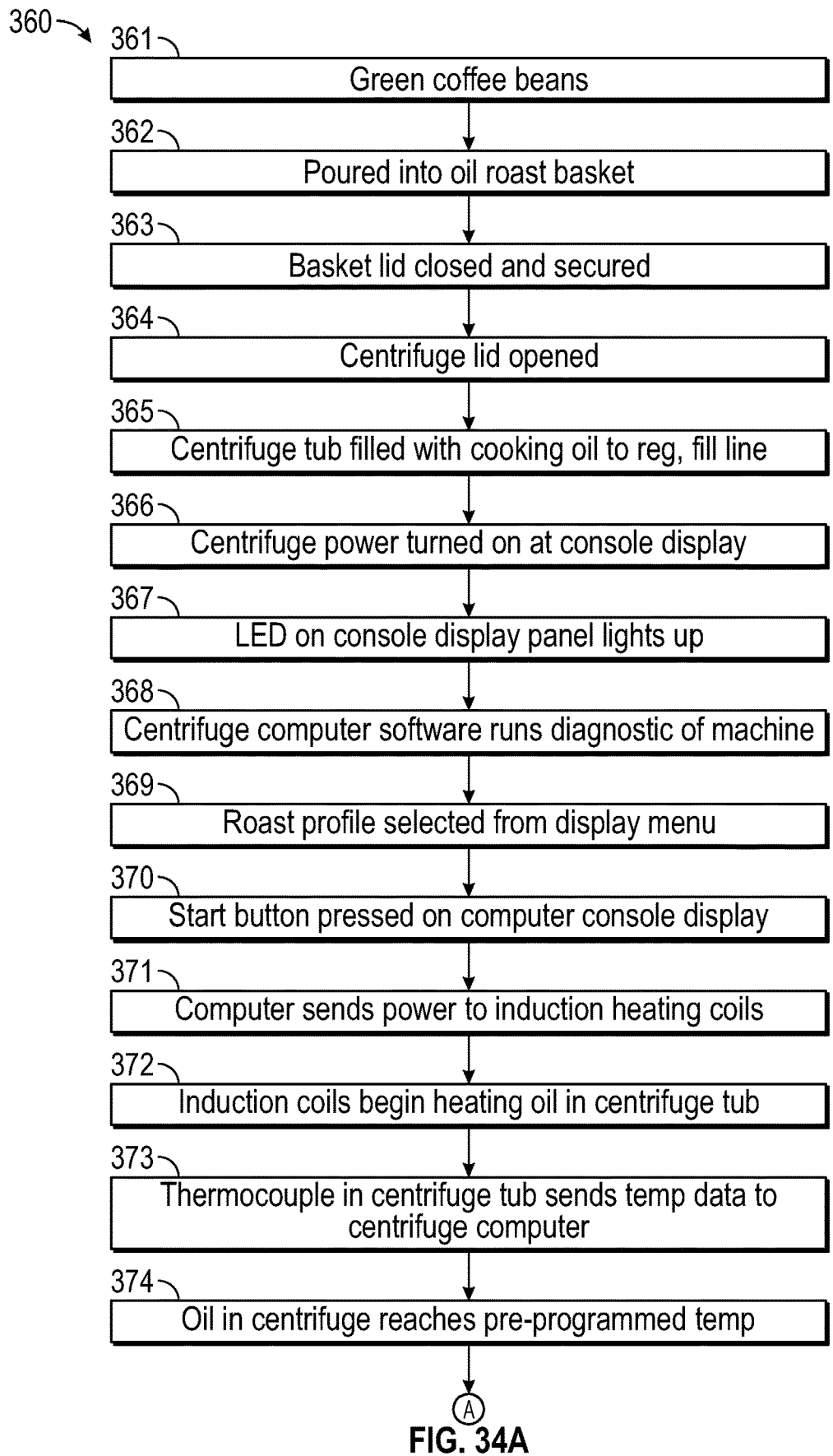

Additionally, FIGS. 34A-34D show some embodiments of a method for roasting coffee beans. In this regard, FIG. 34A shows that, in accordance with some embodiments, the method 360 includes: box 361 in which the perforated basket's lid 14 is off and green arabica, robusta, liberica, and/or any other variety of green coffee is obtained; box 362 in which the green coffee beans are poured into the perforated basket 10 at the desired capacity; box 363 in which the basket lid is closed and secured (e.g., via one or more latching mechanisms 17); box 364 in which the centrifuge lid 40 is opened; box 365 in which the centrifuge tub is filled to the desired level with cooking oil (and/or any other suitable fry medium); box 366 in which the centrifuge's power is turned on at the console display (e.g., display 42); box 367 in which one or more LED(s) (and/or any other suitable indicator or indicators) on the console display (and/or any other suitable location) light up (or are otherwise activated); box 368 in which centrifuge computer software runs one or more diagnostics of the system (e.g., to ensure that none of the components are damaged and/or to check for any other suitable status of the system); box 369 in which a desired program or setting is selected (e.g., a roast profile is selected from a display menu); box 370 in which the roasting process is started (e.g., a start button pressed on the computer console display); box 371 in which a processor or other computer sends power to the heater 234 (e.g., the induction coils 186); box 372 in which the heater (e.g., the induction coils) begin heating the oil (and/or any other suitable fry medium) in the centrifuge tub; box 373 in which a thermocouple 252 in the centrifuge tub 50 sends temperature data (and/or any other suitable data) to the centrifuge's processor (e.g., control system); box 374 in which oil (and/or any other suitable fry medium) in the centrifuge tub reaches a pre-programmed temperature (e.g., to about 223.9 degrees Celsius or any other desired temperature); box 375 (in FIG. 34B) in which the thermocouple sends a signal to the processor (e.g., control system) that the oil has reached the pre-programmed temperature (e.g., about 223.9 degrees Celsius or any other suitable temperature); box 376 in which one or more audible notifications are optionally emanated from the processor (or any other notification is provided), indicating that the system has reached the correct temperature; box 377 in which the thermocouple signaling the processor maintains the oil (and/or other fry medium) at or close to the desired temperature (e.g., about 223.9 degrees Celsius or any other suitable temperature); box 378 in which the oil roast basket is lowered into the centrifuge tub; box 379 in which the oil roast basket is secured in the centrifuge by one or more locking mechanisms and/or other coupling mechanisms (e.g., processes 23 and receptacles 19) in the centrifuge; box 380 in which the centrifuge lid is closed; box 381 (in FIG. 34C) in which the green coffee beans begin roasting stages; box 382 in which the processor (e.g., control system) maintains the correct roasting temp during one or more phases of roast; box 383 in which one or more audible notifications are (and/or any other suitable notification is) produced when the pre-programmed roast is complete; box 384 in which the controller (e.g., processor) opens one or more drain valves 58 and/or actuates one or more pumps 299 that are in fluid communication with the centrifuge tub; box 385 in which the oil (and/or other fry medium) is drained or otherwise removed from the centrifuge tub into a reservoir 238 (and/or a drain, a vat, and/or any other suitable recipient); box 386 in which the oil level sensor signals the processor that oil has drained; box 387 in which the processor (e.g., the controller) closes the centrifuge drain valve or valves; box 388 in which the processor sends one or more signals to the centrifuge motor 296 to begin an extraction phase; box 389 in which the centrifuge motor begins to slowly spin the tub; box 390 in which the centrifuge motor continues to spin tub at a desired speed (e.g., at 2800 rpm±400 rpm and/or at any other suitable speed); box 391 in which the centrifuge motor continues to spin the centrifuge tub for a desired amount of time (e.g., 4 min.±2 mins and/or for any other suitable amount of time); box 392 in which the processor (control system 242) signals the centrifuge tub motor to stop and/or engages a motor shaft brake; box 393 in which the centrifuge tub slows and stops; box 394 (shown in FIG. 34D) in which one or more audible signals (or other notifications) from the control system provide a notification that the roasting cycle is done, and the basket has stopped; box 395 in which the centrifuge lid is opened after the locking mechanism disengages; box 396 in which the oil roast basket is removed from the centrifuge; box 397 in which the oil roast basket lid is removed and the roasted coffee is poured into a bag/container; and/or box step 37 in which the method 360 is ended or repeated.

Figure 35A:
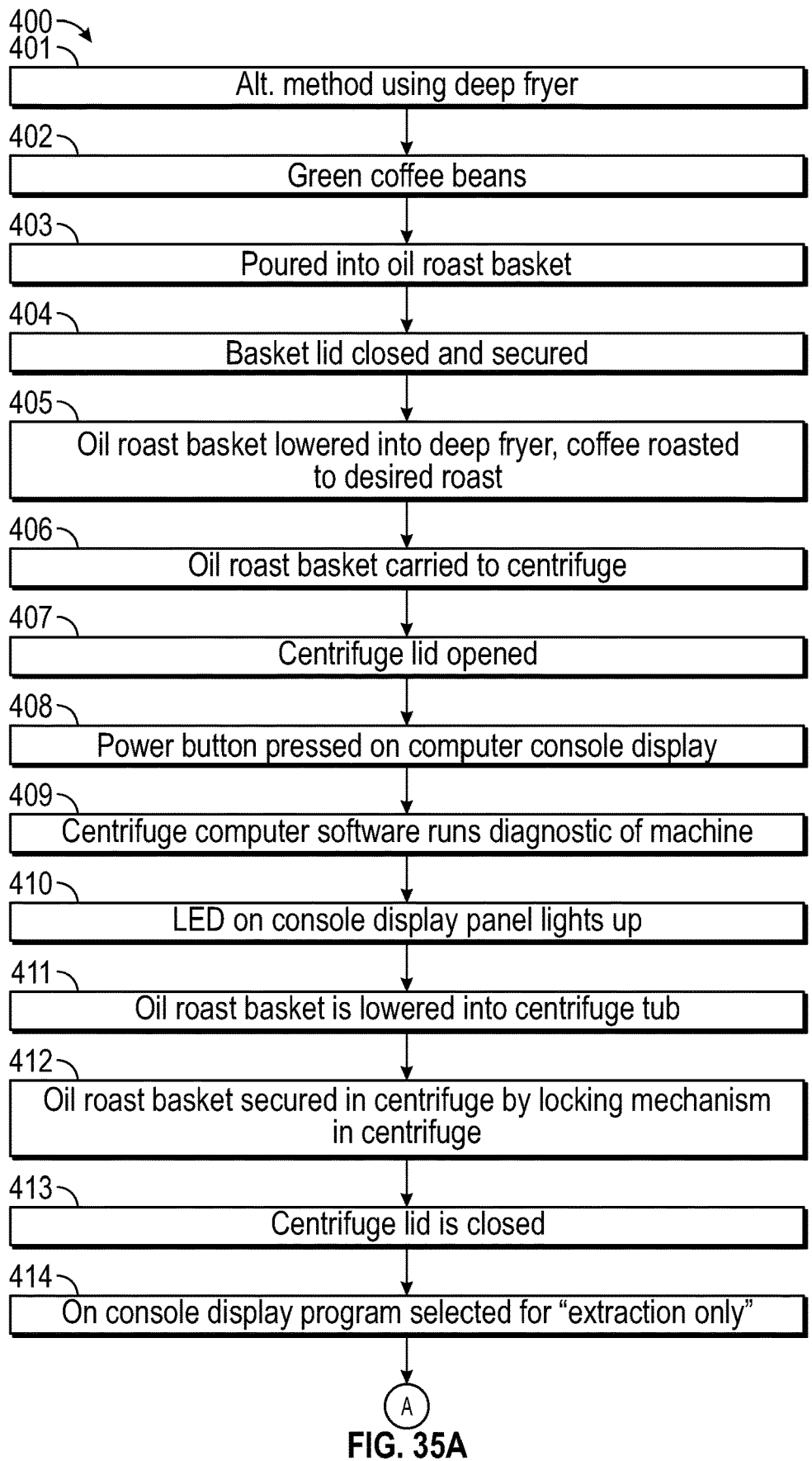
Figure 36A:
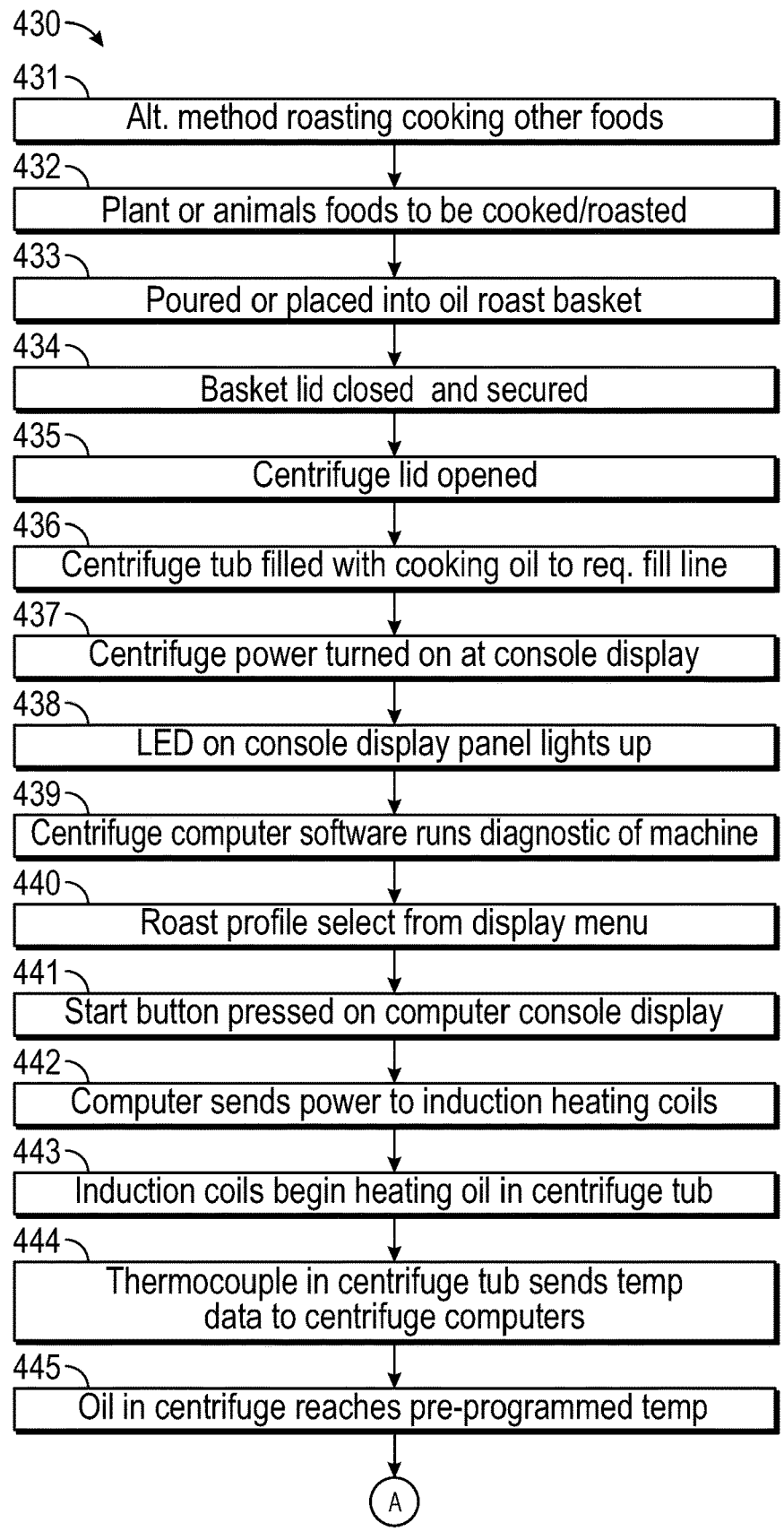

Moreover, FIGS. 35A-35B show (as indicated at box 401) an alternate method 400 for using the described system 5. In particular, these figures include: box 402 in which green coffee beans are obtained; box 403 in which the beans are poured into an oil roast basket 10; box 404 in which the basket lid 14 is closed and secured; box 405 in which the oil roast basket is lowered into the deep fryer, coffee roasted to desired roast; box 406 in which the oil roast basket is carried to a centrifuge; box 407 in which the centrifuge lid is opened; box 408 in which the power button is pressed on a computer console display (or a control system 242 is otherwise actuated); box 409 in which the centrifuge computer (or processor) software runs any suitable diagnostic of the machine; box 410 in which the LED on console display panel lights up (and/or any other suitable indication is given); box 411 in which the oil roast basket 10 is lowered into the centrifuge tub 50; box 412 in which the oil roast basket is secured in the centrifuge by a locking mechanism in the centrifuge; box 413 in which the centrifuge lid is closed; box 414 in which a program is selected for "extraction only" (e.g., centrifugation); box 415 (in FIG. 35B) in which the centrifuge start button is pressed at console display (and/or the system is otherwise started); box 416 in which the computer or processor sends a signal to the centrifuge motor to begin the extraction phase; box 417 in which the centrifuge motor begins to slowly spin the tub; box 418 in which the centrifuge motor spins the tub at any desired speed (e.g., 2800 rpm±400 rpm); box 419 in which the centrifuge motor continues to spin the centrifuge tub for any desired period of time (e.g., between about 10 seconds and about 12 minutes or within any subrange thereof); box 420 in which the control system signals the centrifuge motor to stop and engages a motor shaft brake; box 421 in which the centrifuge tub slows and stops; box 422 in which the audible signal (and/or any other suitable notification) from the computer or control system indicates that the "extraction only" cycle is done and that the basket has stopped; box 423 in which the computer opens the oil drain valve, actuates the pump, and/or otherwise drains oil into the reservoir; box 424 in which the centrifuge lid is opened and the locking mechanism disengages; box 425 in which the oil roast basket is removed from the centrifuge; and box 426 in which the oil roast basket lid is removed and the roasted coffee is poured into bag/container, wherein the method can be repeated and/or ended.

FIGS. 36A-36D show (as indicated at box 431) an alternate method 430 for using the described system 5. In particular, these figures include: box 431 which identifies an alternate method for roasting and/or otherwise cooking other food products; box 432 in which plant or animals food products to be cooked/roasted are obtained; box 433 in which the food products are poured or placed into the oil roast basket 10; box 434 in which the basket lid 14 is closed and secured; box 435 in which the centrifuge lid 40 is opened; box 436 in which the centrifuge tub 50 is filled with a desired amount of cooking oil; box 437 in which the centrifuge power is turned on at console display (e.g., at the control system 242); box 438 in which LED on console display panel lights up (and/or any other user interface is ready); box 439 in which the centrifuge computer or control system software runs any suitable diagnostic on the system; box 440 in which one or more specific roast profiles or programs are selected from the display menu (and/or user interface); box 441 in which the start button is pressed on the computer console display (and/or the system is otherwise actuated); box 442 in which the computer sends power to the induction heating coils and/or to any other heater; box 443 in which the induction coils (or other heater) begin heating oil in the centrifuge tub; box 444 in which a thermocouple in the centrifuge tub sends temperature data to the centrifuge computer; box 445 in which the oil in centrifuge reaches a pre-programmed temperature; box 446 (in FIG. 36B) in which the thermocouple sends a signal to computer that the oil has reached the desired temperature; box 447 in which an audible notification (and/or any other suitable notification) from the computer that system has reached the correct temperature; box 448 in which the thermocouple signals the computer to maintain the oil at a desired temperature; box 449 in which the oil basket is lowered into the centrifuge tub; box 450 in which the oil basket is secured in the centrifuge by a locking mechanism; box 451 in which the centrifuge lid is closed; box 452 (shown in FIG. 36C) in which the raw food products begin the roasting stage; box 453 in which the computer maintains the correct roasting temperature(s) during one or more phases of the roast; box 454 in which there is an audible notification (and/or any other suitable notification is given) when the pre-programmed roast is complete; box 455 in which the centrifuge computer (or control system) opens the drain valve on the centrifuge tub and/or actuates a pump; box 456 in which the oil is drained from the centrifuge tub into the reservoir; box 457 in which the oil level sensor signals the computer that the oil has drained from the tub; box 458 in which the computer closes the centrifuge drain valve; box 459 in which the computer sends a signal to the centrifuge motor to begin the extraction phase; box 460 in which the centrifuge motor begins to slowly spin the tub; box 461 in which the centrifuge motor spins the tub; box 462 in which the centrifuge motor continues to spin the centrifuge tub; box 463 in which the computer signals the centrifuge motor to stop and/or engages the motor shaft brake; box 464 (in FIG. 36D) in which the centrifuge tub slows and stops; box 465 in which an audible signal from the computer (and/or any other suitable notification) optionally notifies that the roasting cycle is done and/or that the basket has stopped; box 466 in which the centrifuge lid is opened and the locking mechanism disengages; box 467 in which the oil roast basket is removed from the centrifuge; box 468 in which the oil roast basket lid is removed and the roasted food product is taken out of the basket; and box 469 in which the method ends or from which the method repeats.

In addition to the aforementioned features, the described systems and methods can provide one or more additional features. Indeed, as fry medium (e.g., cooking oil) has a better thermal efficiency than air, in some embodiments, the described systems and methods are more efficient than are some competing methods. Additionally, in some embodiments, by roasting the beans in cooking oil (and/or any other suitable fry medium), an outer surface of the beans is sealed, such that caffeine and aromatics are sealed in the beans. Moreover, in some cases, use of cooking oil (and/or any other suitable fry medium) can increase bean caramelization over some conventional methods. Furthermore, in some embodiments, by frying or otherwise roasting the beans with fry medium (e.g., cooking oil), the described systems and methods can create less creosote, $CO_2$, smoke, waste, acrylamide, and/or one or more other undesirable byproducts of some competing methods and techniques. Further, in some cases, as the coffee beans are cooked in a fry medium (e.g., cooking oil) aromatics from the beans become infused in the fry medium, thus allowing the fry medium to be used for a variety of purposes (e.g., as an essential oil, in aromatic candles, in lotions, as a coffee extract, and/or in any other application in which coffee aroma and/or flavoring may be desirable). Moreover, in some embodiments, by using cooking oil, coffee beans can be roasted at higher temperatures than is possible or appropriate with some competing systems and methods. Indeed, in some embodiments, the beans are roasted in a fry medium (e.g., cooking oil) that has a temperature that is above 204 degrees Celsius.

The various components of the described system 5 can comprise any suitable material, including, without limitation, one or more types of metal (e.g., one more types of steel, aluminum, steel, ferrous materials, and/or any other suitable metal), metal alloys, ceramics, non-ferrous ceramics, fiberglass, silicon, rubber, plastics (e.g., polyethylene, high density polyethylene plastic, ultra-high-molecular-weight polyethylene, polypropylene, polyvinyl chloride, PVC sheet board, high-temperature heat-resistant plastics, and/or any other suitable plastics), rubbers, polymers, prepreg. aramid fibers, woods, carbon fibers, natural materials, synthetic materials, ultra-high-molecular weight (UHMW) materials (e.g., ultra-high-molecular weight polyethylene and/or other UHMW materials), and/or any other suitable materials.

The described system (e.g., centrifuge/fryer) can also be made in any suitable manner. In this regard, some non-limiting examples of methods for making the described system include, cutting, folding, bending, molding, shaping, extruding, drilling, using a computer numerical control device, connecting various pieces with one or more adhesives, mechanical fasteners (e.g., clamps, rivets, crimps, pins, brads, nails, staples, pegs, clips, screws, bolts, threaded attachments, couplers, etc.), 3D printing, additive manufacturing, welding pieces together, connecting pieces together, and/or any other suitable method that allows the described system to perform its intended functions.

Representative Operating Environment

As mentioned previously, some embodiments of the described system 5 are configured to be controlled via one or more processors. In this regard, the described system 5 can be used with, or in, any suitable operating environment and/or software. In this regard, FIG. 37 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions. In this regard, in some embodiments, the processing unit (e.g., as mentioned above) comprises a specialized processing unit that is configured for use with the described system 5.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 37:
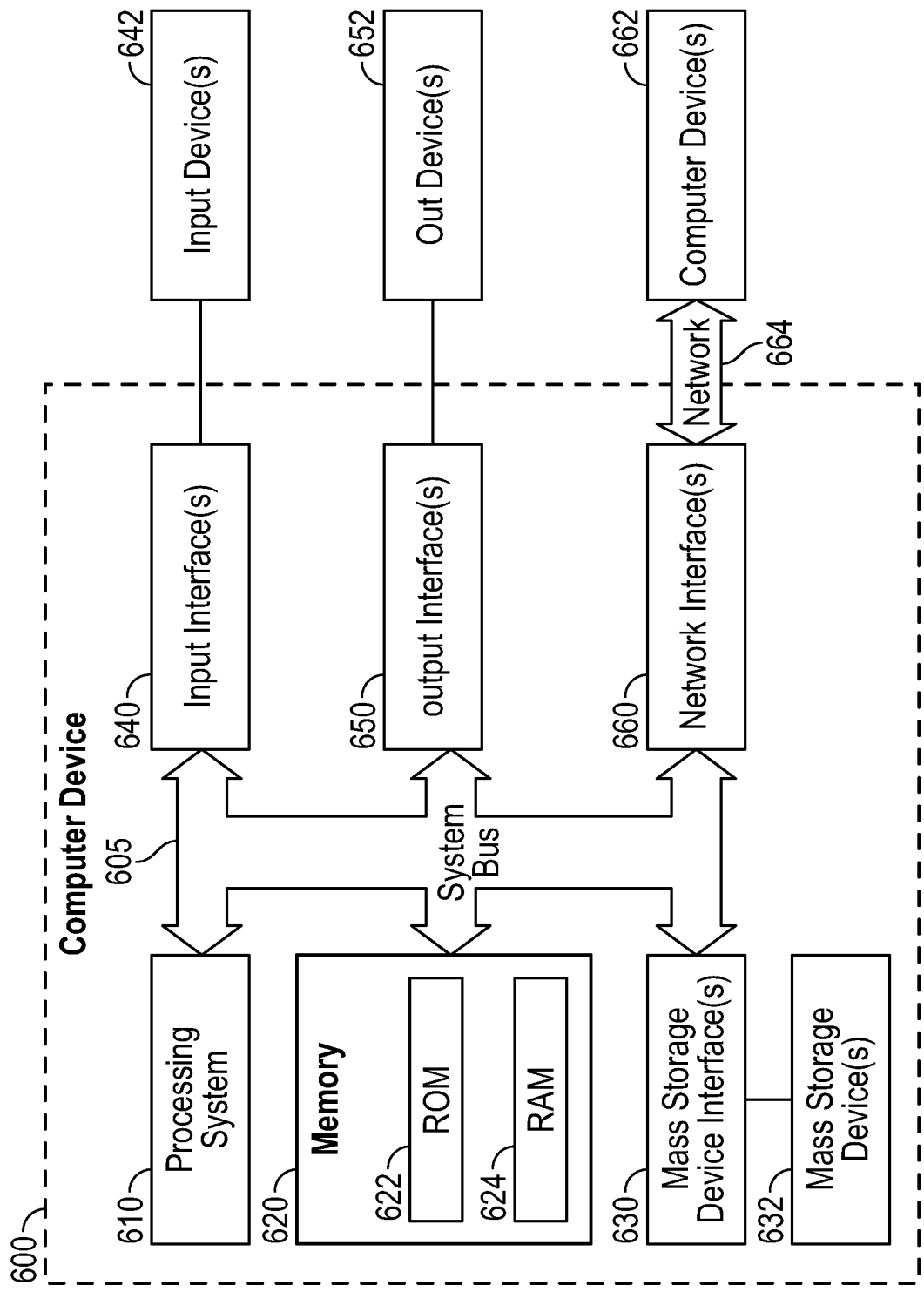
FIG. 37 illustrates a representative system that provides a suitable operating environment for use with some embodiments of the described systems and methods.

With reference to FIG. 37, a representative system includes computer device 600 (e.g., one or more processors), which may be a general-purpose or special-purpose computer (or processing unit). For example, computer device 600 may be one or more processors, personal computers, notebook computers, PDAs or other hand-held devices, workstations, minicomputers, mainframes, supercomputers, multi-processor systems, network computers, processor-based consumer devices, cellular phones, tablet computers, smart phones, feature phones, smart appliances or devices, control systems, or the like.

Computer device 600 includes system bus 605, which may be configured to connect various components thereof and enables data to be exchanged between two or more components. System bus 605 may include one of a variety of bus structures including a memory bus or memory controller, a peripheral bus, or a local bus that uses any of a variety of bus architectures. Typical components connected by system bus 605 include processing system 610 and memory 620. Other components may include one or more mass storage device interfaces 630, input interfaces 640, output interfaces 650, and/or network interfaces 660, each of which will be discussed below.

Processing system 610 includes one or more processors, such as a central processor and optionally one or more other processors designed to perform a particular function or task. It is typically processing system 610 that executes the instructions provided on computer readable media, such as on the memory 620, a magnetic hard disk, a removable magnetic disk, a magnetic cassette, an optical disk, or from a communication connection, which may also be viewed as a computer readable medium.

Memory 620 includes one or more computer readable media (including, without limitation, non-transitory computer readable media) that may be configured to include or includes thereon data or instructions for manipulating data and may be accessed by processing system 610 through system bus 605. Memory 620 may include, for example, ROM 622, used to permanently store information, and/or RAM 624, used to temporarily store information. ROM 622 may include a basic input/output system ("BIOS") having one or more routines that are used to establish communication, such as during start-up of computer device 600. RAM 624 may include one or more program modules, such as one or more operating systems, application programs, and/or program data.

One or more mass storage device interfaces 630 may be used to connect one or more mass storage devices 632 to the system bus 605. The mass storage devices 632 may be incorporated into or may be peripheral to the computer device 600 and allow the computer device 600 to retain large amounts of data. Optionally, one or more of the mass storage devices 632 may be removable from computer device 600. Examples of mass storage devices include hard disk drives, magnetic disk drives, tape drives, solid state mass storage, and optical disk drives.

Examples of solid-state mass storage include flash cards and memory sticks. A mass storage device 632 may read from and/or write to a magnetic hard disk, a removable magnetic disk, a magnetic cassette, an optical disk, or another computer readable medium. Mass storage devices 632 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 640 may be employed to enable a user to enter data (e.g., initial information) and/or instructions to computer device 600 through one or more corresponding input devices 642. Examples of such input devices include a keyboard and/or alternate input devices, such as one or more switches, buttons, dials, sensors (e.g., temperature sensors, G-force sensors, RPM sensors, color sensors, and/or any other suitable type of sensors), digital cameras, pin pads, touch screens, mice, trackballs, light pens, styluses, or other pointing devices, microphones, joysticks, game pads, scanners, camcorders, and/or other input devices. Similarly, examples of input interfaces 640 that may be used to connect the input devices 642 to the system bus 605 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 650 may be employed to connect one or more corresponding output devices 652 to system bus 605. Examples of output devices include a monitor or display screen, a speaker, a wireless transmitter, a printer, and the like. A particular output device 652 may be integrated with or peripheral to computer device 600. Examples of output interfaces include a video adapter, an audio adapter, a parallel port, and the like.

One or more network interfaces 660 enable computer device 600 to exchange information with one or more local or remote computer devices, illustrated as computer devices 662, via a network 664 that may include one or more hardwired and/or wireless links. Examples of the network interfaces include a network adapter for connection to a local area network ("LAN") or a modem, BLUETOOTH™, WiFi, a cellular connection, a wireless link, or another adapter for connection to a wide area network ("WAN"), such as the Internet. The network interface 660 may be incorporated with or be peripheral to computer device 600.

Figure 38:
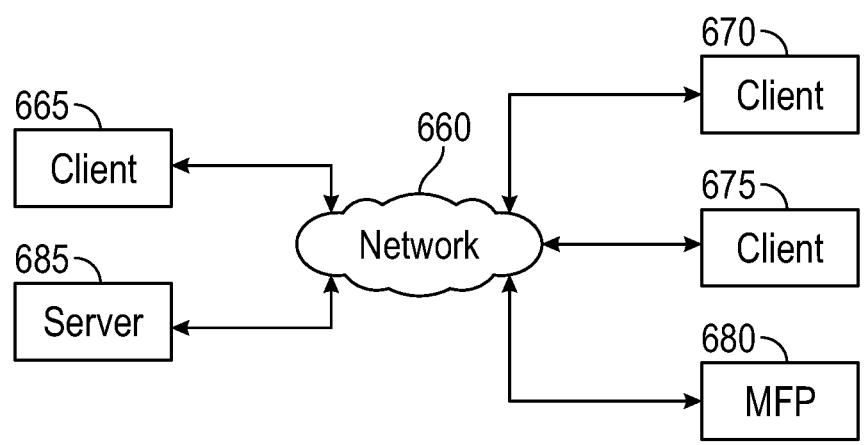
FIG. 38 illustrates a representative networked environment for use with some embodiments of the described systems and methods.

In a networked system, accessible program modules or portions thereof may be stored in a remote memory storage device. Furthermore, in a networked system computer device 600 may participate in a distributed computing environment, where functions or tasks are performed by a plurality networked computer devices. While those skilled in the art will appreciate that the described systems and methods may be practiced in networked computing environments with many types of computer system configurations, FIG. 38 represents an embodiment of a portion of the described systems in a networked environment that includes clients (665, 670, 675, etc.) connected to a server 685 via a network 660. While FIG. 38 illustrates an embodiment that includes three clients (e.g., the described fryers/centrifuges) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote: operation (e.g., setting the machine to roast coffee first thing in the morning, when arriving home, and/or at any suitable time), monitoring, training, communication, observation, control, adjustment, troubleshooting, data collecting, system optimization, user interaction, and/or other controlling of the described frying system 5 from one or more places throughout the world.

Thus, some embodiments of the described systems and methods relate to the frying of food products (e.g., coffee beans). More particularly, some implementations relate to systems and methods for deep frying green coffee beans, nuts, seeds, grains, meat, produce, legumes, plant-based foods, animal-based foods, and/or any other suitable type of food product. In some cases, once the coffee (or other food product) has been heated to a desired temperature in a frying medium (e.g., oil), the frying medium is then removed from the coffee beans (or other food product) through the use of a centrifuge.

The described systems and methods may be embodied in other specific forms without departing from its spirit or essential characteristics. The described embodiments, examples, and illustrations are to be considered in all respects only as illustrative and not restrictive. The scope of the described systems and methods is, therefore, indicated by the appended claims rather than by the foregoing description. Each of the various elements of the described embodiments, implementations, figures, methods, apparatus, systems, cases, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A frying system, comprising:
    a centrifuge tub;
    a perforated container that is configured to hold a food product and a fry medium, the perforated container being disposed within the centrifuge tub;
    a lid having a diameter that is greater than a diameter of the perforated container, the lid being configured to: cover an opening of the perforated container, couple to the perforated container, and couple to the centrifuge tub;
    a heater that is configured to heat the fry medium; and
    a motor that is configured to spin the perforated container to remove a portion of the fry medium from the food product.

2. The frying system of claim 1, wherein the centrifuge tub comprises a drain configured to drain the fry medium from the centrifuge tub.

3. The frying system of claim 1, further comprising a fan that is disposed above the perforated container and that is configured to draw at least one of moisture, smoke, fry medium particulates, and particulate matter out of the centrifuge tub.

4. The frying system of claim 3, further comprising a filter that is disposed between the perforated container and the fan and that is configured to filter the at least one of moisture, smoke, fry medium particulates, and particulate matter from air drawn through the filter by the fan.

5. The frying system of claim 1, wherein the perforated container comprises a circular-cylindrical partition disposed within the perforated container, separating the perforated container into a cylindrical inner chamber and a cylindrical outer chamber.

6. The frying system of claim 5, wherein a center of the cylindrical inner chamber is disposed at a center of the cylindrical outer chamber.

7. The frying system of claim 2, further comprising a housing comprising a bottom panel, a side panel, and a lid configured to selectively cover an opening of the housing, wherein each of the centrifuge tub, the perforated container, the heater, the motor, and the drain is enclosed within the housing; wherein an exterior portion of the housing comprises a control interface that is configured to control operation of the perforated container and the heater, and wherein the housing comprises an electrical cord that extends from the housing and is configured to electrically couple the frying system to a power source.

8. The frying system of claim 7, further comprising a fry medium reservoir in fluid communication with the centrifuge tub, the fry medium reservoir being enclosed within the housing.

9. The frying system of claim 8, wherein the fry medium reservoir is selectively removable from the housing.

10. A frying apparatus comprising:
    a housing comprising:
        a bottom panel;
        a side panel;
        a control interface disposed at an outside portion of the housing; and
        a top panel comprising a lid configured to selectively cover an opening of the housing, the housing thereby forming an enclosure, the enclosure comprising as contents:
            a fry basket that is configured to hold a food product and a fry medium, wherein the fry basket defines a plurality of openings to allow the fry medium to enter and exit the fry basket;
            a receptacle, wherein the fry basket is configured to be disposed in and to spin within the receptacle;

a heater that is configured to heat the fry medium when the fry medium is disposed within the receptacle;

a drain that is configured to drain the fry medium from the receptacle; and a motor that is configured to spin the fry basket within the receptacle.

11. The frying apparatus of claim 10, wherein the enclosure further comprises as the contents: a vessel comprising liquid nitrogen, wherein the frying apparatus is configured to apply the liquid nitrogen to the food product when the food product is disposed within the fry basket and the receptacle.

12. The frying apparatus of claim 10, wherein the fry basket is configured to spin with the receptacle.

13. The frying apparatus of claim 10, wherein the fry basket is configured to spin with respect to the receptacle.

14. The frying apparatus of claim 10, wherein the frying apparatus is configured to spin the fry basket up to a top speed of at least 1,000 RPM.

15. The frying apparatus of claim 10, wherein the fry basket comprises a partition guide that is configured to selectively couple with a partition having a circular cross section for dividing the fry basket into a cylindrical inner chamber and a cylindrical outer chamber.

16. The frying apparatus of claim 10, wherein the heater comprises at least one of: (i) an inductive heating element disposed at a base of the receptacle; and (ii) a microwave heater disposed within a lid of the receptacle.

17. A frying apparatus comprising:
a centrifuge tub;
a perforated container that is configured to hold a food product and a fry medium, the perforated container being disposed within the centrifuge tub;
a heater that is configured to heat the fry medium; and
a motor that is configured to spin the perforated container at up to a top speed of at least 1,000 RPM to remove a portion of the fry medium from the food product.

18. A method for fry roasting coffee beans, the method comprising:
obtaining a frying apparatus comprising:
a centrifuge tub;
a perforated container that is configured to hold the coffee beans and a fry medium, the perforated container being disposed within the centrifuge tub;
a heater that is configured to heat the fry medium; and
a motor that is configured to spin the perforated container at up to a top speed of at least 1,000 RPM to remove a portion of the fry medium from the coffee beans;
introducing the coffee beans into the perforated container;
using the heater to heat the fry medium and to heat the coffee beans in the fry medium; and
using the motor to spin the perforated container to remove a portion of the fry medium from the coffee beans.

19. The method of claim 18, further comprising using the motor to spin the perforated container to remove the portion of the fry medium from the coffee beans while the perforated container is disposed within the centrifuge tub.

20. The method of claim 18, further comprising applying liquid nitrogen to the coffee beans using a liquid nitrogen feature of the frying apparatus after the coffee beans have been centrifuged.

* * * * *